(12) United States Patent
Matsukata

(10) Patent No.: US 6,540,606 B1
(45) Date of Patent: Apr. 1, 2003

(54) PORTABLE INFORMATION TERMINAL, RECORDING MEDIUM AND PROGRAM

(75) Inventor: Tetsuya Matsukata, Yokohama (JP)

(73) Assignee: Sony Computer Entertainment Inc., Tokyo (JP)

( * ) Notice: Subject to any disclaimer, the term of this patent is extended or adjusted under 35 U.S.C. 154(b) by 0 days.

(21) Appl. No.: 09/499,340

(22) Filed: Feb. 7, 2000

(30) Foreign Application Priority Data

Mar. 19, 1999 (JP) ............................................ 11-076846
Apr. 30, 1999 (JP) ............................................ 11-125257

(51) Int. Cl.[7] ................................................ A63F 13/00
(52) U.S. Cl. ................................................ 463/1; 463/7
(58) Field of Search ............................ 463/1–8, 30–53, 463/43

(56) References Cited

U.S. PATENT DOCUMENTS

| | | | | |
|---|---|---|---|---|
| 5,390,937 A | * | 2/1995 | Sakaguchi et al. .............. | 463/2 |
| 5,618,045 A | * | 4/1997 | Kagen et al. .................. | 463/40 |
| 5,752,883 A | * | 5/1998 | Butcher et al. ................ | 463/43 |
| 5,971,855 A | * | 10/1999 | Ng .............................. | 463/40 |
| 6,023,426 A | * | 2/2000 | Tang et al. ............. | 365/185.24 |
| 6,066,046 A | * | 5/2000 | Yamamoto ................... | 434/28 |
| 6,149,523 A | * | 11/2000 | Yamada et al. ................ | 463/31 |
| 6,165,068 A | * | 12/2000 | Sonoda et al. ................. | 463/40 |
| 6,213,871 B1 | * | 4/2001 | Yokoi ......................... | 273/460 |
| 6,213,872 B1 | * | 4/2001 | Harada et al. ............... | 235/105 |
| 6,251,012 B1 | * | 6/2001 | Horigami et al. ........ | 273/148 B |
| 6,322,444 B1 | * | 11/2001 | Matsui et al. ................. | 463/30 |
| 6,340,330 B1 | * | 1/2002 | Oishi et al. ..................... | 463/1 |

OTHER PUBLICATIONS

Dengeki Play Station, vol. 97, Publisher: Media Works, Feb. 12, 1999, pp. 102–103.
Links 386CD, Players Manual, copyright 1995.*

* cited by examiner

Primary Examiner—Valencia Martin-Wallace
Assistant Examiner—John M Hotaling, II
(74) Attorney, Agent, or Firm—Paul A. Guss

(57) ABSTRACT

A portable information terminal has, as its functions, a path display unit for successively displaying a path depending on operation of direction keys, a character display unit for displaying at least one imaginary character on a display unit, a comparing unit for comparing the input timing of a control signal and the output timing based on a predetermined sequence with each other, an influence determining unit for determining the magnitude of an influence on the imaginary character based on the result of comparison from the comparing unit, and a table registering unit for registering information of the imaginary character in an information table.

53 Claims, 59 Drawing Sheets

F I G. 7
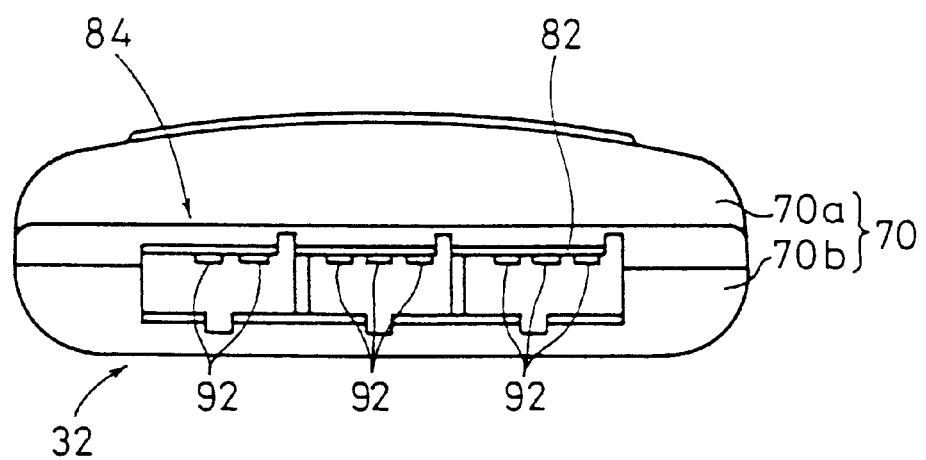

FIG. 28

INFORMATION TABLE

| MONSTER NO. | STATUS | IMAGE NO. | ATTRIBUTE | PATTERN NO. | REGISTERED OR NOT | APPEARANCE INFORMATION |
|---|---|---|---|---|---|---|
| RECORD 1 | | | | | | |
| RECORD 2 |〃 | 〃 | 〃 | 〃 | 〃 | 〃 |
| RECORD 3 | 〃 | 〃 | 〃 | 〃 | 〃 | 〃 |
| ........ | 〃 | 〃 | 〃 | 〃 | 〃 | 〃 |

PRINCIPAL CHARACTER IMAGE TABLE

APPEARANCE POINT INFORMATION TABLE

FIG. 56

OPTION TABLE

| | |
|---|---|
| | TIME ZONE |
| RECORD 0 | STORAGE ADDRESS OF IMAGE DATA |
| | PROGRAM NO. |
| | TIME ZONE |
| RECORD 1 | STORAGE ADDRESS OF IMAGE DATA |
| | PROGRAM NO. |
| ⋮ | ⋮ |

PORTABLE INFORMATION TERMINAL, RECORDING MEDIUM AND PROGRAM

BACKGROUND OF THE INVENTION

1. Field of the Invention

The present invention relates to a portable information terminal which can be held by hand and played by the user, and can also be used as an auxiliary storage unit for an information apparatus, a recording medium which stores a program to be downloaded into such a portable information terminal, and a program itself to be downloaded into such a portable information terminal.

2. Description of the Related Art

Slave units such as conventional memory card devices for insertion into, master units such as information apparatus such as entertainment apparatus including video game machines comprise an interface for connection to a master unit such as an information apparatus and a nonvolatile memory for storing data.

FIG. 57 of the accompanying drawings shows major components of such a conventional memory card device. As shown. in FIG. 57, a conventional memory card 1000 comprises a control means 102 for controlling operation thereof, a connector 1004 for connection to a terminal in a slot in an information apparatus or the like, and a nonvolatile memory 1006 for storing data. The connector 1004 and the nonvolatile memory 1006 are connected to the control means 1002.

The control means 1002 comprises a microcomputer, for example. The nonvolatile memory 1006 comprises a flash memory, an EEPROM, or the like. An interface for connection to the information apparatus or the like may comprise a micro-computer as a control means for interpreting a protocol.

FIG. 58 of the accompanying drawings shows control items in the control means 1002 of the conventional memory card 1000.

As shown in FIG. 58, the conventional memory card 1000 only has an apparatus connection interface for connection to a master unit such as a information apparatus or the like, and a memory interface for storing data into and reading data from the nonvolatile memory.

Conventional entertainment apparatus which allow the user to enjoy home TV games have a function to store a program and data into an auxiliary storage unit. The above memory card device can also be used as an auxiliary storage unit for such an entertainment apparatus.

FIG. 59 of the accompanying drawings shows a conven20 tional entertainment apparatus 1010 which employs a memory card as an auxiliary storage unit. The conventional entertainment apparatus 1010 has a rectangular casing which houses a disk loading unit 1014 substantially centrally therein for loading an optical disk as a recording medium for supplying an application program recorded therein, a reset switch 1016 for resetting the program being executed at present, a power supply switch 1018, a disk control switch 1020 for controlling the loading of the optical disk, and two slots 1022A, 1022B, for example.

The memory card 1000 for use as an auxiliary storage unit is inserted into one of the slots 1022A, 1022B. The result of a program executed by the entertainment apparatus 1010 is sent from the control means (CPU) 1024, and written into the nonvolatile memory 1006. A plurality of controllers (not shown) can also be connected to the slots 1022A, 1022B for allowing a plurality of users to play a competition game or the like at the same time.

It is been proposed to give a function to execute a program such as of a game to a slave unit that can be connected to a memory card slot in an entertainment apparatus serving as a master unit. The slave unit can also be used as a portable information terminal, and may find a wider range of applications and create new demands by facilitating communications with other devices.

SUMMARY OF THE INVENTION

It is therefore an object of the present invention to provide a portable information terminal which can be used as a portable game machine for playing a roll-playing game (RPG) in particular, a recording medium that stores a program to be downloaded into such a portable information terminal, and a program itself to be downloaded into such a portable information terminal.

Another object of the present invention is to provide a portable information terminal which can achieve a battle mode for fighting with an imaginary enemy (e.g., a monster), a recording medium that stores a program to be downloaded into such a portable information terminal, and a program itself to be downloaded into such a portable information terminal.

Still another object of the present invention is to provide a portable information terminal which allows a user to register imaginary enemies (monsters) defeated in the battle mode and view the registered imaginary enemies in a monster picture book, for example.

Still another object of the present invention is to provide a portable information terminal which can perform the above battle mode between a plurality of users at any time in any place by way of wireless communications (e.g., infrared communications), so that the portable information terminal can find widespread use, a recording medium that stores a program to be downloaded into such a portable information terminal, and a program itself to be downloaded into such a portable information terminal.

A portable information terminal according to the present invention has character display means for displaying at least one imaginary character on a display screen, comparing means for comparing the input timing of a control signal and the output timing based on a predetermined sequence with each other, and influence determining means for determining the magnitude of an influence on the imaginary character based on the result of comparison from the comparing means.

A recording medium according to the present invention stores a program having the steps of displaying at least one imaginary character on a display screen, comparing the input timing of a control signal and the output timing based on a predetermined sequence with each other, and determining the magnitude of an influence on the imaginary character based on the result of comparison from the comparing step.

A program according to the present invention has the steps of displaying at least one imaginary character on a display screen, comparing the input timing of a control signal and the output timing based on a predetermined sequence with each other, and determining the magnitude of an influence on the imaginary character based on the result of comparison from the comparing step.

When a control signal is inputted at a certain one of the output timing based on the predetermined sequence, the magnitude of the influence on the imaginary character is determined depending on the output timing at the time.

When the program stored in the recording medium is downloaded into the portable information terminal, the portable information terminal may be used as a portable game machine, which can be used to perform a roll-playing game (RPG).

The influence may comprise a numerical value for reducing a level of the imaginary character, i.e., a numerical value for giving damage, or a numerical value for suppressing a reduction in a level of the imaginary character, i.e., a numerical value indicative of a defense against damage.

The influence may be calculated on the basis of a calculating value based on the length of the bar displayed when the control signal is inputted on an attack side, a calculating value based on the length of the bar displayed when the control signal is inputted on a defense side, and a variable derived from the difference between statuses of the attack and defense sides. One element for deriving the variable may include time information. The control signal may be inputted when a button of a manual control pad is operated.

The above arrangement makes it possible to play a game, i.e., a roll-playing game (RPG), in which the imaginary character walks in a mage, a field, or a dungeon, and fights against a monster that shows up, and the level of the imaginary character with respect to its physical strength and intelligent ability increases based on the experience of the fight.

The comparing means may have bar display means for displaying the output timing based on the predetermined sequence as an extensible/contractible bar, and the influence determining means may have means for determining the magnitude of the influence based on the length of the bar when the control signal is inputted.

The user can enter the control signal while viewing the displayed bar as it extends and contracts. The influence on the imaginary character may be increased when the control signal is inputted at the output timing when the bar becomes longest.

The user can thus enter the control signal while observing the rhythmic pattern (timing) of extension and contraction of the displayed bar in order to cause substantial damage to the opponent (monster or the like).

This allows the user to be able to fight against strong monsters on an even ground through training in a simple environment without having to resort to sophisticated skills as by memorizing a number of complex curses and taking a necessary item from a number of items. Therefore, children, e.g., elementary school pupils, can enjoy the battle mode in RPGs, and hence the portable information terminal will find widespread use among a diverse range of users.

The battle mode, for example, can be made more interesting by arbitrarily changing the pattern of extension and contraction of the displayed bar depending on the imaginary character. The portable information terminal may also have sound output means for outputting a sound signal whose sound varies depending on the extension/contraction of the displayed bar. The sound output means allows the user to recognize how long the bar has extended by listening to changes in the outputted sound without having to viewing the rhythmic pattern of expansion and contraction of the displayed bar. Consequently. the user can enjoy the battle mode while seeing the other user's face, for example, when the two users compete with each other in the game.

The comparing means (step) may comprise mark display means (step) for displaying a mark capable of being successively operated with respect to the influence, in an arbitrary position in a display area of the bar before the bar display means (step) displays the output timing as the bar, and successive operation permitting means (step) for allowing the mark to be operated successively if the time when the tip end of the bar displayed by the bar display means (step) touches the display area of the mark agrees with the input timing of the control signal.

The comparing means and the successive operation permitting means allow the user to operate the button when the tip end of the displayed bar touches the displayed area of the mark, for thereby successively influencing the opponent. For example, the accumulated value of the influence achieved by the successive operations can be given as damage to the opponent, so that the principal character whose level is low can defeat a strong monster in an RPG.

The portable information terminal may further comprise table registering means (step) for effectively registering information of the imaginary character in an information table or canceling information of the imaginary character effectively registered in the information table when the level of the imaginary character becomes "0".

The table registering means (step) may comprise means for effectively registering information of the imaginary character in the information table when the level of the imaginary character becomes "0" if the imaginary character is an imaginary enemy.

The table registering means (step) may comprise preparing means (step) for preparing for effectively registering information of the imaginary character in the information table when the level of the imaginary character becomes "0" if the imaginary character is an imaginary enemy, and means (step) for effectively registering information of the imaginary character in the information table which has been prepared by the preparing means (step) when the completion of a predetermined process is detected.

The table registering means (step) may comprise means (step) for canceling information of the imaginary character effectively registered in the information table when the level of the imaginary character becomes "0". if the imaginary character is an imaginary ally.

The table registering means (step) can register imaginary enemies (monsters) defeated in the battle mode and the competition mode, allowing the registered imaginary enemies to be observed in a monster picture book, for example.

The character display means (step) may comprise means (step) for displaying an image depending on a level of the imaginary character, e.g., an image showing the equipment of a principal character as it is gradually improved depending on the level.

The character display means (step) may comprises means (step) for, if the imaginary character is an imaginary enemy, managing the type of the imaginary enemy to be displayed and/or the probability with which to display the imaginary enemy, based on time information.

Since the type of an imaginary character that is displayed changes depending on the time zone. Therefore, if an imaginary character is a monster, then a monster that shows up in the daytime and a monster that shows up in the nighttime can differ from each other. Because appearance probability of a monster changes depending on the time zone, furthermore, the RPG can develop with added fun.

The portable information terminal may further comprise a manual control pad having a direction control key, and path display means (step) for displaying a path for the imaginary character depending on an entry from the direction control key. The path display means (step) can display a scene in which the imaginary character walks in a mage, a field, a dungeon, or the like, for example.

The path display means (step) may comprise means (step) for displaying a path different from a predetermined ordinary path based on time information.

For example, a spot (an option) such as a cave which has not been present in the daytime suddenly may appear in the nighttime, resulting in an unexpected game development.

The portable information terminal may further comprise data sending/receiving means (step) for sending and receiving, by way of wireless communications, at least information with respect to the imaginary character and information of the bar displayed by the bar display means (step).

The data sending/receiving means (step) allows a plurality of users to compete against each other at any time in any place by way of wireless communications (e.g., infrared communications).

The data sending/receiving means (step) may comprise means (step) for sending and receiving at least information with respect to the imaginary character and a value for calculating the influence, the arrangement being such that an image including the bar is displaying by reading image information based on the information with respect to the imaginary character which has been sent and received.

Since image data for displaying the bars and image data for imaginary characters do not need to be sent and received on a real-time basis, the data processing in the portable information terminals is speeded up. As a result, a competition by way of communications can be performed between a plurality of persons at substantially the same speed as the speed at which a game is played by one person. Accordingly, the user can enjoy such a competition by way of communications with much fun.

The comparing means (step) may comprise mark display means (step) for displaying a mark capable of being successively operated with respect to the influence, in an arbitrary position in a display area of the bar before the bar display means (step) displays the output timing as the bar, and the data sending/receiving means (step) may comprise means (step) for sending and receiving a display width and a display position for the mark which have been determined by the mark display means (step).

Therefore, the mark that can successively be operated can be displayed in a competition performed by way of communications. The advantages offered by the above mark display can be achieved in a competition performed by way of communications.

The above and other objects, features, and advantages of the present invention will become more apparent from the following description when taken in conjunction with the accompanying drawings in which a preferred embodiment of the present invention is shown by way of illustrative example.

BRIEF DESCRIPTION OF THE DRAWINGS

FIG. 7 is a front elevational view of the terminal;

FIG. 28 is a diagram showing details of an information table;

FIG. 56 is a diagram showing details of an option table;

DESCRIPTION OF THE PREFERRED EMBODIMENT

Figure 59:
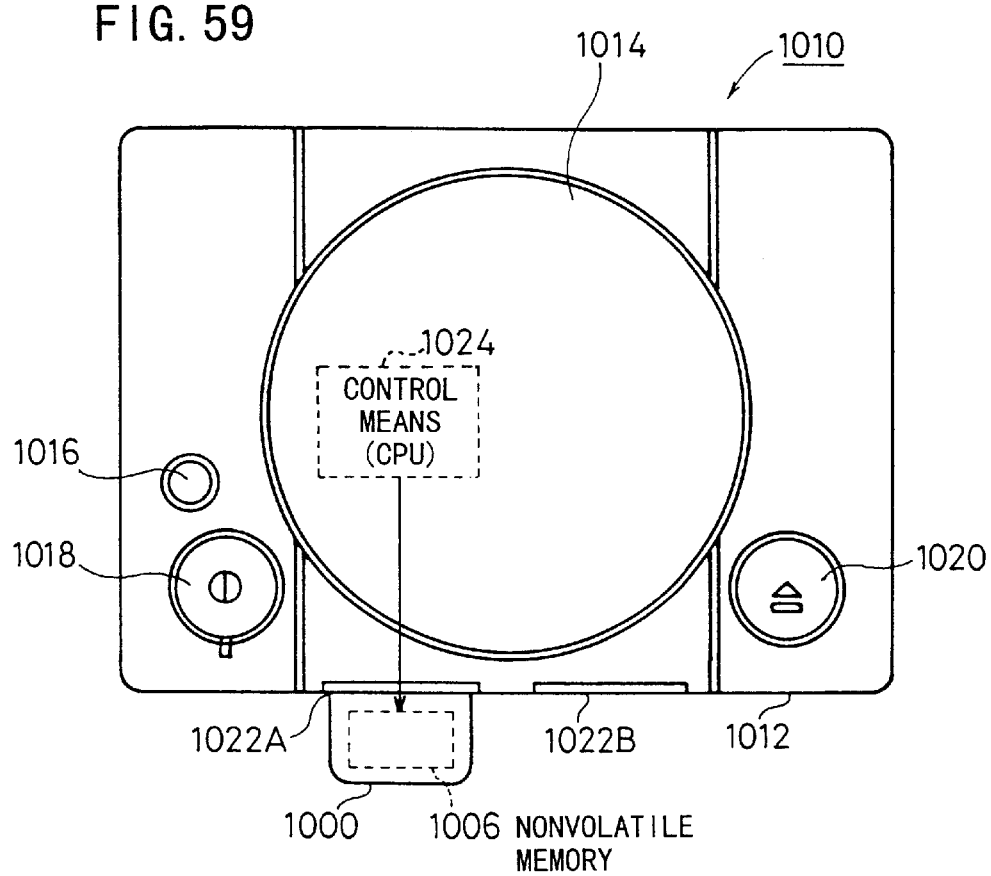
FIG. 59 is a plan view of an entertainment apparatus which employs a memory card as an auxiliary storage unit.

An embodiment of a portable information terminal which can be used as a portable game machine (hereinafter simply referred to as a "terminal"), and an embodiment of an entertainment system to which the terminal is connected will be described below with reference to FIGS. 1 through 59.

Figure 1:
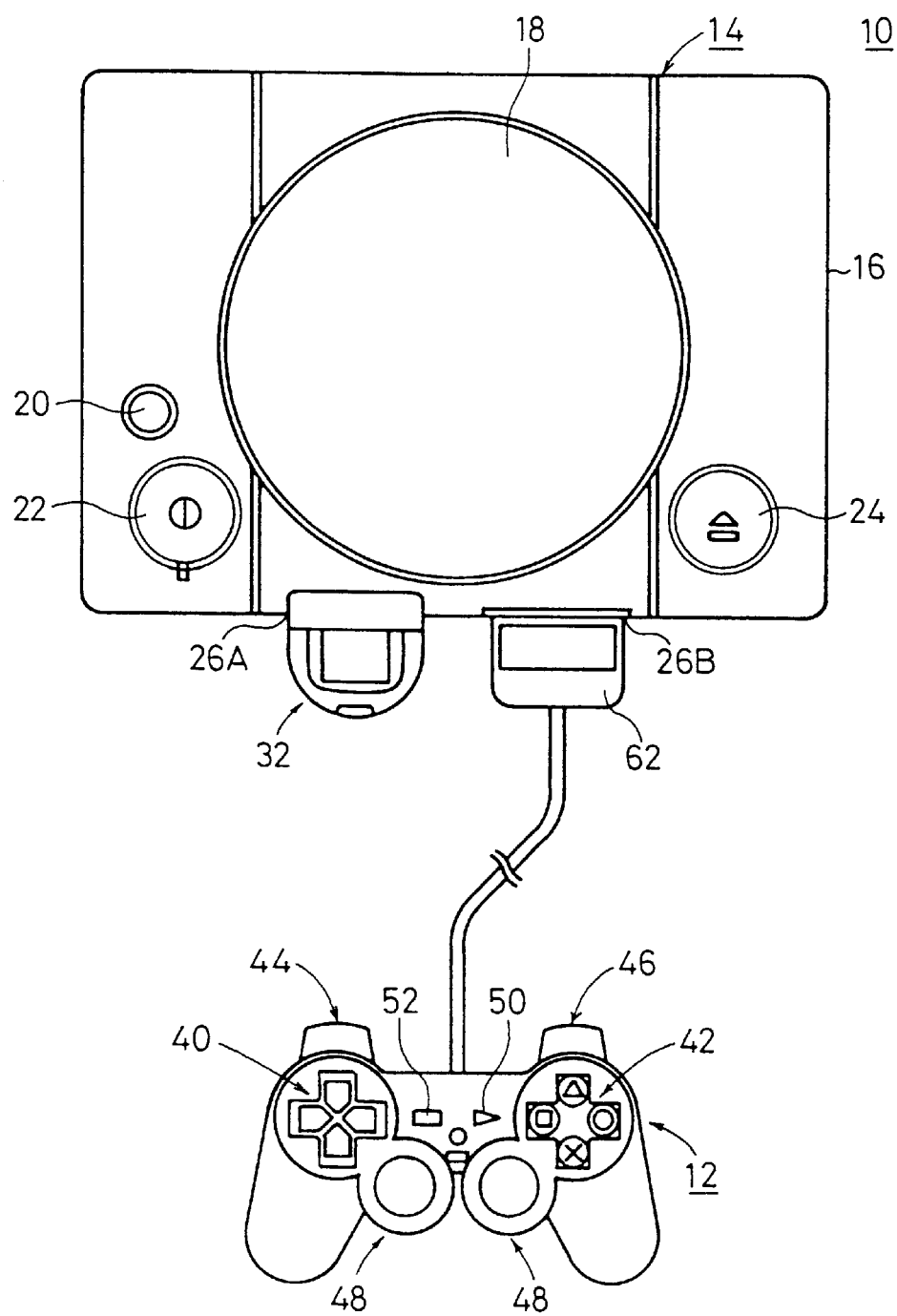
FIG. 1 is a plan view of an entertainment system which incorporates a terminal according to an embodiment of the present invention.

As shown in FIG. 1, the entertainment system, generally denoted by 10, according to the present invention has an entertainment apparatus 14 to which a manual controller 12 is detachably connected.

The entertainment apparatus 14 reads a program and data recorded in an optical disk, for example, and executes a game, for example, based on the program depending on commands from the user, e.g., the game player. The execution of the game mainly represents controlling the progress of the game and the display of images and the generation of sounds.

The entertainment apparatus 14 has a rectangular casing 16 which houses a disk loading unit 18 substantially centrally therein for loading an optical disk such as a CD-ROM or the like as a recording medium for supplying an application program recorded therein. The casing 16 supports a reset switch 20 for resetting a program which is being presently executed, a power supply switch 22, a disk control switch 24 for controlling the loading of the optical disk, and two slots 26A, 26B.

The entertainment apparatus 14 may be supplied with the application program via a communication link, rather than being supplied from the optical disk as the recording medium.

The entertainment system 10 also includes a manual controller 12 for supplying user's commands to the entertainment apparatus 14.

Figure 4:
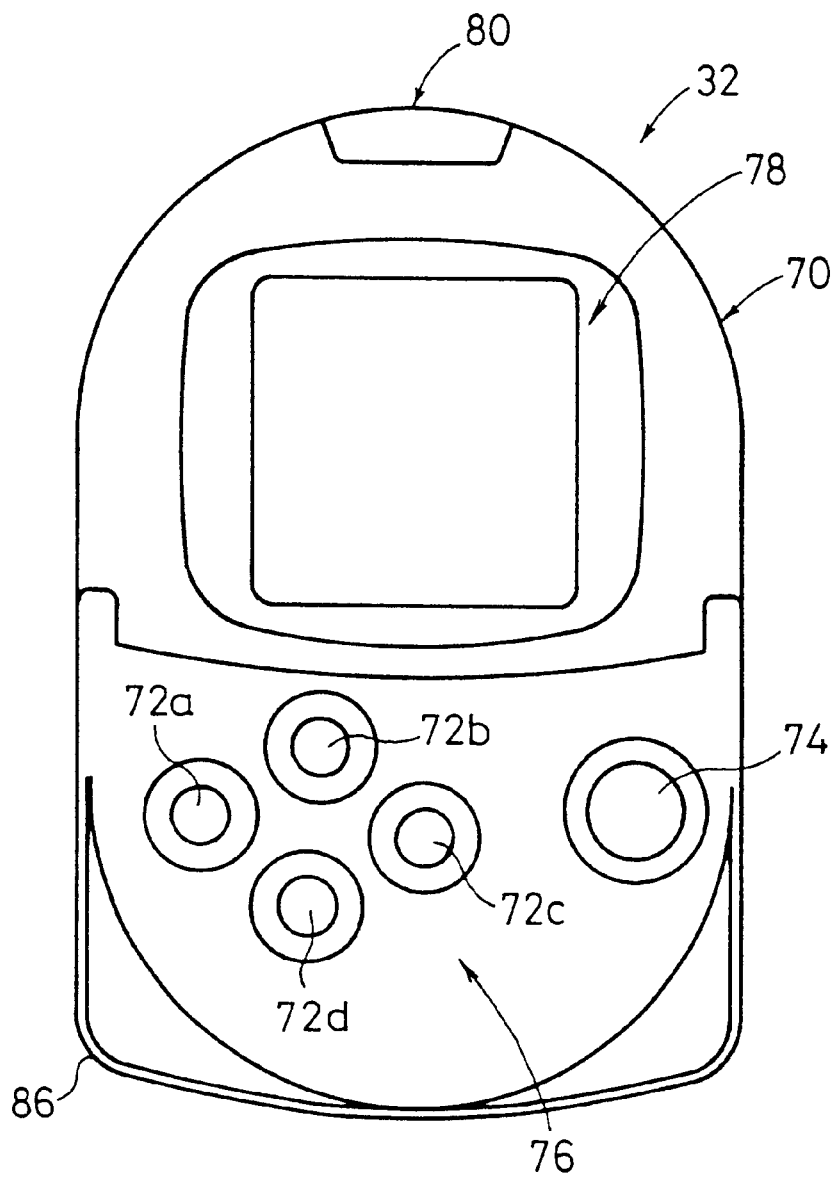
FIG. 4 is a plan view of a terminal of the entertainment system.
Figure 5:
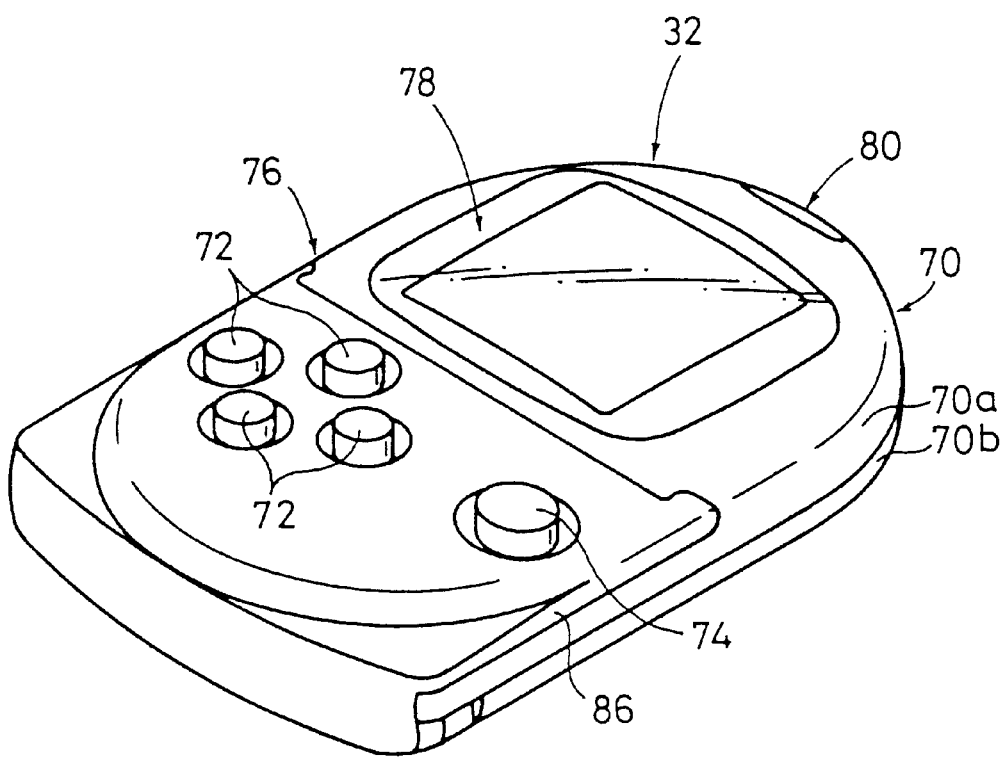
FIG. 5 is a perspective view of the terminal.
Figure 6:
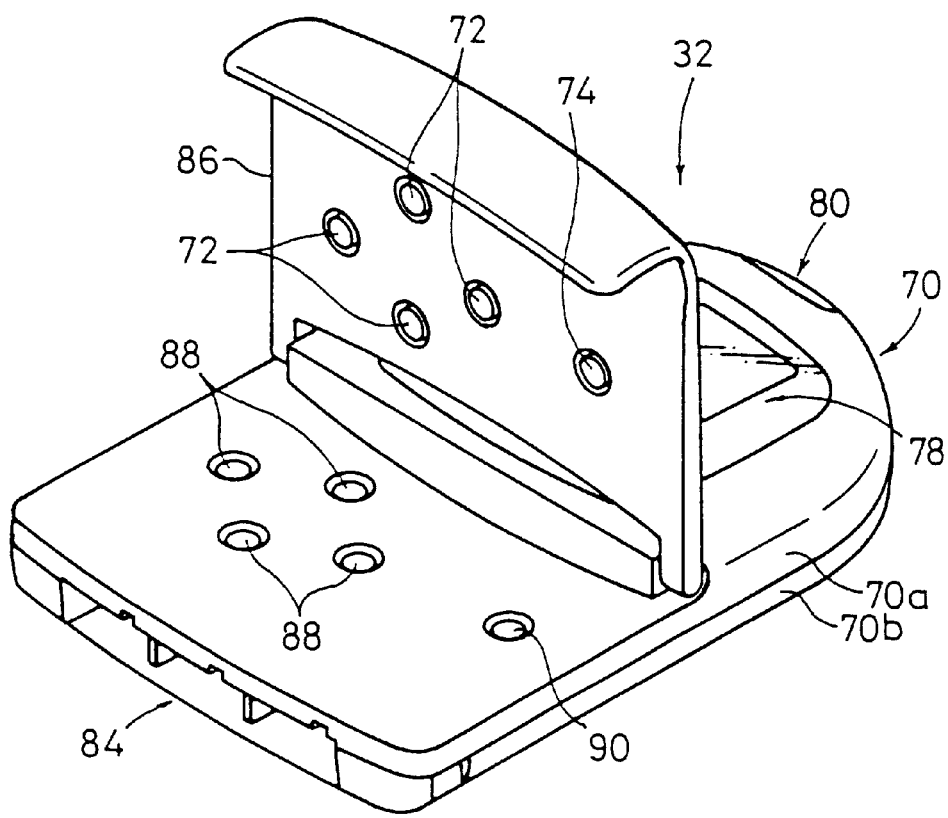
FIG. 6 is a perspective view of the terminal with a lid being open.

Two manual controllers 12 may be connected respectively to the slots 26A, 26B to allow two users or game players to play a competition game, for example. A memory card which has conventionally been used and a terminal 32 (see FIG. 4) according to the present embodiment may also be inserted into the slots 26A, 26B. While the two slots 26A, 26B are shown in FIG. 1, the entertainment apparatus 14 may have more or less than two slots.

The manual controller 12 has first and second control pads 40, 42, third and fourth control pads 44, 46, rotatable control members 48, a starter button 50, and a selector button 52. The manual controller 12 also has a vibration generating device disposed therein for generating and imparting vibrations to the manual controller 12.

Figure 2:
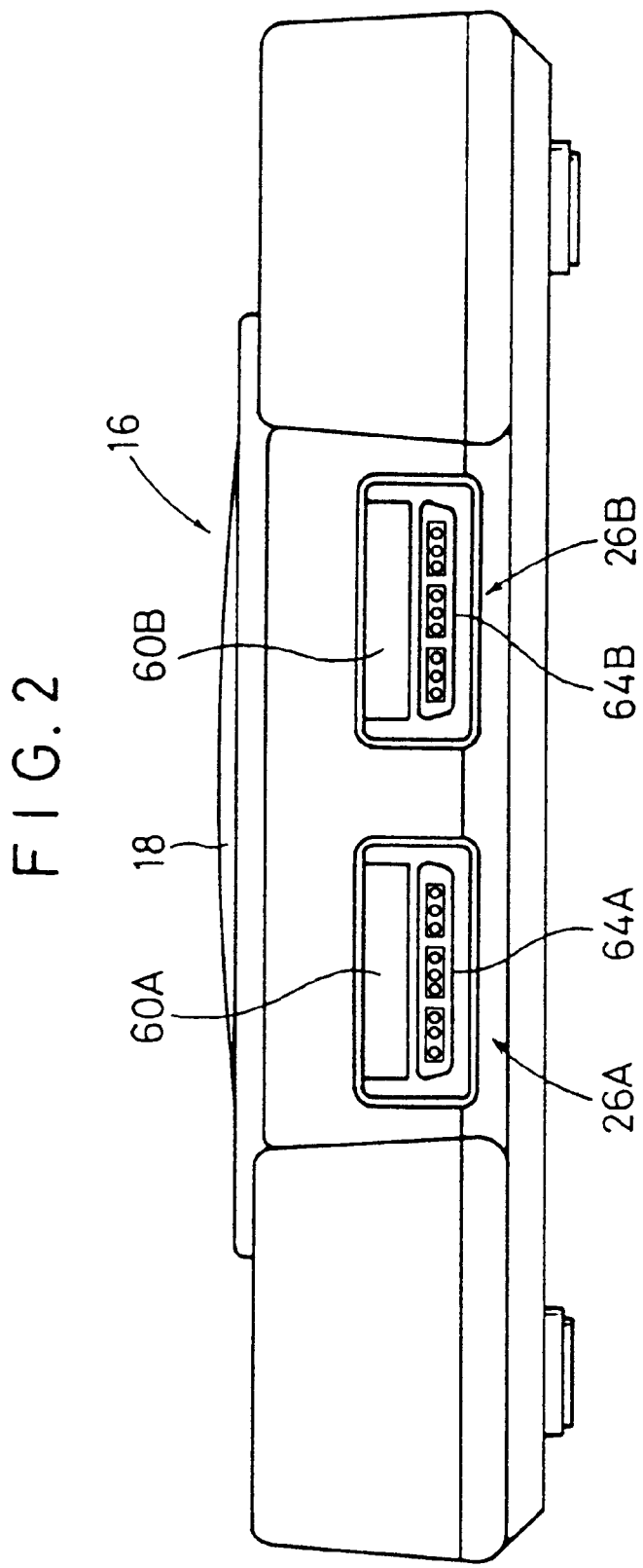
FIG. 2 is a rear elevational view of an entertainment apparatus of the entertainment system, showing slots thereof.

FIG. 2 shows the slots 26A, 26B which are defined in a front panel of the casing 16 of the entertainment apparatus 14.

Each of the slots 26A, 26B has upper and lower units. Specifically, the slots 26A, 26B have respective memory card insertion units 60A, 60B as their upper units for inserting the memory card or the portable information terminal 32 therein and respective controller connectors (jacks) 64A, 64B as their lower units for connection to a connection terminal 62 (connector, see FIG. 1) of the manual controller 12.

The memory card insertion units 60A, 60B have respective insertion holes (slots) that are of a horizontally elongate rectangular shape. These insertion slots have lower opposite corners round in contrast to upper opposite corners thereof so that the memory card and the terminal 32 will not be inserted into the memory card insertion units 60A, 60B in the wrong orientation. The memory card insertion units 60A, 60B also have shutters for protecting connection terminals disposed therein for electric connection.

The controller connectors 64A, 64B also have respective insertion holes (slots) that are of a horizontally elongate rectangular shape. These insertion slots have lower opposite corners round in contrast to upper opposite corners thereof so that the connector terminal 62 of the manual controller 12 will not be connected to the controller connectors 64A, 64B in the wrong orientation. The insertion holes of the controller connectors 64A, 64B are different in shape from the insertion holes of the memory card insertion units 60A, 60B so that the memory card and the terminal 32 will not be inserted into the insertion holes of the controller connectors 64A, 64B.

Figure 3:
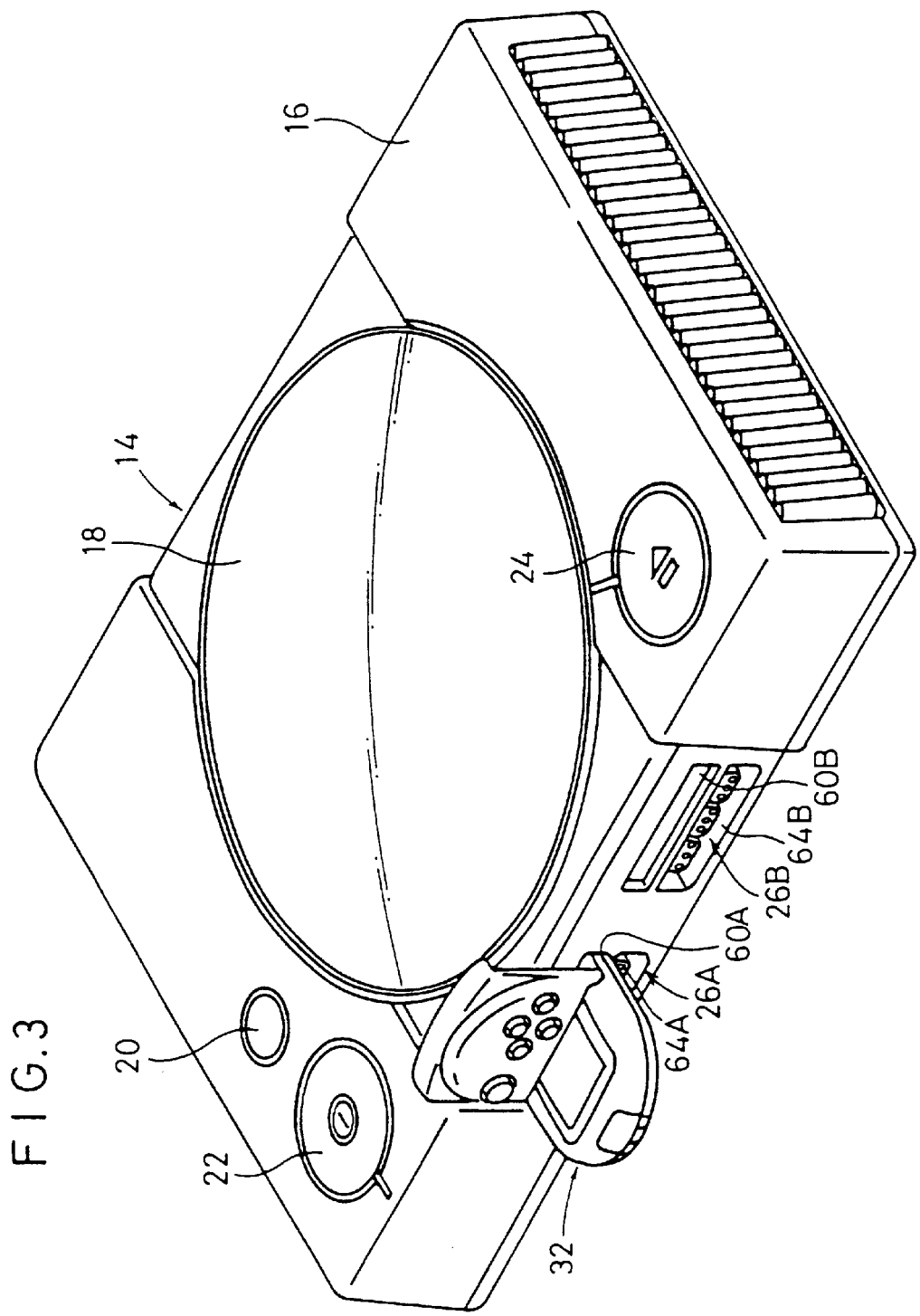
FIG. 3 is a perspective view of the entertainment apparatus.

In FIG. 3, the terminal 32 is inserted in the memory card insertion unit 60A in the slot 26A which is defined in the front panel of the entertainment apparatus 14.

The terminal 32 can be used as a memory card inherent in each of a plurality of manual controllers 12 connected to the entertainment apparatus 14. For example, if two users or game players play a game on the entertainment system 10, then two terminals 32 record respective game results of the game players.

As shown in FIGS. 4 through 7, the terminal 32 has a housing 70 which supports a manual control pad 76 having four direction buttons 72 (72a through 72d) and a decision button 74 for entering events and making various selections, a display unit 78 comprising a liquid crystal display (LCD) unit or the like, and a window 80 for wireless communication via infrared radiation or the like.

The housing 70 comprises an upper shell 70a and a lower shell 70b, and houses a board 82 which supports memory devices, etc. thereon. The housing 70 is shaped so as to be insertable into either one of the slots 26A, 26B in the casing 16 of the entertainment apparatus 14. The housing 70 has a connector 84 on the side of one end thereof which includes a rectangular window.

The window 80 is mounted on a substantially semicircular end of the housing 70 remote from the connector 84. The display unit 78 occupies a substantially half area of the upper shell 70a of the housing 70, and is positioned near the window 80.

The manual control pad 76 occupies the other substantially half area of the upper shell 70a, and is positioned remotely from the window 80. The manual control pad 76 comprises a substantially square lid 86 that is angularly movably supported on the housing 70 and supports thereon one or more of the direction buttons 72 and the decision button 74. and switch pressers 88, 90 positioned in an area of the housing 70 which can be opened and closed by the lid 86.

The direction buttons 72 and the decision button 74 extend through the lid 86 from its upper surface to its lower surface. The direction buttons 72 and the decision button 74 are supported on the lid 86 for movement into and out of the upper surface of the lid 86.

The switch pressers 88, 90 have respective pressing elements supported on the housing 70 for movement into and out of the upper surface of the housing 70. When one of the pressing elements is pressed from above, it presses a corresponding pressure switch such as a diaphragm switch, for example, mounted on the board 82 in the housing 70.

With the lid 86 closed, the switch pressers 88, 90 are held in vertical alignment with the direction buttons 72 and the decision button 74, respectively. Therefore, while the lid 86 is being closed over the housing 70, when the direction buttons 72 and the decision button 74 are pressed from above into the upper surface of the lid 86, the direction buttons 72 and the decision button 74 cause the pressing elements of the corresponding switch pressers 88, 90 to press corresponding pressure switches in the housing 70.

As shown in FIG. 7, power and signal terminals 92 are mounted on the board 82 and disposed in the window of the connector 84.

The connector 84 has a shape and dimensions that are identical to those of the memory card used in the entertainment apparatus 14.

Circuit arrangements of the terminal 32, the entertainment apparatus 14, and the manual controller 12 will be described below with reference to FIGS. 8 through 12.

Figure 8:
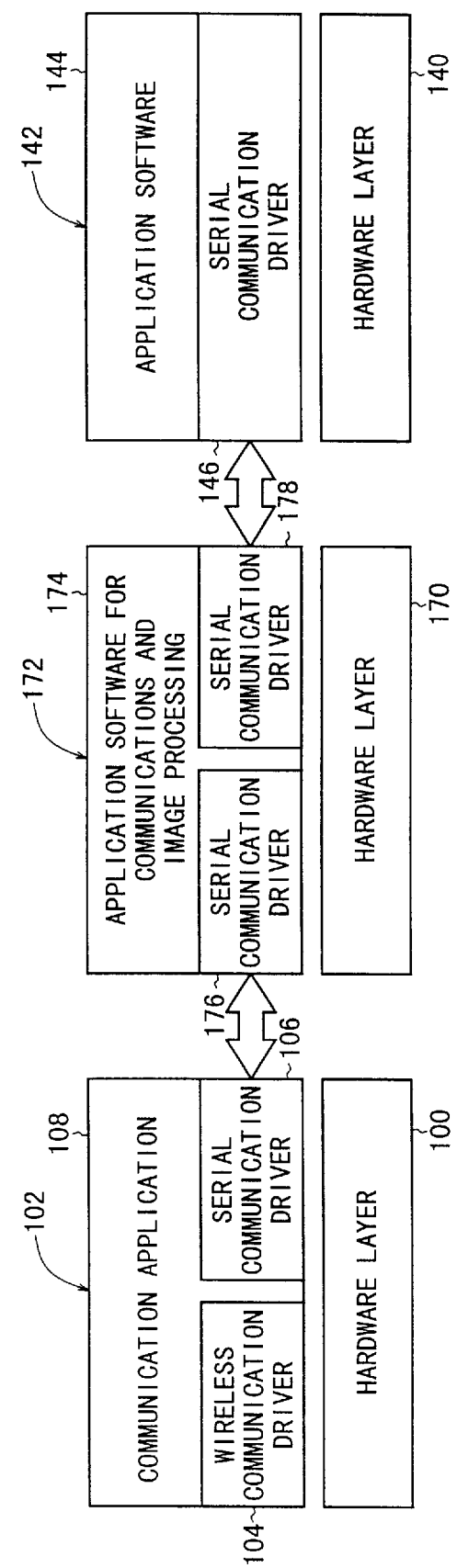
FIG. 8 is a block diagram of hardware layers and software layers of the terminal, a manual controller, and the entertainment apparatus.

As shown in FIG. 8, the terminal 32 comprises a hardware layer 100 for processing data received via an wireless communication block 110 (see FIG. 9), and a software layer 102 for performing communications in the hardware layer 100, the software layer 102 comprising a wireless communication driver 104, a serial communication driver 106, and a communication application 108.

Figure 9:
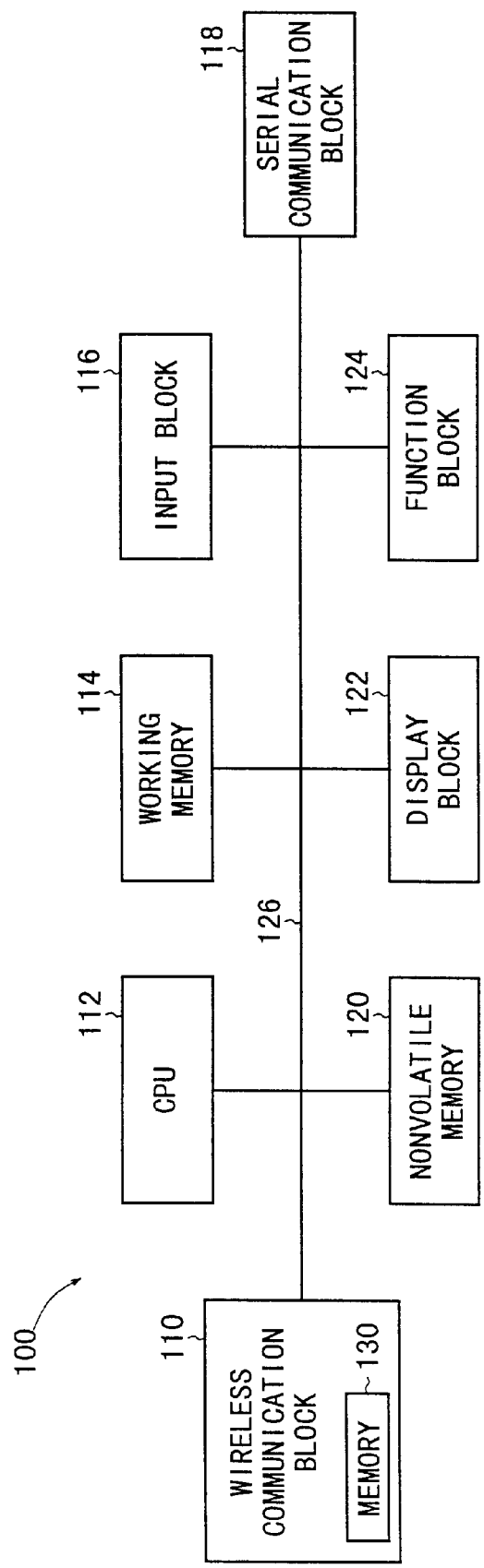
FIG. 9 is a block diagram of the hardware layer of the terminal.

As shown in FIG. 9. the hardware layer 100 of the terminal 32 comprises a wireless communication block 110, a CPU 112, a working memory 114, an input block 116, a serial communication block 118, nonvolatile member 120, a display block 122, and a function block 124. These components of the terminal 32 are connected to a bus 126.

The wireless communication block 110 receives data transmitted as a wireless signal such as an infrared signal via an infrared communication unit, and converts transmission data generated by the terminal 32 into an infrared signal with the infrared communication unit and sends the infrared signal. The reception and transmission of data by the wireless communication block 110 is controlled by the wireless communication driver 104 (see FIG. 8) which comprises a program.

Figure 10:
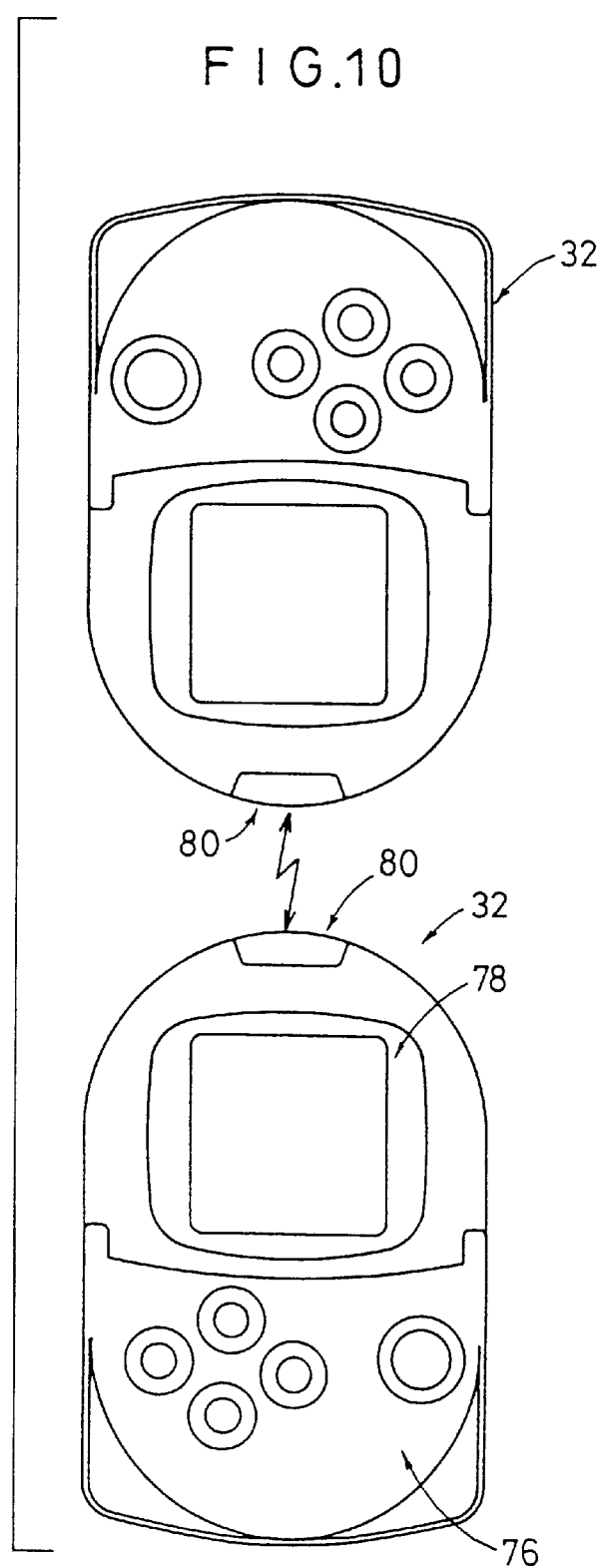
FIG. 10 is a view illustrative of a wireless communication function performed by the terminal.

FIG. 10 schematically illustrates the manner in which wireless communications are carried out between two terminals 32. The wireless communication block 110 of the terminals 32 can send data to and receive data from each other via the windows 80 which serve as wireless communication windows for effecting wireless communications with infrared rays or the like, for thereby sending and receiving internal data between the terminals 32. The internal data includes data transferred from the information apparatus such as the entertainment apparatus 14 or the like and stored in the working memory 114 and the nonvolatile memory 120.

The wireless communication block 110 has a memory 130 as a memory means for temporarily storing wireless signal data. The terminal 32 can selectively receive the data based on information added to the data that have been received and temporarily stored in the wireless communication block 110. Specifically, when the terminal 32 selectively receives the data, the data temporarily stored in the wireless communication block 110 are read into the nonvolatile memory 120.

The working memory 114 serves as a memory means for use as a working area for various data.

The input block 116 is arranged to function as a manual input controller. Therefore, the input block 116 allows the user to enter various items of information into the terminal 32.

The nonvolatile memory 120 serves as a memory means for storing various data. The nonvolatile memory 120 stores data received via the infrared communication unit and data sent from the entertainment apparatus 14 via the serial communication block 118.

The display block 122 is arranged to function as a display unit for displaying various items of information. The display block 122 displays various character information and image information on a liquid crystal panel, for example.

The serial communication block 118 has a function to effect serial communications with an external device. The serial communication block 118 is electrically connectable to a serial communication block 190 (see FIG. 12) of the entertainment apparatus 14, for example, for data communications with the entertainment apparatus 14. The serial communication block 118 is controlled for its communications by the serial communication driver 106 shown in FIG. 8.

The functional block 124 is arranged to perform other functions than the above blocks, and may comprise a sound output block for outputting sound data to a piezoelectric speaker and a power supply block, for example.

The CPU 112 has a function to control the above blocks. For example, the CPU 112 controls the blocks according to various programs, such as the communication application 108, etc. of the above software layer 102.

As shown in FIG. 8, the manual controller 12 comprises a hardware layer 140 and a software layer 142 comprising application software 144 for controlling the hardware layer 140 and performing communications and a serial communication driver 146 included in the application software 144.

Figure 11:
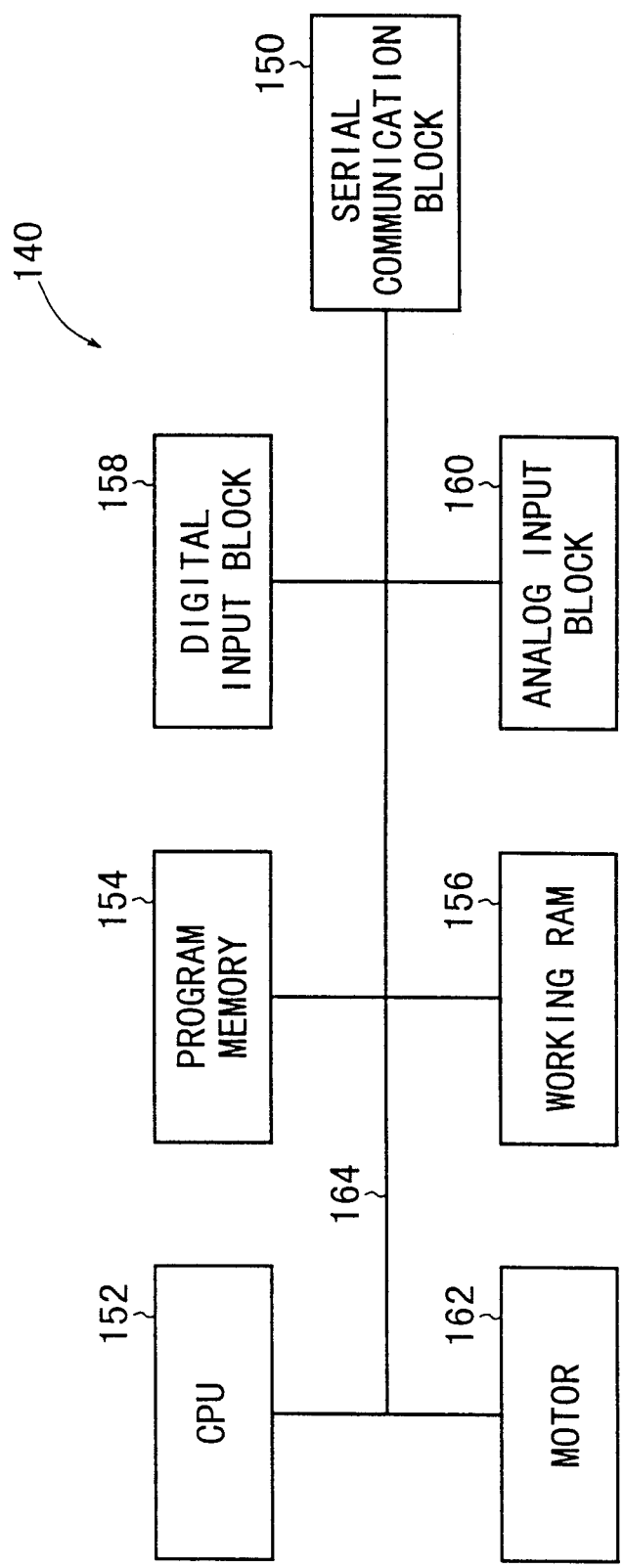
FIG. 11 is a block diagram of the hardware layer of the manual controller.

As shown in FIG. 11, the hardware layer 140 of the manual controller 12 comprises a serial communication block 150, a CPU 152, a program memory 154, a working RAM 156, a digital input block 158, an analog input block 160, and a motor 162. These components of the manual controller 12 are connected to a bus 164.

The digital input block 158 functions as a manual input controller for the first through fourth pressable control members of the first control pad 40 and the second control pad 42. The analog input block 160 functions as a manual input controller for the rotatable control members 48. The digital input block 158 and the analog input block 160 allow the user to enter various items of information into the manual controller 12.

The serial communication block 150 has a function to effect serial communications with an external device. The serial communication block 150 is electrically connectable to the serial communication block 190 of the entertainment apparatus 14, for example, for data communications with the entertainment apparatus 14. The serial communication block 150 is controlled for its communications by the serial communication driver 146.

As shown in FIG. 8, the entertainment apparatus 14 comprises a hardware layer 170 and a software layer 172 comprising application software 174 for controlling the hardware layer 170 and performing communications and image processing, and serial communication drivers 176, 178 included in the application software 174.

Figure 12:
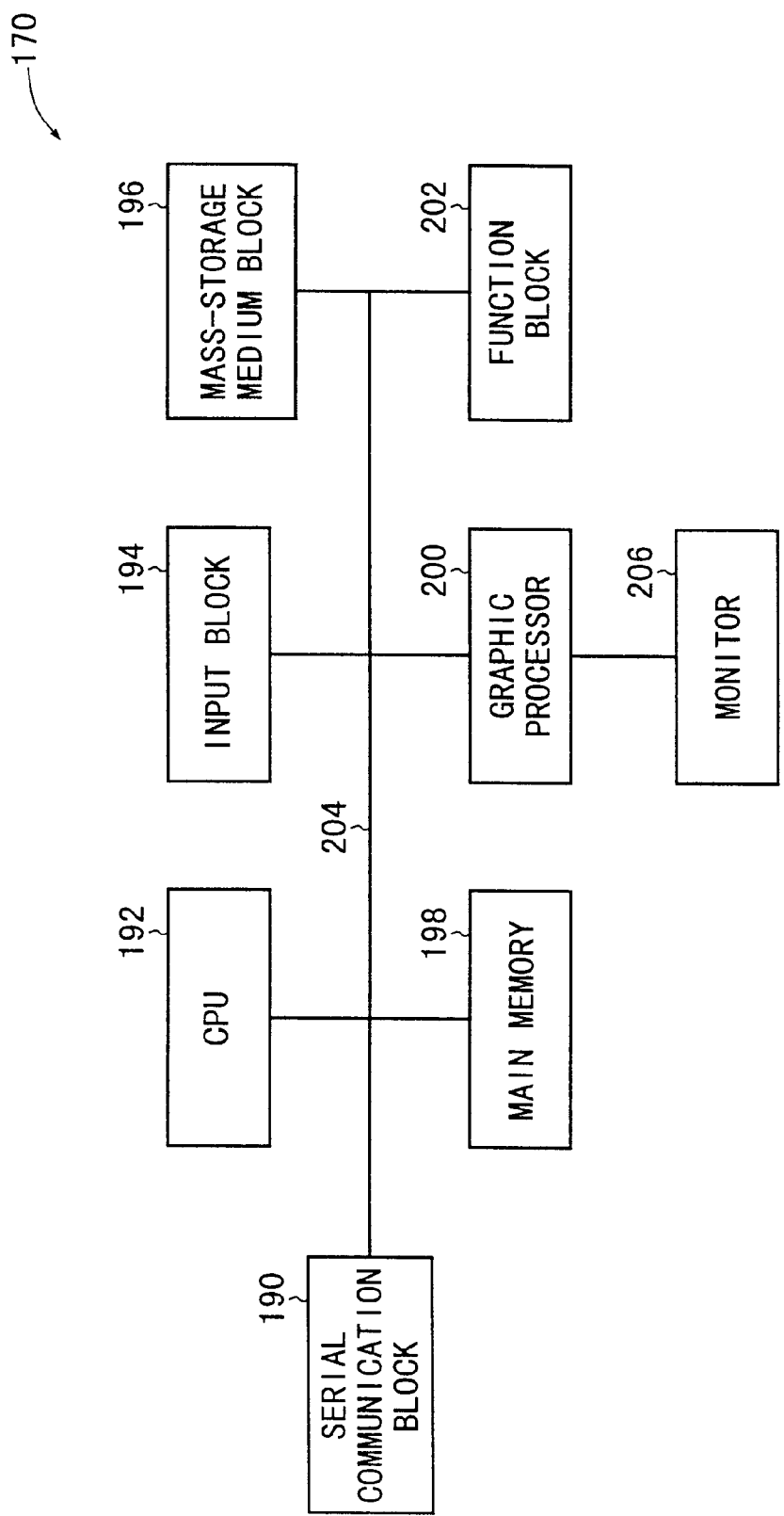
FIG. 12 is a block diagram of the hardware layer of the entertainment apparatus.

As shown in FIG. 12, the hardware layer 170 of the entertainment apparatus 14 comprises the serial communication block 190, a CPU 192, an input block 194, a mass-storage medium block 196, a main memory 198, a graphic processor 200, and a function block 202. These components of the hardware layer 170 are connected to a bus 204.

The input block 194 functions as a manual input controller for allowing the user to enter various items of information into the entertainment apparatus 14.

The main memory 198 serves as a memory means for storing various data. For example, the main memory 198 stores the application software 174 of the software layer 172. The main memory 198 also stores data transmitted from the terminal 32 and the manual controller 12 via the serial communication block 190.

The graphic processor 200 serves as a processor for processing image data. A display monitor 206 is connected to the graphic processor 200 via a display controller such as a programmable CRT controller or the like. The graphic processor 200 performs graphic processing, e.g., polygon graphic processing, for images to be displayed on the display monitor 206.

The mass-storage medium block 196 serves as a unit for reading various, data recorded in a mass-storage medium such as a CD-ROM or the like.

The serial communication block 190 has a function to effect serial communications with an external device. The serial communication block 190 is electrically connectable to the serial communication block 106 of the terminal 32 and the serial communication block 146 of the manual controller 12 for data communications with the terminal 32 and the manual controller 12. The serial communication block 190 is controlled for its communications by the serial communication drivers 176, 178.

The functional block 202 is arranged to perform other functions than the above blocks, and may comprise a power supply block or a connection block for connection to the memory card as a recording medium and the terminal 32, for example.

The CPU 192 functions to control the above blocks of the entertainment apparatus 14. For example, the CPU 192 controls the blocks according to various programs such as the applicationisoftware 174 of the software layer 172.

A characteristic function of the terminal 32, i.e., a video game function, will be described below with reference to FIGS. 13 through 31.

The video game function is a function performed by the terminal 32 to play a roll-playing game (RPG). Particularly, the video game function is a function to carry out a battle mode in which a principal character fights with an imaginary enemy (e.g., a monster), and a competition mode in which a plurality users controls respective imaginary characters to fight against each other via wireless communications (infrared, etc.).

Figure 13:
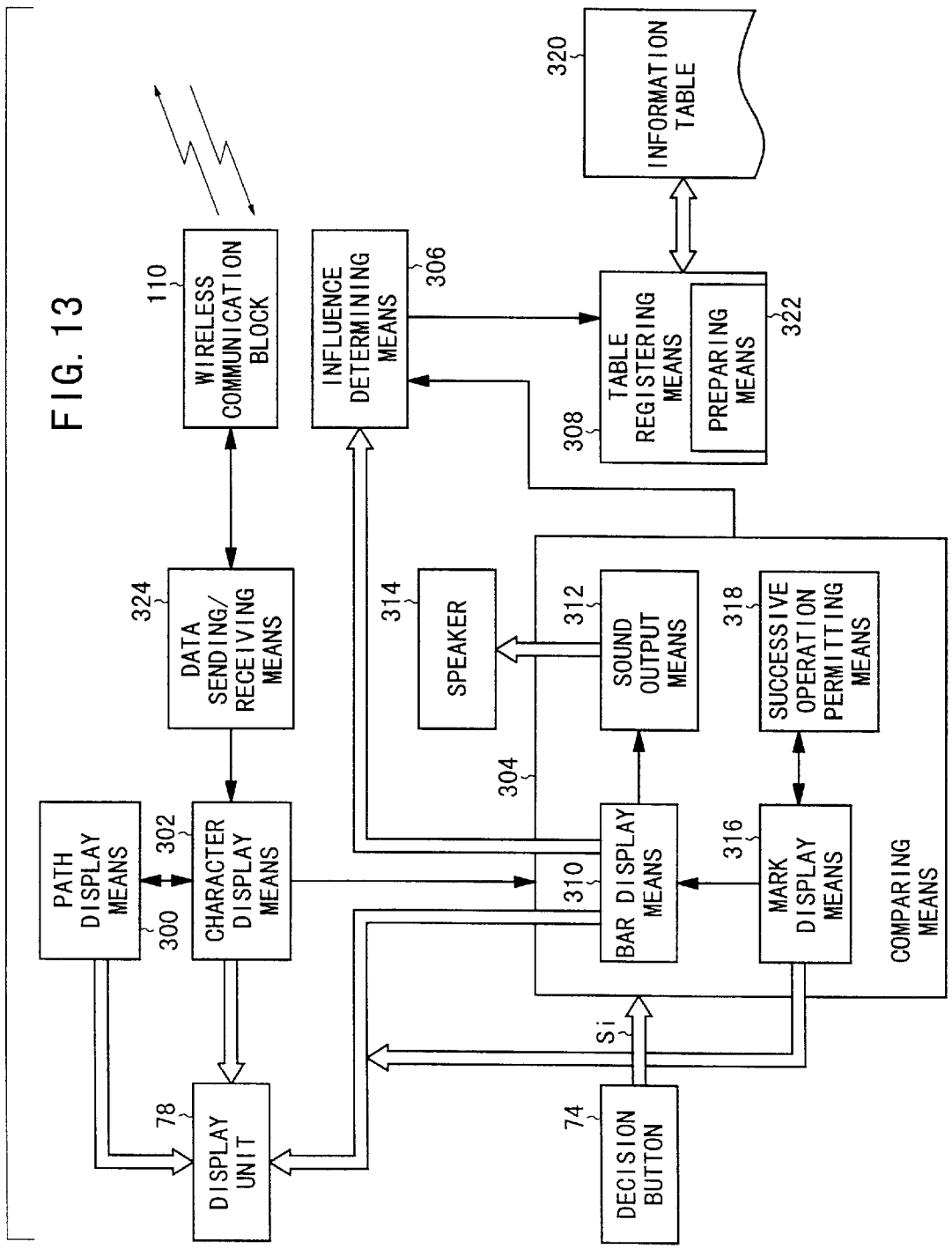
FIG. 13 is a functional block diagram of a video game function incorporated in the terminal.

The video game function is performed by a piece of software which has, as shown in FIG. 13, a path display means 300, a character display means 302 for displaying at least one imaginary character on the display unit 78, a comparing means 304 for comparing the input timing of a control signal Si and the output timing based on a predetermined sequence with each other, an influence determining means 306 for determining the magnitude of an influence on the imaginary character based on the result of comparison from the comparing means 304, and a table registering means 308 for registering information of the imaginary character in an information table, described later on.

The influence includes a numerical value for reducing the level of an imaginary character (imaginary enemy), i.e., a numerical value giving damage, and a numerical value for suppressing a reduction in the level of an imaginary character (imaginary ally), i.e., a numerical value indicative of defense against damage. The control signal Si is entered by the operation of a button, i.e., the decision button 74, on the manual control pad 76 of the terminal 32.

The path display means 300, the character display means 302, the comparing means 304, the influence determining means 306, and the table registering means 308 are downloaded from a certain CD-ROM played back by the entertainment apparatus 14 into the working memory 114 of the terminal 32 according to a predetermined process, and executed by the CPU 112 of the terminal 32.

Figure 14:
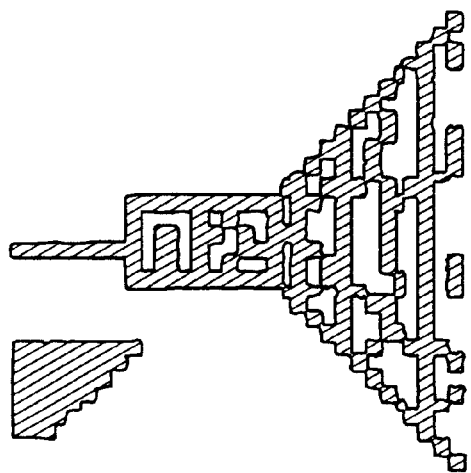
FIG. 14 is a view of a displayed image of a maze in a dungeon.
Figure 15:
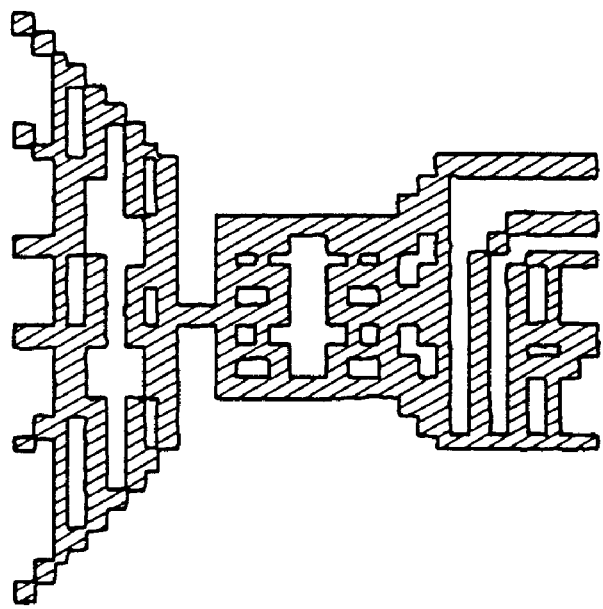
FIG. 15 is a view of another displayed image of the maze in the dungeon.
Figure 16:
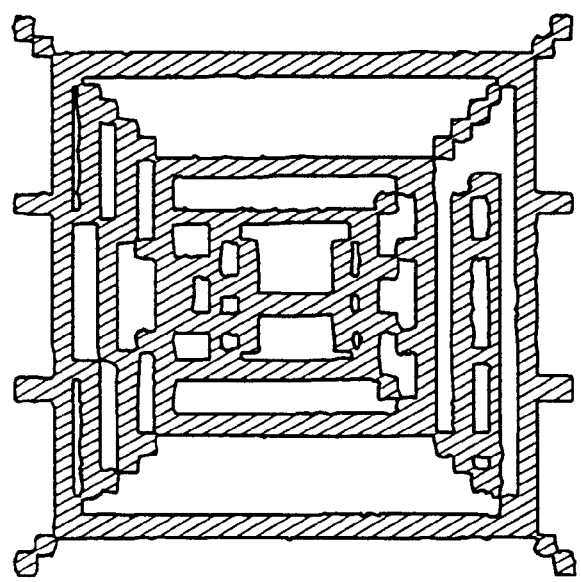
FIG. 16 is a view of still another displayed image of the maze in the dungeon.

As shown in FIGS. 14 through 16, the path display means 300 displays a three-dimensional image of a maze in a dungeon, and displays paths successively in response to operation of the direction keys 72 (72a through 72d).

Figure 17:
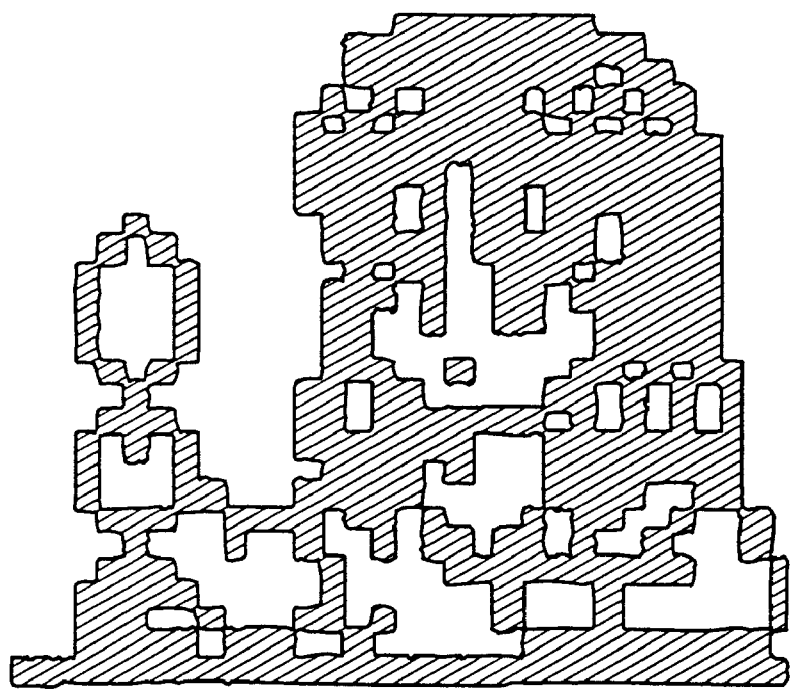
FIG. 17 is a view of a displayed image of a registration place.
Figure 18:
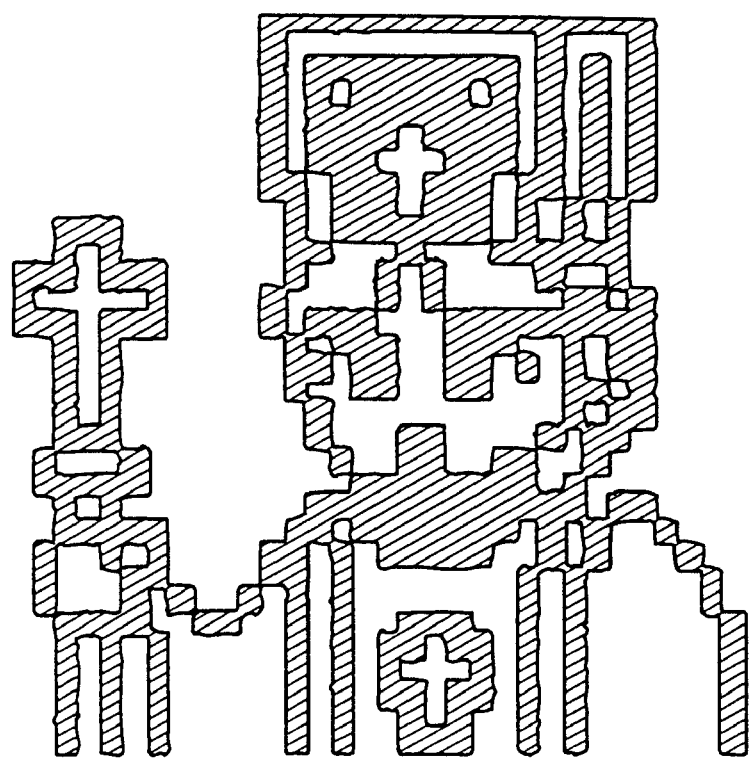
FIG. 18 is a view of a displayed image of a church.
Figure 19:
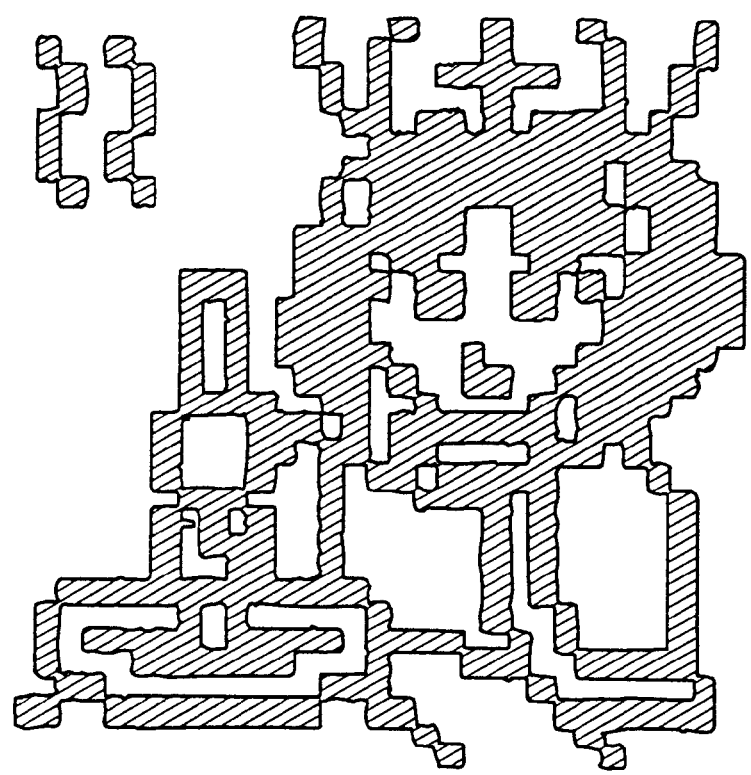
FIG. 19 is a view of a displayed image of a medicine store.
Figure 20:
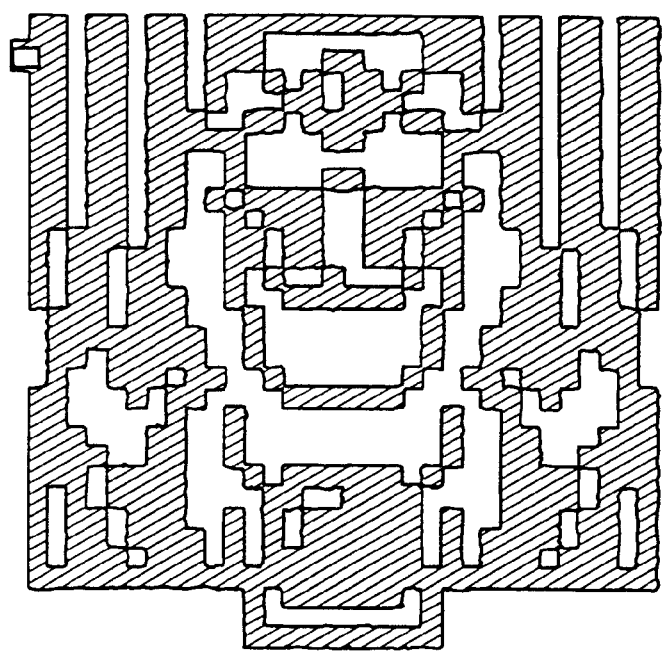
FIG. 20 is a view of a displayed image of a fortune-telling place.
Figure 21:
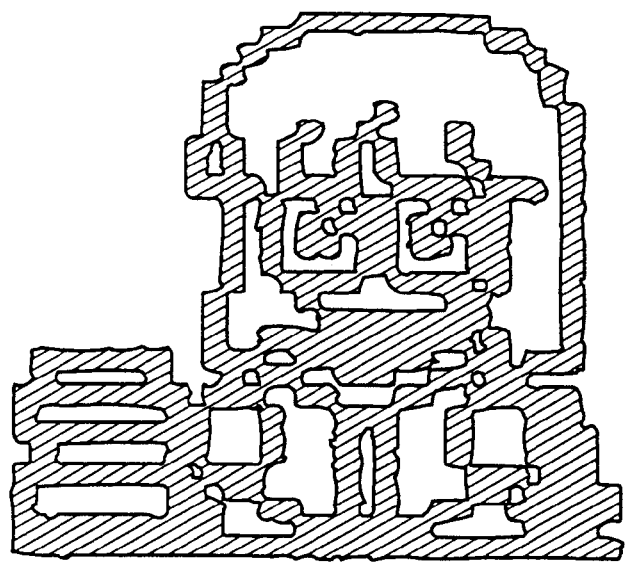
FIG. 21 is a view of a displayed image of a library.

The character display means 302 displays a character depending on a place, e.g., a registration place as shown in FIG. 17, a church as shown in FIG. 18, a medicine store as shown in FIG. 19, a fortune-telling place as shown in FIG. 20, or a library as shown in FIG. 21, at which the principal character arrives in a search mode for searching the maze in the dungeon.

The character display means 302 may have various functions, e.g., to register a defeated monster in the registration place as shown in FIG. 17 (register a defeated monster in an information table, described later on), to give various pieces of advice to the principal character in the church as shown in FIG. 18, to sell a medicine to recover the physical strength at the medicine store as shown in FIG. 19, to tell the today's fortune of the principal character at the fortune-telling place as shown in FIG. 20, and to see a monster picture book at the library as shown in FIG. 21.

In the battle mode and the competition mode, the character display means 302 displays an imaginary enemy (monster) 400 that has showed up on the display unit 78, and also displays a sword grip 402 for the attack side and a shield 404 for the defense side.

The comparing means 304 has a bar display means 310 for displaying the output timing based on a predetermined sequence as an extensible/contractible bar, and a sound output means 312 for outputting a sound signal whose sound varies depending on the extension/contraction of the displayed bar.

The influence determining means 306 is arranged to determine the influence depending on the length of the displayed bar at the time the control signal Si is inputted.

For example, when an imaginary ally (the principal character, an acquired monster, or the like) launches an attack in the game, the influence determining means 306 calculates the influence "m" of the attack based on an influence calculating value L1 (a value for calculating the influence "m") determined by the length of a bar 406 (see FIG. 22) at the time the control signal Si on the attack side is inputted, an influence calculating value L2 determined by the length of a bar 408 at the time the control signal Si on the defense side (imaginary enemy: a monster or the like) is inputted, and a variable a determined by the luck of the attack side while in the battle, the compatibility with the imaginary enemy, and/or the level difference between the attack side and the defense side. For example, the influence "m" of damage caused to the imaginary enemy by the attack side is calculated according to the following equation (1):

$$m = \alpha \cdot (L1/L2) \quad (1)$$

The compatibility with the imaginary enemy represents being able to give large damage when fighting against a fire-based imaginary enemy with a water-based weapon.

When the principal characters defends itself, the influence determining means 306 calculates the influence "n" of the defense against the attack based on an influence calculating value L3 determined by the length of a bar 410 (see FIG. 23) at the time the control signal Si on the defense side is inputted, an influence calculating value L4 determined by the length of a bar 412 at the time the control signal Si on the attack side (imaginary enemy) is inputted, and a variable $\beta$ determined by the luck of the defense side while in the battle, the compatibility with the imaginary enemy, and/or the level difference between the defense side and the attack side. For example, the influence "n" of the defense side is calculated according to the following equation (2):

$$n = \beta \cdot (L4/L3) \quad (2)$$

The comparing means 304 stores the level of the imaginary ally and the level of the imaginary enemy in a predetermined storage area in the working memory 114, and subtracts the influence determined by the influence determining means 306 from the level of the principal character or the level of the imaginary enemy (monster).

For example, when the principal character launches an attack on the imaginary enemy, the influence "m" determined by the attack is subtracted from the level of the imaginary enemy (monster). When the principal character defends itself, the influence "n" determined by the attack launched by the imaginary enemy is subtracted from the level of the principal character.

In this embodiment, the display bar extends and contracts according to different rhythmic patterns depending on the type of the monster which is the imaginary enemy. For example, as the monster has a lower level, the display bar extends and contracts according to a simpler rhythmic pattern, making it easier to measure the timing with which the bar 406 (and the bar 410) extends. As the monster has a higher level, the display bar extends and contracts according to a more complex rhythmic pattern, making it more difficult to measure the timing with which the bar 406 (and the bar 410) extends.

The sound output means 312 changes the frequency, for example, of sounds according to the rhythmic pattern of expansion and contraction of the displayed bar, which is read through the bar display means 310, and then outputs the sounds with the changed frequency to a speaker 314.

Figure 22:
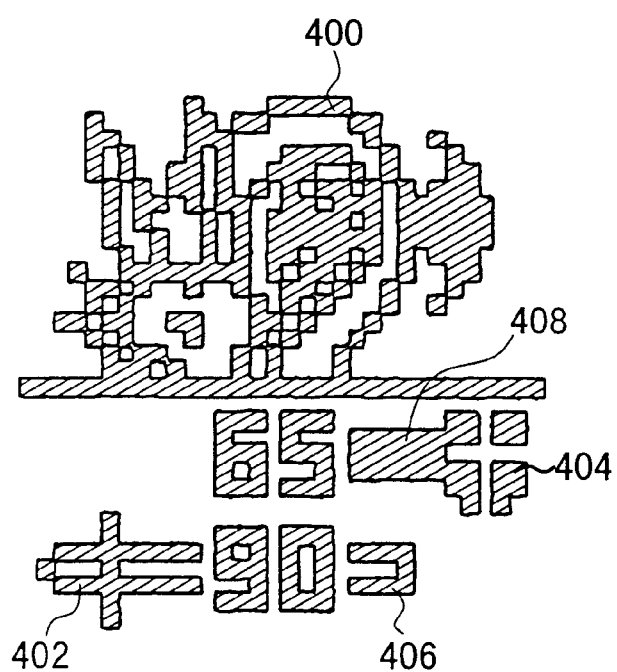
FIG. 22 is a view of a displayed image of an attach turn in a battle mode between a principal character and a monster.

When the principal character launches an attack on the imaginary enemy (attack turn), as shown in FIG. 22, the bar 406 which extends from the sword grip 402 and looks like a sword is displayed as it extends and contracts according to the rhythmic pattern of expansion and contraction depending on the type of the monster which is the imaginary enemy. When the user presses the decision button 74, the length of the bar 406 is determined, thus determining the influence calculating value L1 of damage to be given to the imaginary enemy.

On the side of the monster, the bar 408 extending from the shield 404 is displayed as it extends and contracts according to the above rhythmic pattern. When an imaginary decision button operates based on random numbers, the length of the bar 408 is determined, thus determining the influence calculating value L2 for the imaginary enemy's defense. From these influence calculating values L1, L2, the present influence "m" to be given to the imaginary enemy is determined, and subtracted from the level of the imaginary enemy.

When the principal character defends itself (defense turn), the bar 410 extending from the shield 404 is displayed as it extends and contracts depending on the type of the monster. When the user presses the decision button 74, the length of the bar 410 is determined, thus determining the influence calculating value L3 for defending the principal character.

On the side of the monster, the bar 412 which extends from the sword grip 402 and looks like a sword is displayed as it extends and contracts according to the above rhythmic pattern. When an imaginary decision button operates based on random numbers, the length of the bar 412 is determined, thus determining the influence calculating value L4 for the imaginary enemy's attack. From these influence calculating values L3, L4, the present influence "n" to be given to the principal character is determined, and subtracted from the level of the principal character.

The above process is repeated until the level of the monster or the level of the principal character reaches "0", when the battle mode is ended.

There may be added a function to forcibly end the battle mode. According to this function, when the bar 406 becomes the longest in an attack launched by the principal character, the battle mode can forcibly be ended by pressing one of the direction keys, e.g., the direction key 72d. This function is preferred when there is no chance to win the game or an item is being searched for in the dungeon.

Figure 24:
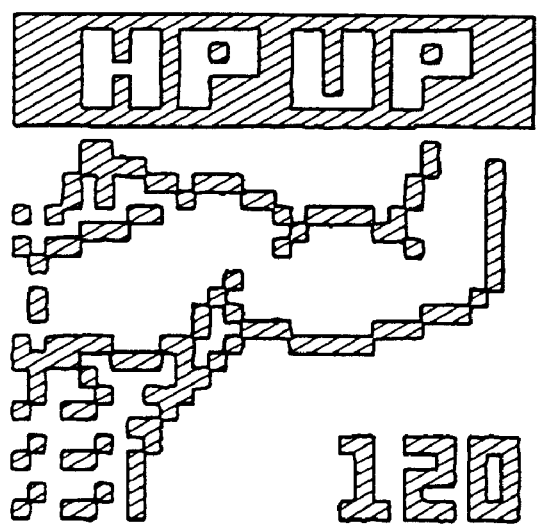
FIG. 24 is a view of a displayed image of the principal character at an increased level.
Figure 25A:
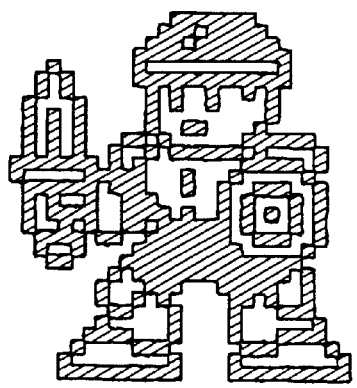
FIGS. 25A and 25B are views showing the manner in which the equipment of the principal character is improved as the level increases.
Figure 25B:
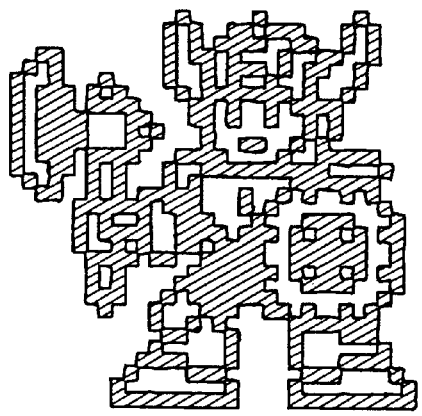
Figure 26:
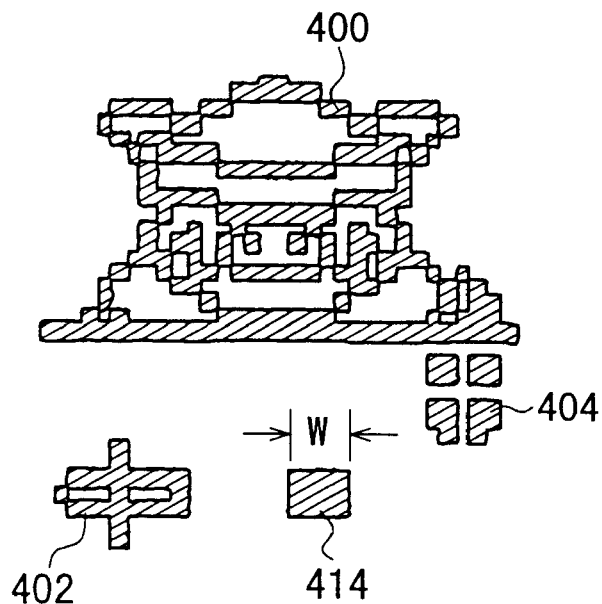
FIG. 26 is a view showing a mark which is displayed in a flickering pattern prior to the display of a bar.

Each time the monster is defeated in the battle mode, the level of the principal character is increased. When the status of the principal character is displayed by the character display means 302, images of the principal characters with increased levels may be displayed as shown in FIGS. 24, 25A, and 25B. FIG. 24 shows that the physical strength of the principal character has increased to "120", and FIGS. 25A and 25B show that the equipment of the principal character is improved as the level increases.

The comparing means 304 also has a mark display means 316 for displaying a mark 414 (see FIG. 26) indicative of a capability of successive operations relative to influence in a flickering fashion, for example, in an arbitrary position within a bar display area prior to the display of the bar representing the output timing by the bar display means 310, and a successive operation permitting means 318 for allowing the decision button 74 to be operated successively if the time when the tip end of the bar displayed by the bar dis25 play means 310 touches the display area of the mark 414 agrees with the input timing of the control signal Si.

The mark 414, which is displayed in a flickering pattern, has its displayed position and width "w" varying randomly as attack and defense turns are in progress. As the displayed width "w" of the mark 414 grows larger, the probability that the tip end of the bar 406 can be stopped in the displayed area of the mark 414 becomes higher, making it easy to operate the decision button 74 successively.

The displayed width "w" can be varied depending on the luck of the principal character, etc. For example, when the principal character is fortunate enough, the mark 414 with a wider displayed width "w" appears highly frequently, and when the principal character has bad luck, the frequency of appearance of the mark 414 with a wider displayed width "w" is lowered.

Figure 27:
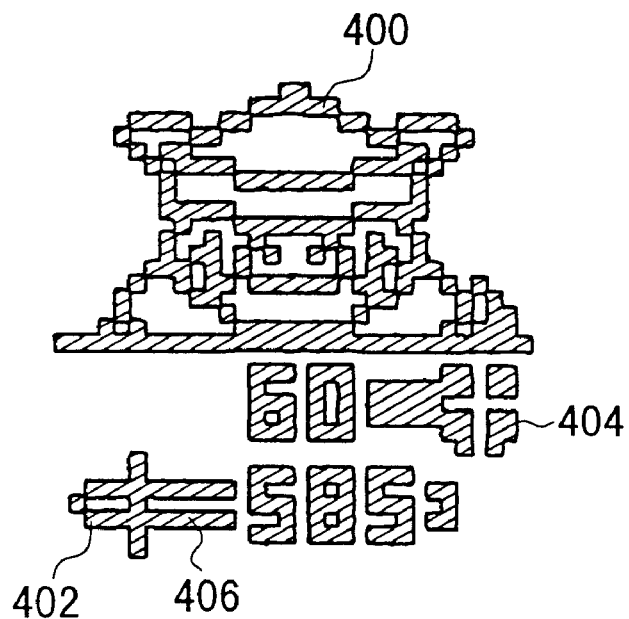
FIG. 27 is a view showing a calculated influence value set to '585' by successive operations.

In attacking the imaginary enemy, as shown in FIG. 27, when the decision button 74 is operated at the time the tip end of the displayed bar touches the displayed area of the mark 414, damage can successively be caused to the imaginary enemy. Stated otherwise, the influence calculating value L1 determined by the length of the bar 406 is accumulated by the successive operations, and the influence "m" is calculated based on the accumulated influence calculating value L1 according to the equation (1) and subtracted from the level of the imaginary enemy.

In defending the principal character itself, when the decision button 74 is operated at the time the tip end of the displayed bar touches the displayed area of the mark 414, the principal character can successively defend itself against the attack from the imaginary enemy. Stated otherwise, the influence calculating value L3 determined by the length of the bar 406 is accumulated by the successive operations, and the influence "n" is calculated based on the accumulated influence calculating value L3 according to the equation (2) and subtracted from the level of the principal character. FIG. 27 shows an example in which the influence calculating value is set to 585 by the successive operations in the case the influence calculating value L1 is 100 when the length of the bar is the greatest.

The table registering means 308 registers information of the imaginary character effectively in an information table 320 when the level of the imaginary enemy is "0" or makes invalid the information of the imaginary ally (e.g., an acquired monster) which has been effectively registered in the information table 320 when the level of the imaginary alloy is "0".

As shown in FIG. 28, the information table 320 has as many records as the number of monsters handled by the video game function, each record containing a monster number, a level, an image number, an attribute, a pattern number, information as to whether the monster is registered or not, and appearance information.

The image number indicates the number of a record (image number) where an image of a monster corresponding to the monster number is registered, of image files in which image patterns of monsters are registered.

The character display means 302 searches for a record in the information table 320 based on the monster number of an appearing monster, reads the image data of the monster from the image file based on the image number registered in the record, and displays the image of the monster on the display unit 78 based on the read image data.

When the principal character launches an attack, as shown in FIG. 22, the character display means 302 displays the sword grip 402 in a lower portion of the display unit 78, and also displays the shield 404 immediately below the displayed area of the monster 400.

Figure 23:
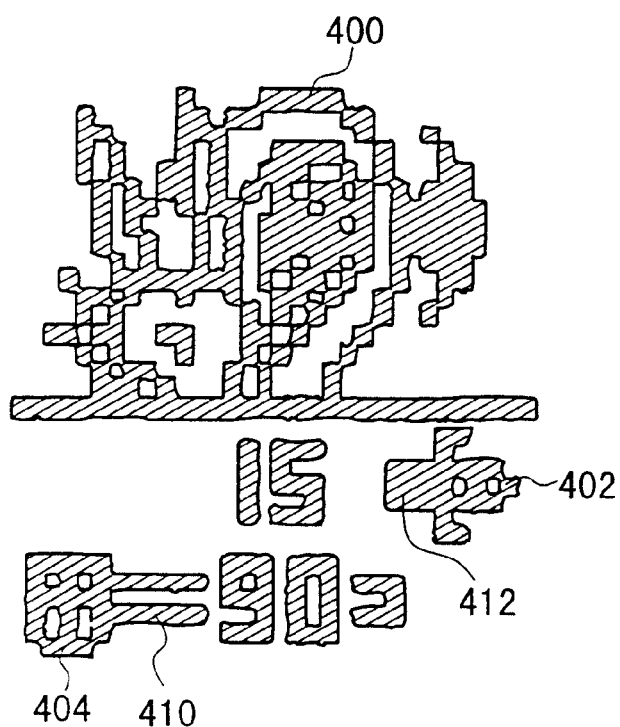
FIG. 23 is a view of a displayed image of a defense turn in the battle mode between the principal character and the monster.

When the principal character defends itself, as shown in FIG. 23, the character display means 302 displays the shield 404 in a lower portion of the display unit 78, and also displays the sword grip 402 immediately below the displayed area of the monster 400.

The attribute represents the attribute (water-based, fire-based, etc.) of the monster, and is expressed by numbers, e.g., "0" for water-based, "1" for fire-based, and "2" for wind-based.

The pattern number represents the number of a record (pattern number) where a pattern corresponding to the monster number is recorded, of pattern files in which rhythmic patterns of expansion and contraction of the displayed bar are registered.

The bar display means 310 searches for a record in the information table 320 based on the monster number of an appearing monster, reads the rhythmic pattern of expansion and contraction of the displayed bar of the monster from the pattern file based on the pattern number registered in the record, and displays the image of the bar extended and contracted according to the read rhythmic pattern on the display unit 78.

The information as to whether the monster is registered or not represents whether the principal character has acquired the monster in the battle or not. When the level of the monster is set to "0" in the battle mode, the monster is effectively registered, and "1", for example, is registered as the information. The initial value is "0", indicative of an unacquired monster.

The appearance information is information as to a time zone in which the monster appears and the frequency of appearance of the monster. For example, for a nocturnal monster, information as to a night time zone (e.g., PM 9:00 to AM 3:00) and a percentage (50%, etc.) indicative of the frequency of appearance of the monster is stored.

The table registering means 308 has a preparing means 322 for preparing for effectively registering information of an imaginary enemy in the information table 320 when the level of the imaginary enemy becomes "0" in the battle mode. When the completion of a certain process is detected, the information of the imaginary enemy prepared by the preparing means 322 is effectively registered in the information table 320.

Specifically, when the level of the imaginary enemy becomes "0", the preparing means 322 stores the monster number of the imaginary enemy is stored in a register. When the imaginary ally (normally the principal character) goes to a certain place, e.g., the registration place shown in FIG. 17, and performs a procedure to register the monster, the monster is effectively registered in the record corresponding to the monster number stored in the register in the information table 320. That is, "1" is stored as the information as to whether the monster is registered or not. Therefore, the monster corresponding to the monster number is acquired by the principal character.

Figure 29:
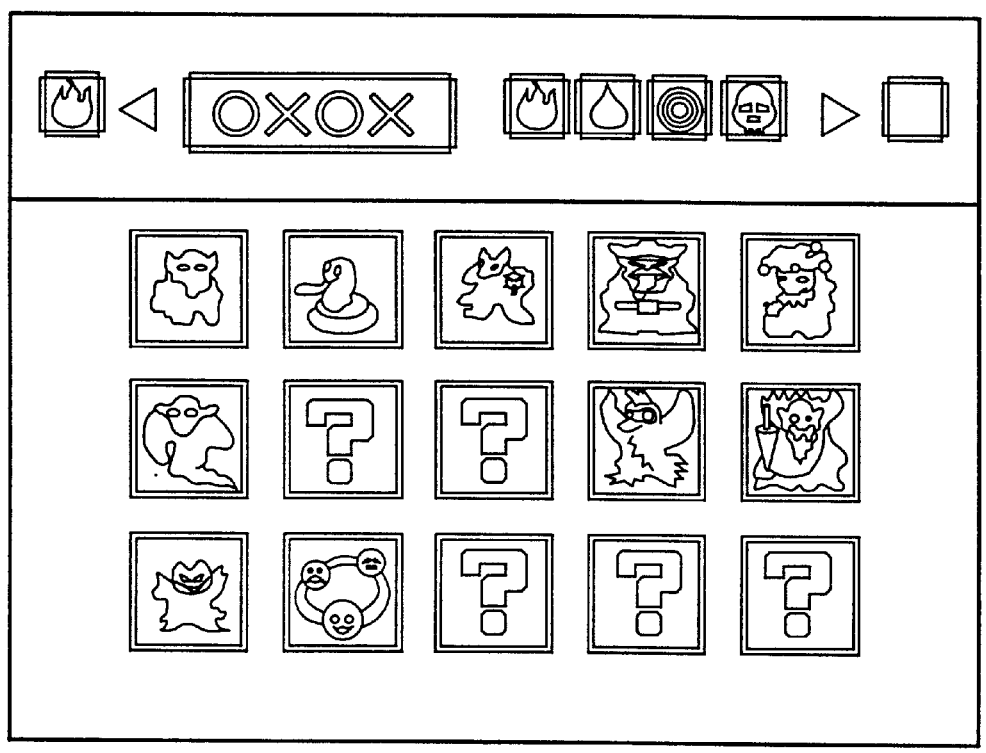
FIG. 29 is a view showing a displayed monster picture book.

When the terminal 32 is connected to the entertainment apparatus 14, the information registered in the information table 320 can be displayed as a monster picture book on the display monitor 206 (see FIG. 12) by the entertainment apparatus 14, as shown in FIG. 29.

Figure 30:
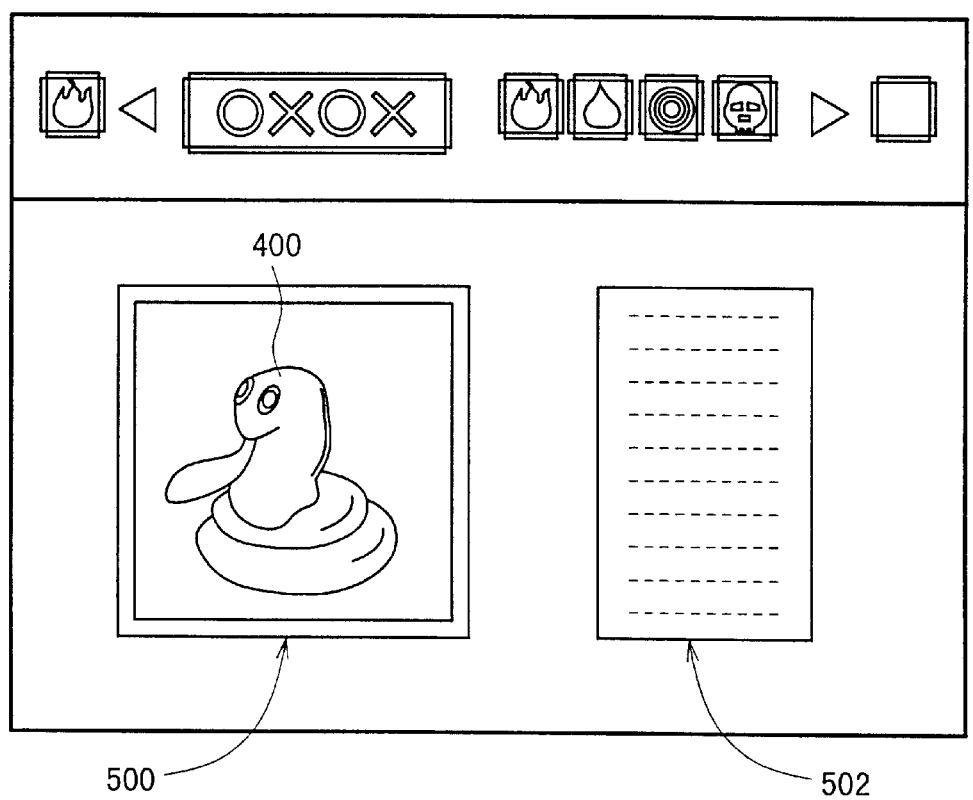
FIG. 30 is a view showing a first display type for individually displayed monsters.
Figure 31:
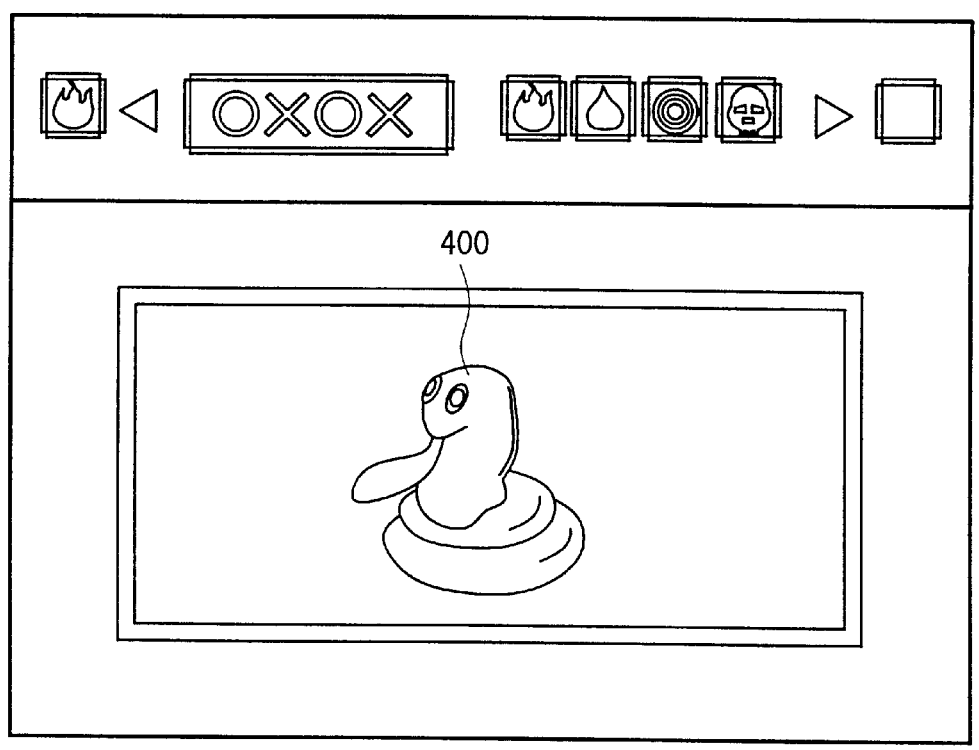
FIG. 31 is a view showing a second display type for individually displayed monsters.

The monster picture book includes a displayed list of monsters according to attributes, as shown in FIG. 29, and individually displayed monsters each selected from the displayed list of monsters, as shown in FIGS. 30 and 31. The displayed list of monsters shown in FIG. 29 is successively updated when the third and fourth control pads 44, 46 (see FIG. 1) of the manual controller 12 are operated.

The individually displayed monsters can be presented in a first display type which comprises a still image 500 of a monster 400 and a profile 502 thereof, as shown in FIG. 30, and a second display type which represents an animated display of characteristic actions of the monster 400, as shown in FIG. 31.

The video game function has a data sending/receiving means 324 for allowing a plurality of users to compete against each other at any time in any place by way of wireless communications (e.g., infrared communications).

As the competition mode begins, the data sending/receiving means 324 sends the number of a competing monster from each terminal 32 to opponent terminals 32 by way of infrared communications. Each terminal 32 receives the data sent from the opponent terminals 32 via the data sending/receiving means 324, and stores the received data in a predetermined area of the working memory 114.

The character display means 302 searches for the record in the information table based on the monster number which has been sent, reads the level registered in the record, and stores the level in a predetermined area of the working memory 114.

The character display means 302 reads image data of the monster from the image file based on the image number registered in the record, and displays an image of the monster as the imaginary enemy on the display unit 78. In this manner, each terminal 32 displays an opponent's monster.

The data sending/receiving means 324 sends data relative to the display of the mark in the imaginary ally (its own monster) and the display of the extensible/contractible bar to an opponent terminal 32 on a real-time basis, and also sends the display data of the bar which has stopped being extended and contracted and the influence calculating values based on the operation of the decision button 74. The display data and the influence calculating values are received by the opponent terminal 32, which displays the mark and the extensible/contractible bar immediately below the displayed area of the monster on the display unit 78, and then displays the bar which has stopped being extended and contracted and the influence calculating values.

A terminal 32 which is in an attack turn determines an influence "m" to be given to the opponent's monster based on the influence calculating value L1 to be given to the opponent's monster which has been determined by the terminal 32 itself, and the influence calculating value L2 for the opponent's defense which has been sent from the opponent's terminal, and subtracts the determined influence "m" from the level of the opponent's monster which is stored in the predetermined area in the working memory.

A terminal 32 which is in a defense turn determines an influence "n" to be added to its own monster based on the influence calculating value L3 for defending its own monster which has been determined by the terminal 32 itself, and the influence calculating value L4 relative to the attack which has been sent from the opponent's terminal, and subtracts the determined influence "n" from the level of its own monster.

The above process in the competition mode is repeated until the level of the its own monster or the level of the opponent's monster becomes "0", whereupon the competition mode is finished.

At this time, if the opponent's monster becomes "0", then the opponenit's monster is judged as being acquired, and the monster is effectively registered in the record corresponding to the opponent's monster number in the information table 320. That is, "1" is stored as the information as to whether the monster is registered or not.

Conversely, if the level of the its own monster becomes "0", then its own monster is judged as being captured, and the monster is made invalid in the record corresponding to the its own monster number in the information table 320. That is, "0" is stored as the information as to whether the monster is registered or not. Alternatively, the information as to whether the monster is registered or not may not be entered.

In the terminal 32 according to the present embodiment, therefore, it is possible to play a game, i.e., a roll-playing game (RPG), by having an imaginary character walk in a maze, a field, or a dungeon, fighting against a monster that shows up, and increasing the level of the imaginary character with respect to its physical strength and intelligent ability based on the experience of the fight.

Particularly, the comparing means 304 has the bar display means 310 for displaying the output timing based on a predetermined sequence as an extensible/contractible bar, and the influence determining means 306 determines the magnitude of an influence based on the length of the displayed bar at the time the control signal Si is inputted. Therefore, the user can enter the control signal Si while viewing the displayed bar 406 (or 410) as it extends and contracts. For example, the user can enter the control signal Si at the output timing when the displayed bar 406 (or 410) is the longest, for thereby increasing the influence on the imaginary character.

Thus, the user can enter the control signal Si while observing the rhythmic pattern of expansion and contraction of the displayed bar, in order to give substantial damage to the opponent (monster, etc.).

This allows the user to be able to fight against strong monsters on an even ground through training in a simple environment without having to resort to sophisticated skills as by memorizing a number of complex curses and taking a necessary item from a number of items. Therefore, children, e.g., elementary school pupils, can enjoy the battle mode in RPGs, and hence the terminal 32 will find widespread use among a diverse range of users.

The battle mode, for example, can be made more interesting by arbitrarily changing the pattern of extension and contraction of the displayed bar depending on the imaginary character. The sound output means 312 for outputting a sound signal whose sound varies depending on the extension/contraction of the displayed bar allows the user to recognize how long the bar has extended by listening to changes in the outputted sound without having to viewing the rhythmic pattern of expansion and contraction of the displayed bar. Consequently, the user can enjoy the battle mode while seeing the other user's face, for example, when the two users compete with each other in the game.

The comparing means 304 has the mark display means 316 and the successive operation permitting means 318. These means allow the user to operate the decision button 74 when the tip end of the displayed bar touches the displayed area of the mark 414, for thereby successively influencing the opponent. For example, the accumulated value of the influence achieved by the successive operations can be given as damage to the opponent, so that the principal character whose level is low can defeat a strong monster in an RPG.

In this embodiment, the table registering means 308 can register imaginary enemies (monsters) defeated in the battle mode and the competition mode, allowing the registered imaginary enemies to be observed in a monster picture book, for example.

Furthermore, the data sending/receiving means 324 allows a plurality of users to compete against each other at any time in any place by way of wireless communications (e.g., infrared communications). This contributes to the widespread use of the terminal 32.

Specific processing operation of a video game processing means according to the present embodiment will be described below with reference to the functional block diagram shown in FIG. 13, flowcharts shown in FIGS. 32 through 52, and tables shown in FIGS. 53 through 56.

Figure 32:
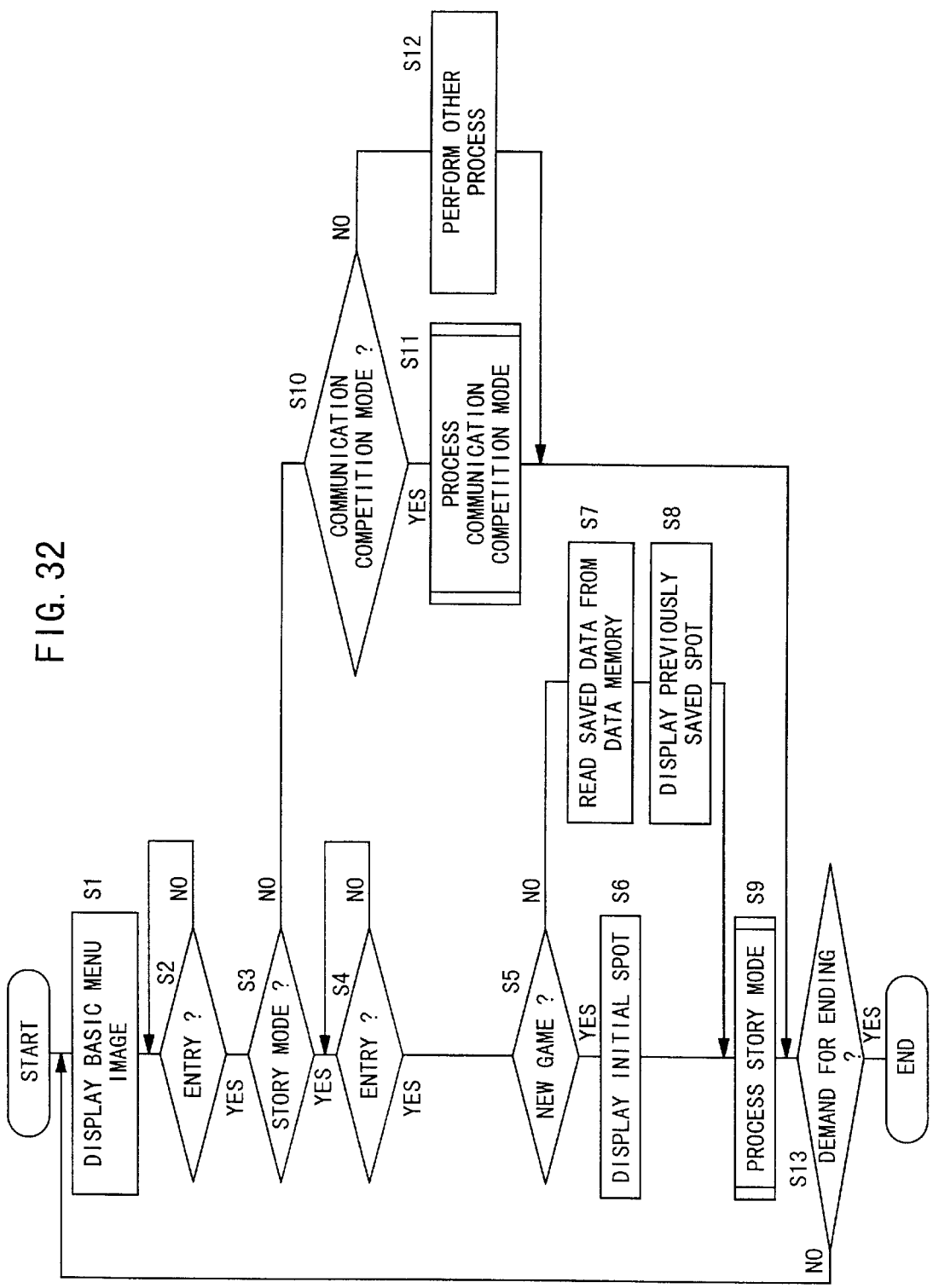
FIG. 32 is a flowchart of a processing sequence of a video game processing means.

As shown in FIG. 32, the video game processing means displays a basic menu image in step S1, and then waits for a control entry from the manual control pad 76 in step S2. If there is a control entry from the manual control pad 76, then the video game processing means determines whether the control entry indicates a story mode or not in step S3.

If the control entry indicates a story mode, then the video game processing means waits for a control entry from the manual control pad 76 in step S4. If there is a control entry from the manual control pad 76, then the video game processing means determines whether the control entry indicates a NEW game or not in step S5.

If the control entry indicates a NEW game, then the path display means 300 displays an initial spot. If the game is to be continued from the previous game session, then control goes to step S7 in which the path display means 300 reads saved data from the nonvolatile memory 120. In step S8, the path display means 300 displays a previously saved spot. Thereafter, the video game processing means processes the story mode in step S9.

If the control entry does not indicate a story mode in step S3, then control goes to step S10 in which the video game processing means determines whether the control entry indicates a communication competition mode or not. If the control entry indicates a communication competition mode, then the video game processing means processes the communication competition mode in step S11.

If the control entry indicates otherwise in step S10, the video game processing means performs another process depending on the control entry in step S12.

In step S13, the video game processing means determines whether there is a demand (e.g., a power supply turn-off) for ending the video game processing or not. If there is no demand for ending the video game processing, then control goes back to step S1, and the video game processing means displays a basic menu image to wait for a next control entry. If there is a demand for ending the video game processing, then the processing operation of the video game processing means comes to an end.

Figure 33:
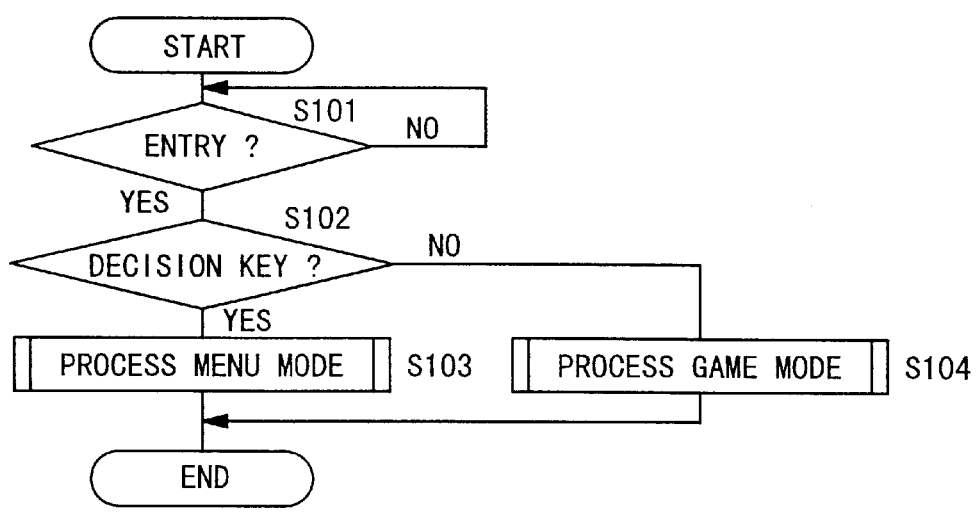
FIG. 33 is a flowchart of a processing sequence of a story mode.

Processing operation of the video game processing means in the story mode will be described below with reference to FIG. 33. The video game processing means waits for a control entry from the manual control pad 76 in step S101. If there is a control entry from the manual control pad 76, then the video game processing means determines whether the control entry comes from the decision key or not in step S102.

If the control entry comes from the decision key, then the video game processing means enters a menu mode in step S103. If the control entry comes from a direction key, then the video game processing means enters a game mode in step S104.

When the processing of the menu mode or the processing of the game mode is finished, the story mode comes to an end.

Figure 34:
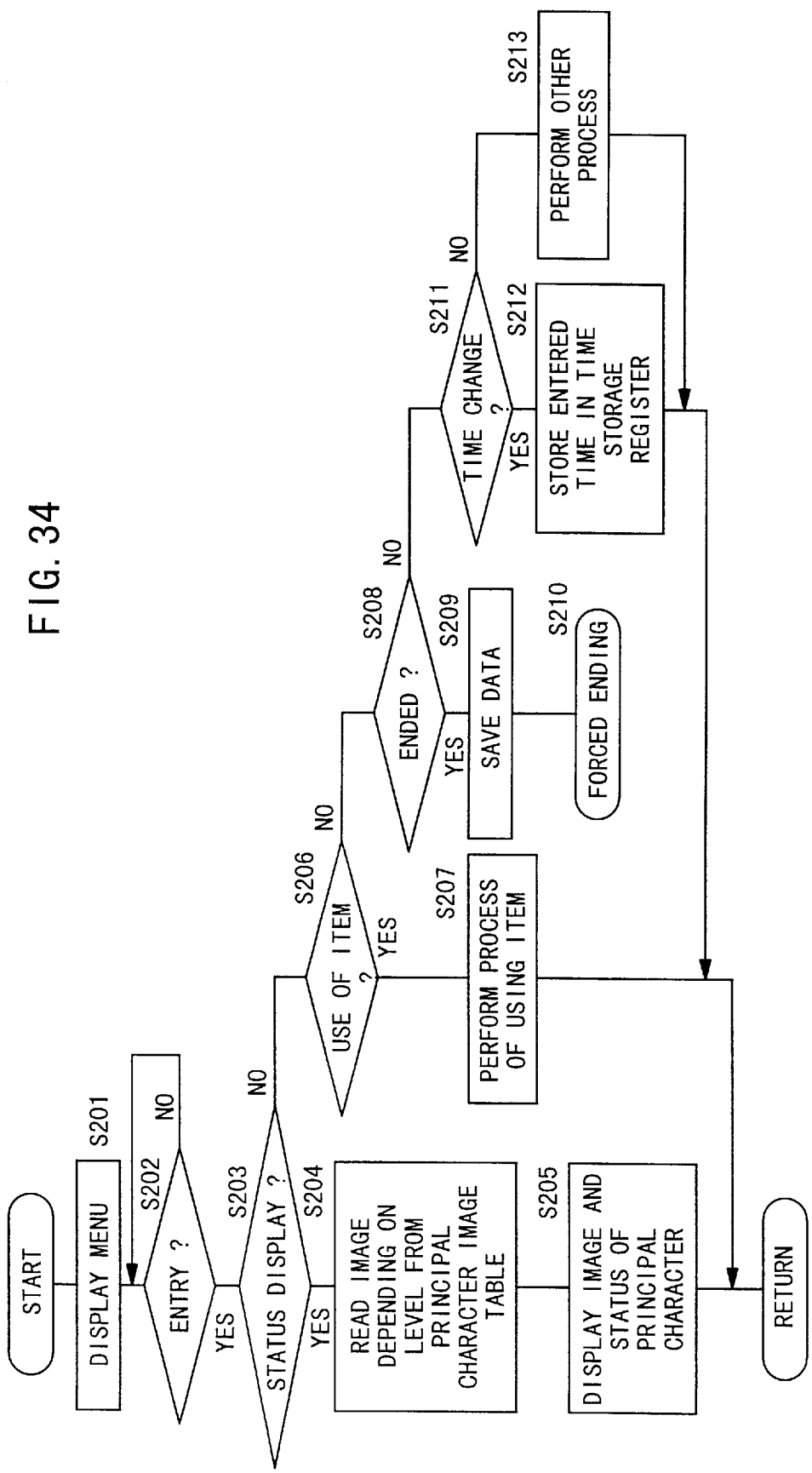
FIG. 34 is a flowchart of a processing sequence of a menu mode.

Processing operation of the video game processing means in the menu mode will be described below with reference to FIG. 34. The video game processing means displays a menu in step S201. The displayed menu includes the status of the principal character, the use of an item, an end (save data), the change of time, etc.

In step S202, the video game processing means waits for a control entry from the manual control pad 76. If there is a control entry from the manual control pad 76, then control goes to step S203 in which the video game processing means determines whether the control entry indicates a status display or not.

If the control entry indicates a status display, then the video game processing means reads image data depending on the level of the principal character from a principal character image table (see FIG. 53) in step S204, and then displays the image of the principal character and its statuses {HP (hit point, i.e., physical strength), attack power, defense power, level, experience value, money in hand, etc.} on the display unit. At this time, the image of the principal character depending on the increased level is displayed as shown in FIGS. 24, 25A, or 25B. The displayed image of the principal character allows the user to confirm the present equipment and condition of the principal character on sight.

If the control entry does not indicate a status display in step S203, then the video game processing means determines whether the control entry indicates the use of an item or not in step S206.

If the control entry indicates the use of an item, then the video game processing means carries out a process of using an item that is presently carried by the principal character in step S207. Specifically, a menu of items is displayed, and one of the items, e.g., medicines, is selected from the menu. The selected medicines are displayed, and one of the medicines to be used is selected with a left or right button. Then, the decision button is pressed to use the selected medicine. The remaining number of times that the medicine can be used is also displayed.

If the control entry does not indicate the use of an item in step S206, then the video game processing means determines whether the control entry indicates an end or not in step S208. If the control entry indicates an end, then control goes to step S209 in which the video game processing means saves present data in an indicated block in a data memory of the terminal, after which the menu mode is forcibly brought to an end in step S210.

If the control entry does not indicate an end in step S208, then control proceeds to step S211 in which the video game processing means determines whether the control entry indicates the change of time or not. If the control entry indicates the change of time, then the video game processing means stores an entered time (time information) in a time information register in step S212. The time information stored in the time information register is successively updated based on a reference clock signal outputted from a timer in the terminal.

If the control entry does not indicate the change of time, but indicates otherwise in step S211, then the video game processing means performs another process depending on the control entry in step S213. The other process may be a process of displaying a monster which has provisionally been registered. A monster is provisionally registered when the principal character has defeated the monster in a competition. The provisionally registered monster can completely be registered when the principal character goes to the registration place and registers the monster.

Processing operation of the video game processing means in the game mode will be described below with reference to FIGS. 35 and 36. The path display means 300 displays a path depending on a direction key which has been operated in step S301 shown in FIG. 35.

Figure 54:
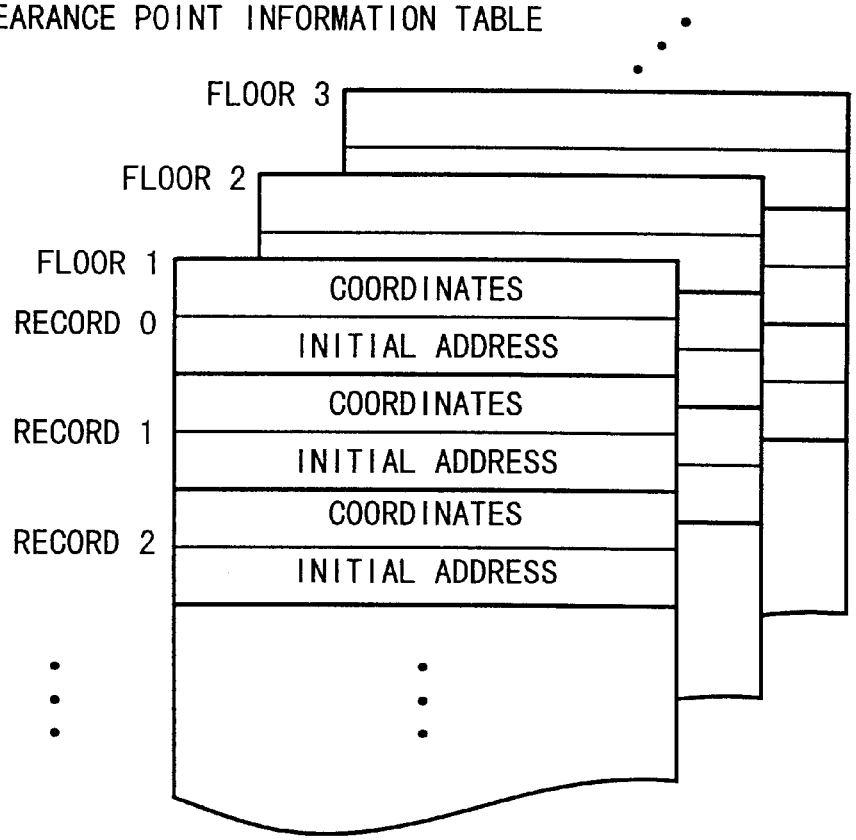
FIG. 54 is a diagram showing details of an appearance point information table.
Figure 55:
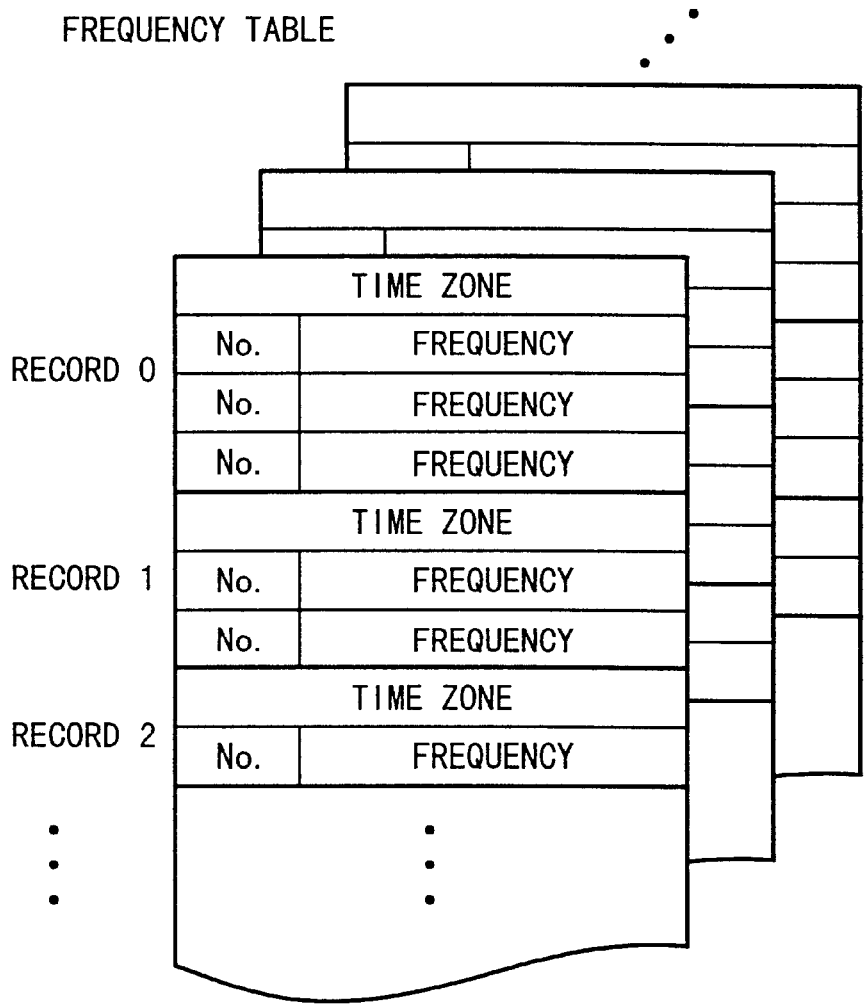
FIG. 55 is a diagram showing details of a frequency table.
Figure 57:
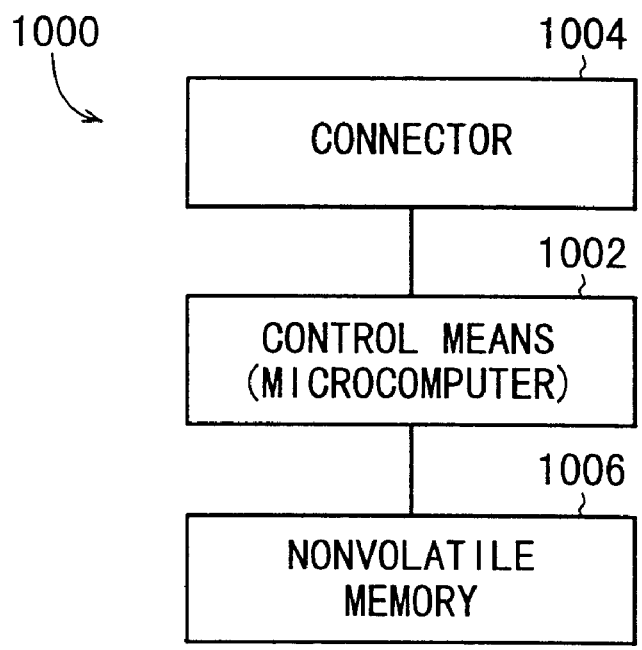
FIG. 57 is a block diagram of an arrangement of major components of an ordinary memory card device.
Figure 58:
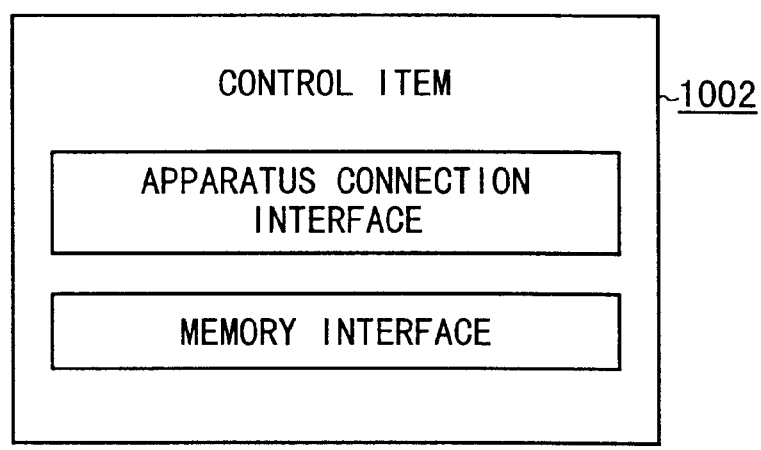
FIG. 58 is a diagram showing control items performed by a control means of the ordinary memory card device.

In step S302, the video game processing means reads the present number of floors and stores the number of floors in a register Rn. Then, the video game processing means reads an appearance point information table depending on the number of floors in step S303. As shown in FIG. 54, there are as many appearance point information tables as the number of floors. Each of the appearance point information tables contains coordinate data and the initial address of a corresponding frequency table, which are registered in each record. As shown in FIG. 55, there are as many frequency tables as the number of appearance points. Each of the frequency tables contains a combination of a time zone, the monster numbers of monsters that show up, and the frequencies indicative of appearance probabilities.

If the appearance probability of the monster having the monster number 1 is 70%, the appearance probability of the monster having the monster number 2 is 20%, and the appearance probability of the monster having the monster number 3 is 10%, then the frequency is "0, 1, 2, 3, 4, 5, 6" for the monster number 1, "7, 8" for the monster number 2, and "9" for the monster number 3.

The monster which corresponds to the monster number having the same frequency as random numbers from 0 to 9 is selected as a monster to appear at present. For a time zone in which no monster appears at all, an initial value of "0", for example, is registered.

In step S304, the video game processing means determines present coordinates on the floor from the type of a direction key that has been pressed and the number of times that the direction key has been pressed. Thereafter, the video game processing means compares coordinate data registered in the appearance point information table for the floor with the present coordinates to determine whether the present coordinates represent an appearance point or not, in step S305.

If the present coordinates represent an appearance point, then control goes to step S306 in which the video game processing means reads the initial address of the frequency table corresponding to the present coordinates. Then, the video game processing means reads the present time from the time information register in step S307.

In step S308, the video game processing means reads a record corresponding to the present time based on the information of the time zone, from the frequency table having the initial address. Thereafter, the video game processing means determines whether there is a monster that shows up in step S309 shown in FIG. 36.

If there is a monster that shows up, then control proceeds to step S310 in which the video game processing means generates random numbers ranging from 0 to 9. The video game processing means reads a monster number having the frequency which agrees with the generated random numbers in step S311.

In step S312, the video game processing means reads a record corresponding to the monster number from the information table 320.

In step S313, the video game processing means reads image data of the monster from the image file based on the image number registered in the record, and controls the character display means 302 to display an image of the monster on the display unit 78 based on the image data. Thereafter, the video game processing means enters the competition mode in step S314.

Figure 35:
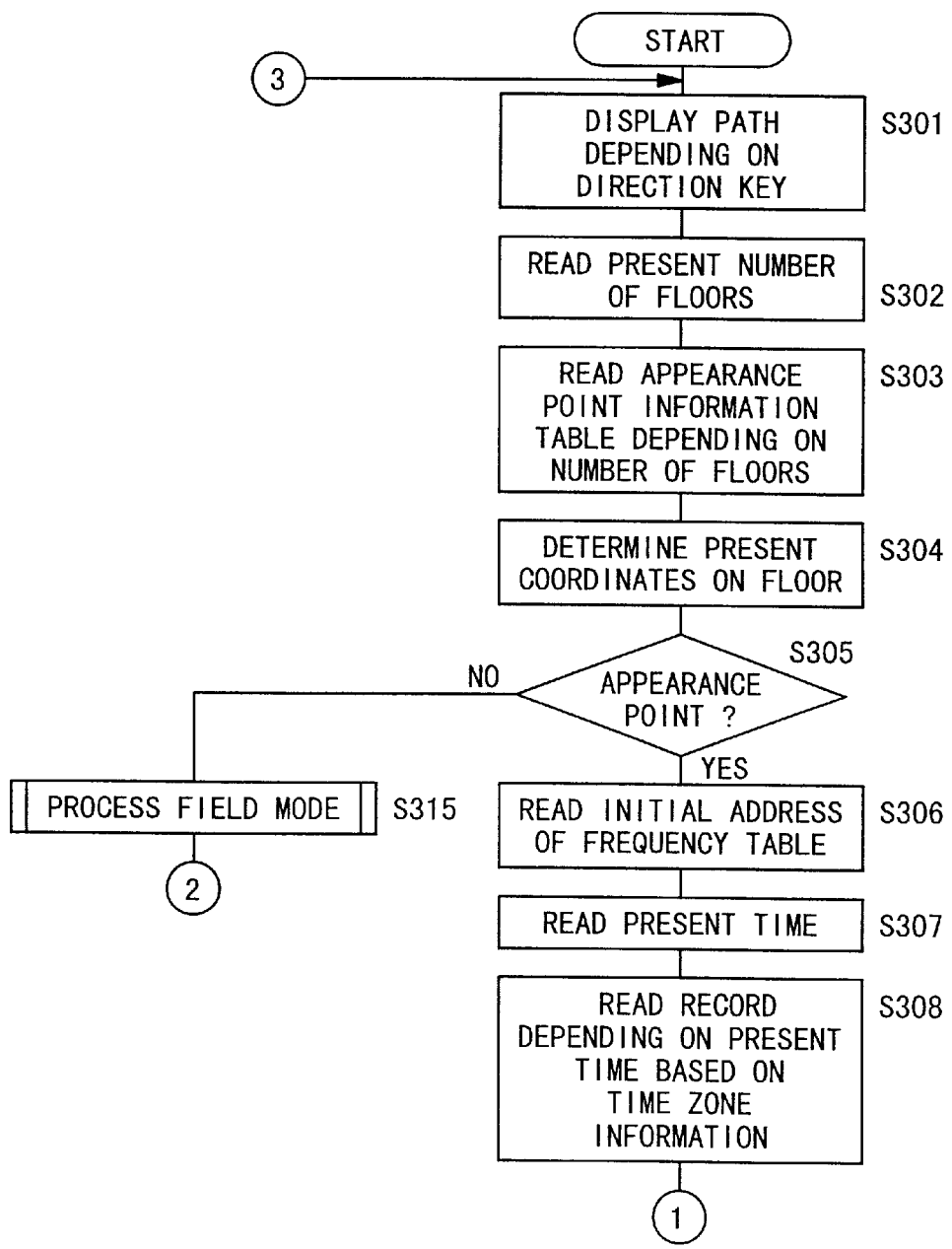
FIGS. 35 and 36 are a flowchart of a processing sequence of a game mode.
Figure 36:
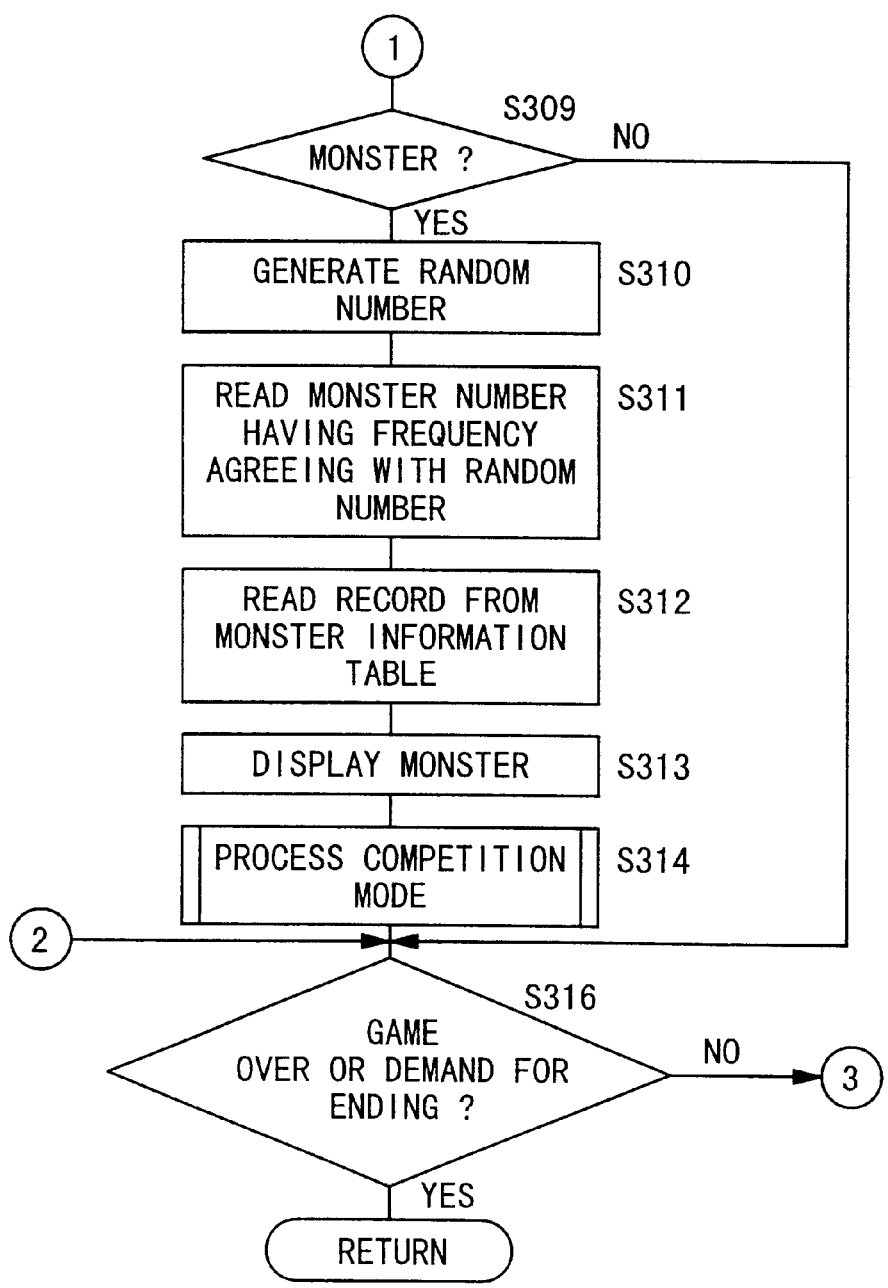

If the present coordinates do not represent an appearance point in step S305 shown in FIG. 35, then the video game processing means enters a field mode in step S315.

After the competition mode is processed in step S314, or after the field mode is processed in step S315, or if there is no monster that shows up in step S309, then control goes to step S316 in which the video game processing means determines whether or not the game is over or there is a demand for ending the game mode.

If the game is not over or there is no demand for ending the game mode, then control returns to step S301 in which the path display means 300 displays a path depending on a next direction key which has been operated. If the game is over or there is a demand for ending the game mode, then the game mode is ended.

In the game mode, since the type of a monster that shows up and/or the appearance probability of a monster is managed on the basis of the time information, the type of a monster that shows up changes depending on the time zone. Therefore, a monster that shows up in the daytime and a monster that shows up in the nighttime can differ from each other. Because appearance probability of a monster changes depending on the time zone, furthermore, the RPG can develop with added fun.

Figure 37:
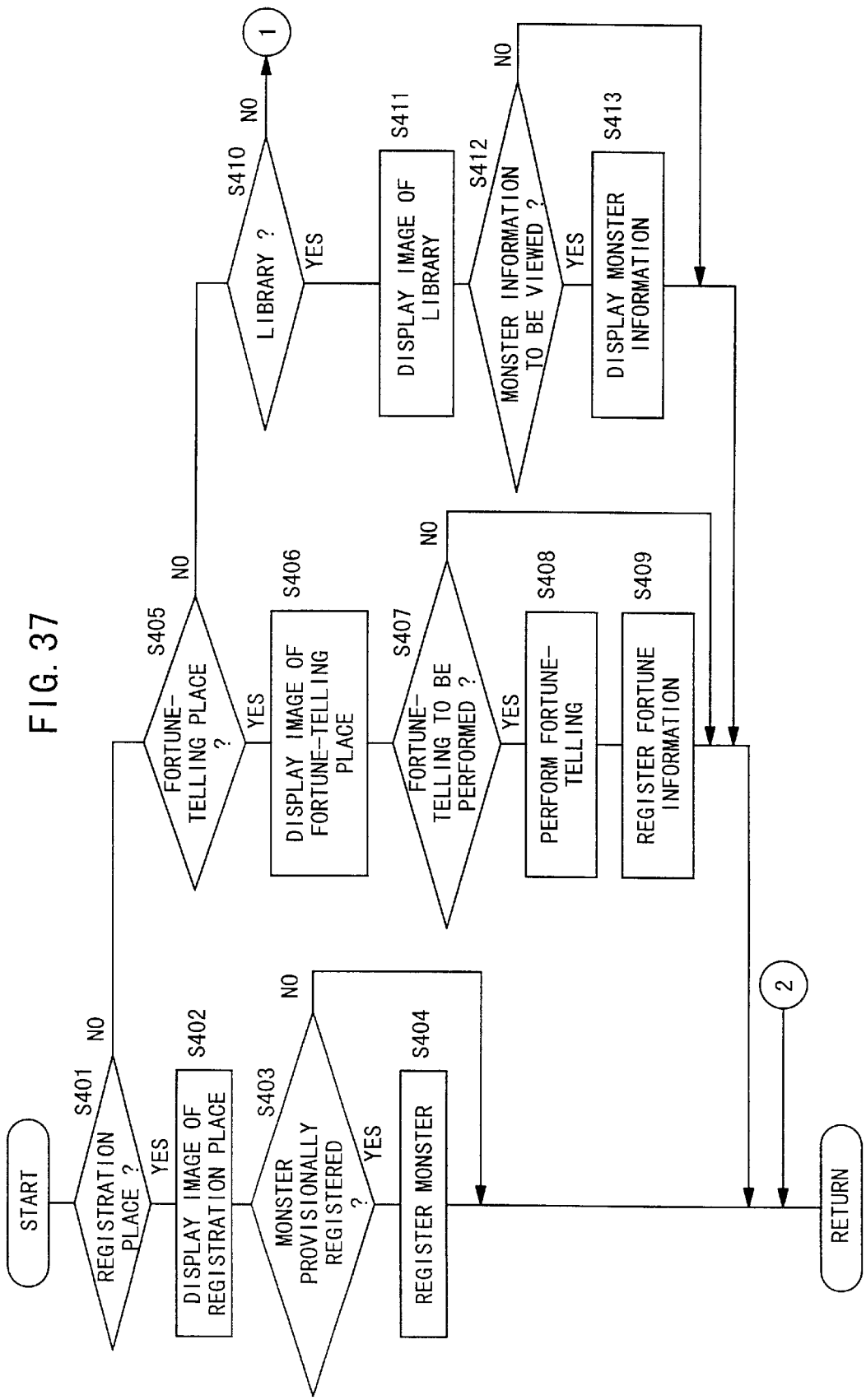
FIGS. 37 and 38 are a flowchart of a processing sequence of a field mode.

Processing operation of the video game processing means in the field mod e will be described below with reference to FIGS. 37 and 38. In step S401 shown in FIG. 37, the video game processing means determines whether the present coordinates are coordinates corresponding to the registration place. If the present coordinates are coordinates corresponding to the registration place, then control goes to step S402 in which the character display means 302 displays the image of the registration place (see FIG. 17).

In step S403, the video game processing means determines whether a monster has provisionally been registered or not based on whether a monster number is stored in the register or not. If a monster has provisionally been registered, then control proceeds to step S404 in which the table registering means 308 registers the monster.

Specifically, the monster is effectively registered in the record corresponding to the monster number stored in the register in the information table 320. That is, "1" is stored as the information as to whether the monster is registered or not. Therefore, the monster corresponding to the monster number is acquired by the principal character.

If the present coordinates are not coordinates corresponding to the registration place in step S401, then control goes to step S405 in which the video game processing means determines whether the present coordinates are coordinates corresponding to the fortune-telling place or not. If the present coordinates are coordinates corresponding to the fortune-telling place, then control goes to step S406 in which the character display means 302 displays the image of the fortune-telling place (see FIG. 20).

The video game processing means determines whether fortune-telling is to be performed or not in step S407. If a command is entered to perform fortune-telling, then control goes to step S408 in which the today's fortune is determined based on the time stored in the time information register, a calendar, etc. In step S409, the video game processing means stores the fortune information in a fortune information register.

If the present coordinates are not coordinates corresponding to the fortune-telling place in step S405, then control goes to step S410 in which the video game processing means determines whether the present coordinates are coordinates corresponding to the library or not. If the present coordinates are coordinates corresponding to the library, then control proceeds to step S411 in which the character display means 302 displays the image of the library (see FIG. 21).

In step S412, the video game processing means determines whether monster information is to be viewed or not. If a command is entered to view monster information, then control goes to step S413 in which all information of monsters registered in the information table 320 is displayed. The displayed monster information can be viewed while it is being scrolled by direction keys.

Figure 38:
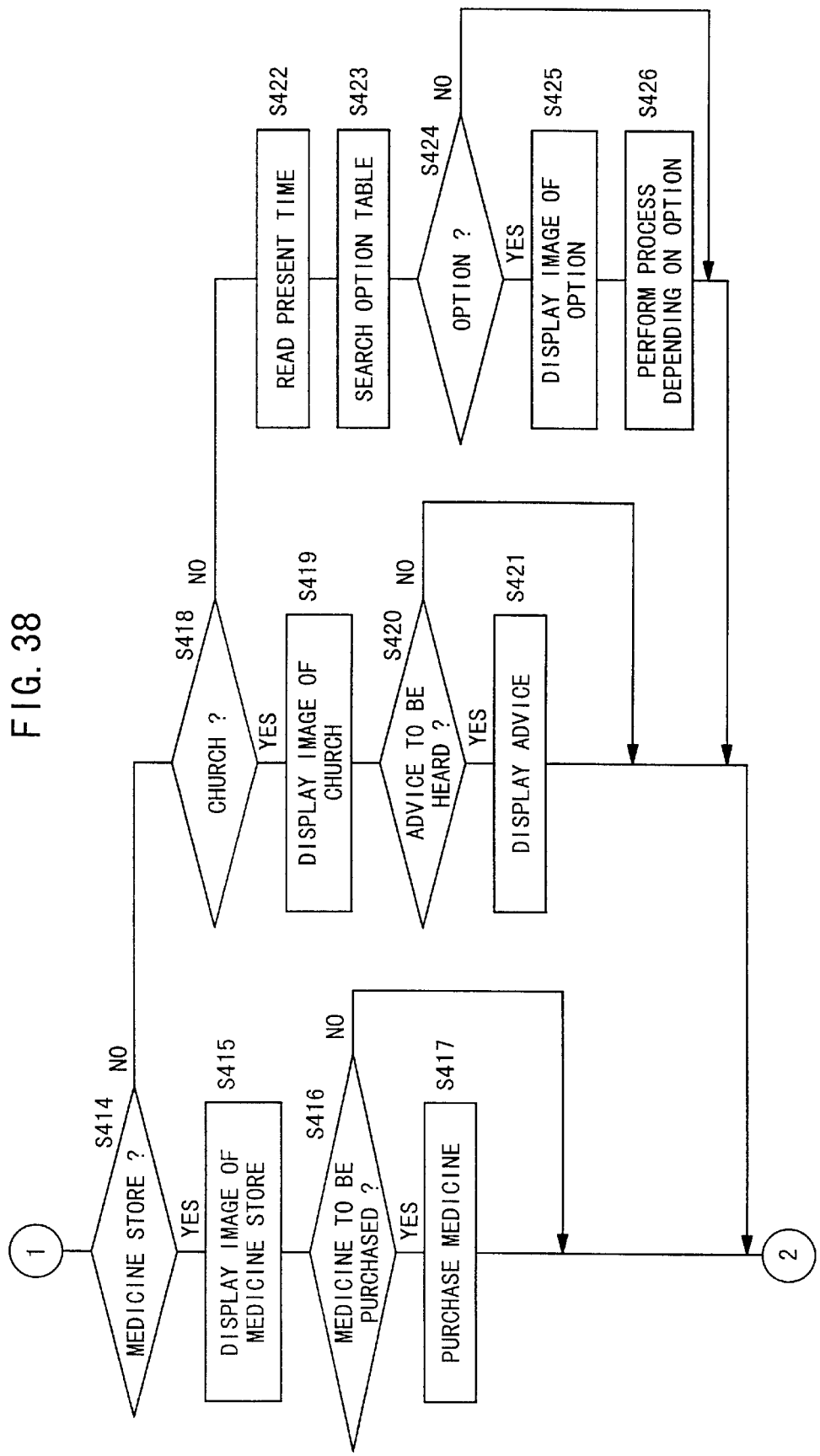

If the present coordinates are not coordinates corresponding to the library in step S410, then control goes to step S414 shown in FIG. 38 in which the video game processing means determines whether the present coordinates are coordinates corresponding to the medicine store or not. If the present coordinates are coordinates corresponding to the medicine store, then the character display means 302 displays the image of the medicine store (see FIG. 19) in step S415.

The video game processing means determines whether a medicine is to be purchased or not in step S416. If a command is entered to purchase a medicine, then control goes to step S417 in which the video game processing means purchases a medicine.

If the present coordinates are not coordinates corresponding to the medicine store in step S414, then control proceeds to step S418 in which the video game processing means determines whether the present coordinates are coordinates corresponding to the church or not. If the present coordinates are coordinates corresponding to the church, then control goes to step S419 in which the character display means 302 displays the image of the church (see FIG. 18).

The video game processing means determines whether advice is to be heard or not in step S420. If a command is entered to hear advice, then control proceeds to step S421 in which the character display means 302 displays advice based on the status of the principal character and the path that the principal character has traversed.

The advice is displayed on the basis of the present fortune of the principal character. For example, the fortune is available in five stages, i.e., 5 (best), 4 (good), 3 (ordinary), 2 (bad), and 1 (worst), and can be given by asking the fortune teller in the fortune-telling place (see step S408).

If the present fortune is in the stage 1 (worst) or 2 (bad) and the principal character goes to the church and paying part of the money in hand, for example, then the fortune can be increased one stage.

When the principal character goes to the church for the first time, the fortune of the principal character is judged. If the present fortune is in the stage 1 (worst) or 2 (bad), then the game player (user) selects whether part of the money in hand is to be paid or not. If part of the money in hand is paid, then the present fortune (1 or 2) is increased one stage to 2 (bad) or 3 (ordinary).

If the present coordinates are not coordinates corresponding to the church, then control goes to step S422 in which the video game processing means reads the present time (time information) from the time information register. In step S423, the video game processing means searches an option table based on the present time. As shown in FIG. 56, the option table contains a time zone, a storage address for image data, and the program number of a program to be executed in each record.

If an option needs to be displayed at the present time as a result of the search in step S424, then control goes to step S425 in which the image of the option, e.g., the image of a cave that has not been seen, is displayed.

In step S426, the video game processing means executes the program of the record, and performs a process depending on the option.

In the option process in step S422 through step S426, a path different from the preset ordinary path is displayed based on the time information. For example, an option such as a cave which has not been present in the daytime suddenly appears in the nighttime, resulting in an unexpected game development.

The option process includes a process for a public resort. According to such a process, for example, many people gather in a public resort in the nighttime. A clue for determining a path to follow can be obtained by talking to those people.

Figure 39:
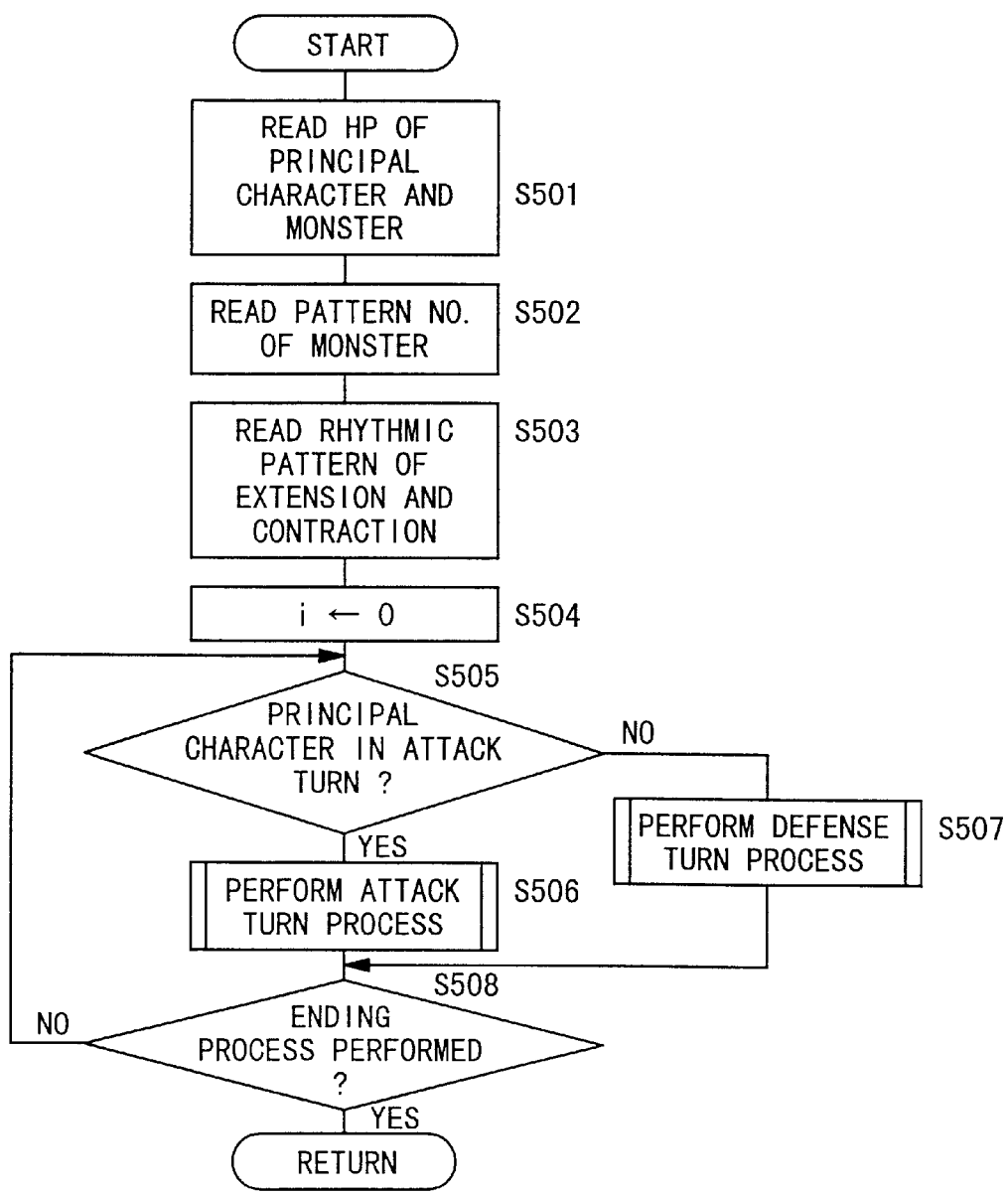
FIG. 39 is a flowchart of a processing sequence of a competition mode.

Processing operation of the video game processing means in the competition mode will be described below with reference to FIG. 39. In step S501, the influence determining means 306 reads HP (physical strength) of the principal character and the monster. In step S502, the bar display means 310 reads the pattern number of the monster. In step S503, the bar display means 310 reads a rhythmic pattern of expansion and contraction from the pattern files based on the pattern number.

In step S504, the video game processing means stores an initial value "0" in an attack/defense determining index register i, thereby initializing the index register i.

In step S505, the video game processing means determines whether the principal character is in an attack turn or not based on whether the value of the index register i is even-numbered or not, for example.

If the principal character is in an attack turn, then control proceeds to step S506 in which the video game processing means performs an attack turn process. Otherwise, control proceeds to step S507 in which the video game processing means performs a defense turn process.

When the attack turn process or the defense turn process is finished, control goes to step S508 in which the video game processing means determines whether an ending process is performed or not based on whether an end flag has been set or not. The end flag is set when the outcome of the competition is determined.

If an ending process is not performed, then control goes back to step S505 in which a next turn (attack turn or defense turn) is carried out. If an ending process is performed, then the competition mode comes to an end.

Processing operation of the video game processing means in the attack turn process will be described below with reference to FIGS. 40 and 41. In step S601 shown in FIG. 40, the character display means 302 displays an image for an attack turn (see FIG. 22).

Then, the mark display means 316 performs a mark display process in step S602. In the mark display process, the mark 414 (see FIG. 26) is displayed in a flickering manner in an arbitrary position in the display area of the bar 406 of the principal character prior to the display of the bar.

In step S603, the bar display means 310 displays the bar 406 in the read rhythmic pattern of expansion and contraction at the sword 402 of the principal character, as shown in FIG. 22, and the sound output means 312 outputs a sound according to the rhythmic pattern of expansion and contraction of the displayed bar 406.

In step S604, the video game processing means waits for a control entry from the manual control pad 76. The processing in steps S602 through S604 is repeated until there is a control entry from the manual control pad 76.

When there is a control entry from the manual control pad 76, control proceeds to step S605 in which the video game processing means determines whether the control entry comes from the decision key 74 or not. If the control entry comes from the decision key 74, then control goes to step S606 in which the bar display means 310 and the influence determining means 306 determine the length of the displayed bar 406 at the time the control entry is issued from the decision key 74 and determine the influence calculating value L1 based on the length of the bar 406.

In step S607, the video game processing means determines whether the tip end of the displayed bar is positioned within the displayed area of the mark 414 or not. If the tip end of the displayed bar is positioned within the displayed area of the mark 414, then control goes to step S608 in which the successive operation permitting means 318 determines whether the number of successive operations is smaller than a given number (e.g., 9).

If the number of successive operations is smaller than a given number, then control goes to step S609 in which the influence determining means 306 accumulates the influence calculating value L1. In step S610, the character display means 302 displays the accumulated value on the display unit 78. Then, control returns to step S602 in which the mark 414 is displayed again.

If the number of successive operations is equal to or greater than a given number in step S608 or if the tip end of the displayed bar is not positioned within the displayed area of the mark 414 in step S607, then control goes to step S611 in which the character display means 302 displays the influence calculating value L1 or its accumulated value on the display unit 78.

From this point on, the video game processing means performs the defense turn process for the monster. In step S612, the mark display means 316 performs a mark display process. In the mark display process, the mark 414 is displayed in a flickering manner in an arbitrary position in the display area of the bar 408 of the monster prior to the display of the bar.

In step S613, the bar display means 310 displays the bar 408 in the read rhythmic pattern of expansion and contraction at the shield 404 of the monster, and the sound output means 312 outputs a sound according to the rhythmic pattern of expansion and contraction of the displayed bar 408.

In step S614, the video game processing means waits for a imaginary control entry on the computer. The processing in steps S612 through S614 is repeated until there is an imaginary control entry.

When there is an imaginary control entry, control proceeds to step S615 in which the bar display means 310 and the influence determining means 306 determine the length of the displayed bar 408 at the time the imaginary control entry is issued and determine the influence calculating value L2 based on the length of the bar 408.

Figure 41:
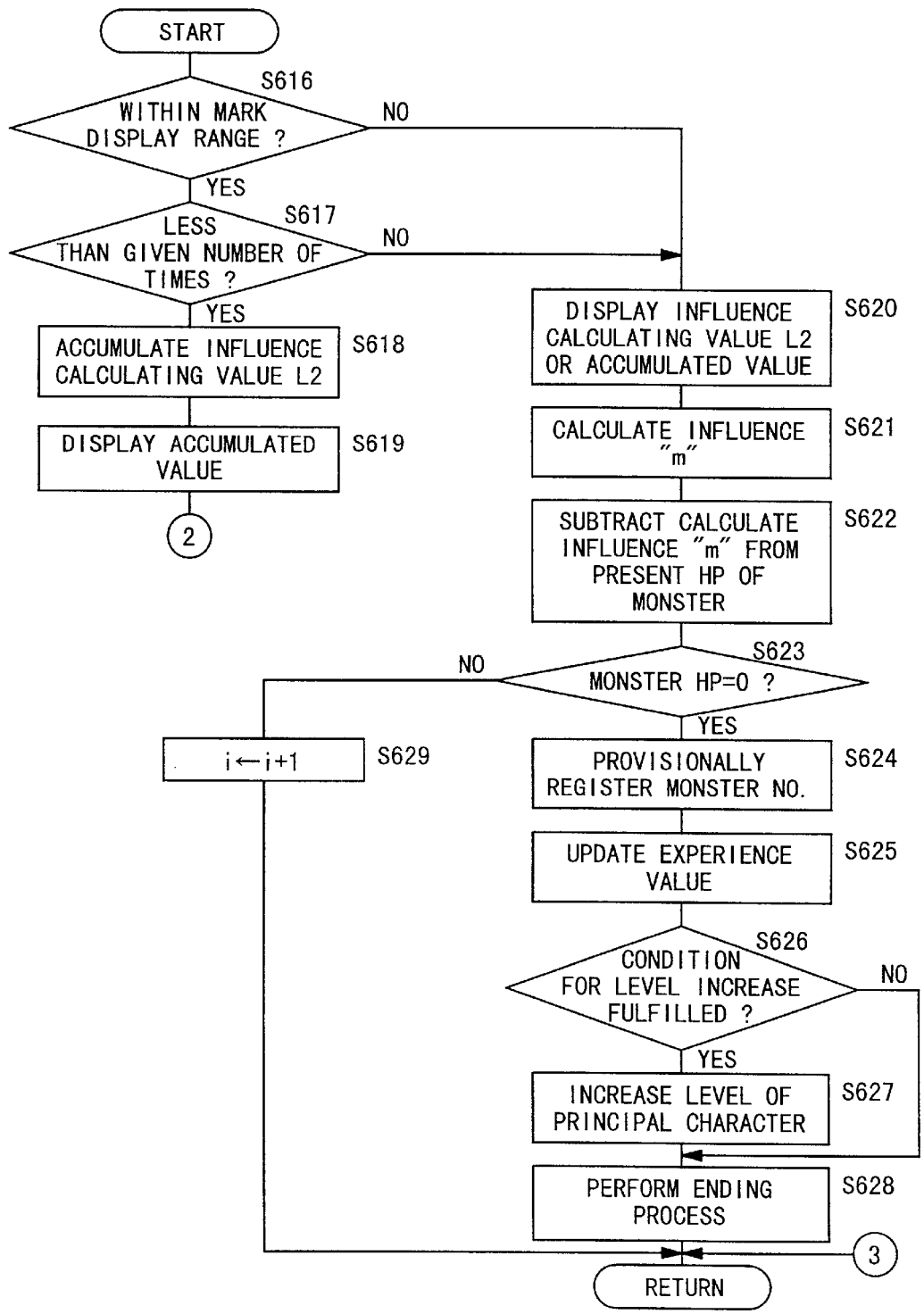

In step S616 shown in FIG. 41, the video game processing means determines whether the tip end of the displayed bar is positioned within the displayed area of the mark 414 or not. If the tip end of the displayed bar is positioned within the displayed area of the mark 414, then control goes to step S617 in which the successive operation permitting means 318 determines whether the number of successive operations is smaller than a given number (e.g., 9).

If the number of successive operations is smaller than a given number, then control goes to step S618 in which the influence determining means 306 accumulates the influence calculating value L2. In step S619, the character display means 302 displays the accumulated value on the display unit 78. Then, control returns to step S612 (FIG. 40) in which the mark 414 is displayed again.

If the number of successive operations is equal to or greater than a given number in step S617 or if the tip end of the displayed bar is not positioned within the displayed area of the mark 414 in step S616, then control goes to step S620 in which the character display means 302 displays the influence calculating value L2 or its accumulated value on the display unit 78.

In step S621, the influence determining means 306 calculates the influence "m" in the present attack turn. Specifically, the influence determining means 306 calculates the influence "m" of the attack according to the equation (1) based on the influence calculating value L1, the influence calculating value L2, and the variable α determined by the luck of the attack side while in the battle, the compatibility with the imaginary enemy, and/or the level difference between the attack side and the defense side (including the attack power, the defense power, and the experience value).

In step S622, the video game processing means subtracts the calculated influence "m" from the present HP of the monster. In step S623, the video game processing means determines whether the HP of the monster is "0" or not. If the HP of the monster is "0", then the preparing means 322 stores the monster number in a provisional registration register in step S624.

In step S625, the video game processing means updates, i.e., increments, the experience value. In step S626, the video game processing means determines whether a condition for an increase in level is fulfilled or not based on whether the updated experience value is of a value that matches the condition for an increase in level or not. If the condition for an increase in level is fulfilled, then control proceeds to step S627 in which the level of the principal character is increased.

If the processing in step S627 is ended or the condition for an increase in level is not fulfilled in step S626, then an ending process is performed, i.e., an end flag is set, in step S628.

If the HP of the monster is not "0" in step S623, then control goes to step S629 in which the value of the index register i is incremented by "1".

Figure 40:
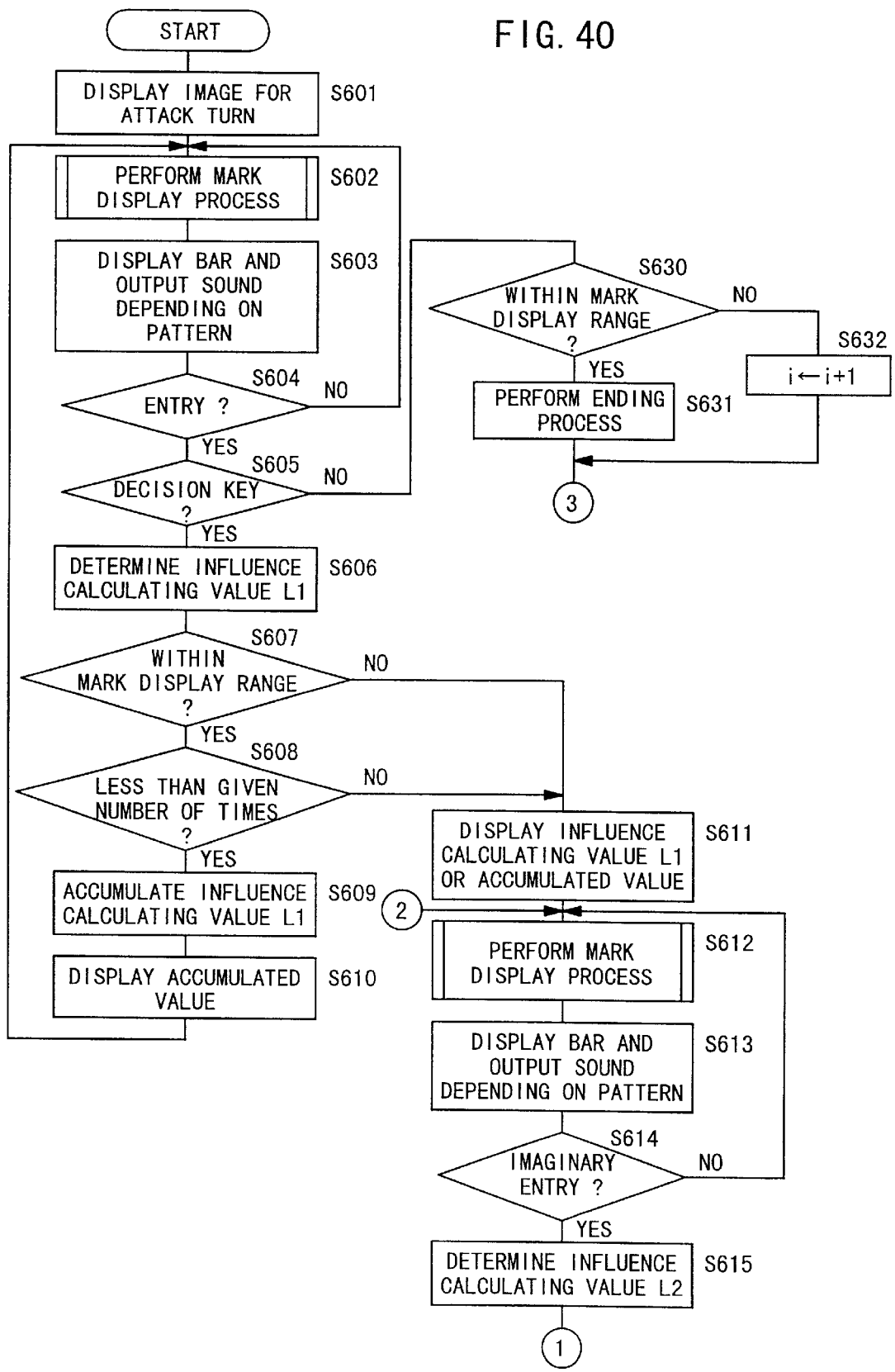
FIGS. 40 and 41 are a flowchart of a processing sequence of an attack turn process.

If the control entry does not come from the decision key 74, but from one of the direction keys 72, in step S605 shown in FIG. 40, then control goes to step S630 in which the video game processing means determines whether the tip end of the displayed bar is positioned within the displayed area of the mark 414 or not. If the tip end of the displayed bar is positioned within the displayed area of the mark 414, then control proceeds to step S631 in which the principal character is retreated, i.e., the end flag is set. If the tip end of the displayed bar is not positioned within the displayed area of the mark 414, then control proceeds to step S632 in which the value of the index register i is incremented by "1".

When the processing in step S628, the processing in step S629, the processing in step S631, or the processing in step S632 is finished, the attack turn process comes to an end.

Figure 42:
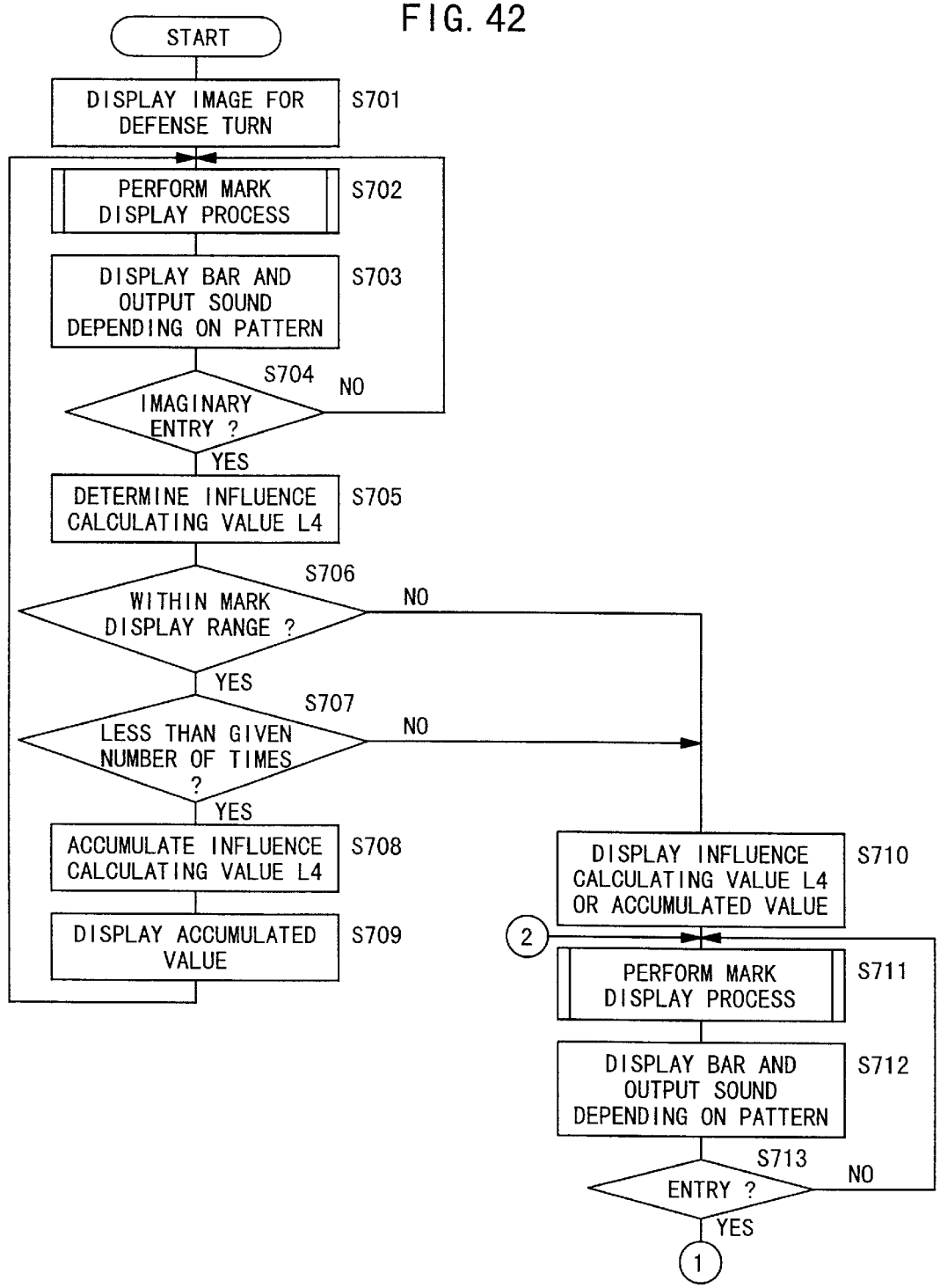
FIGS. 42 and 43 are a flowchart of a processing sequence of a defense turn process.
Figure 43:
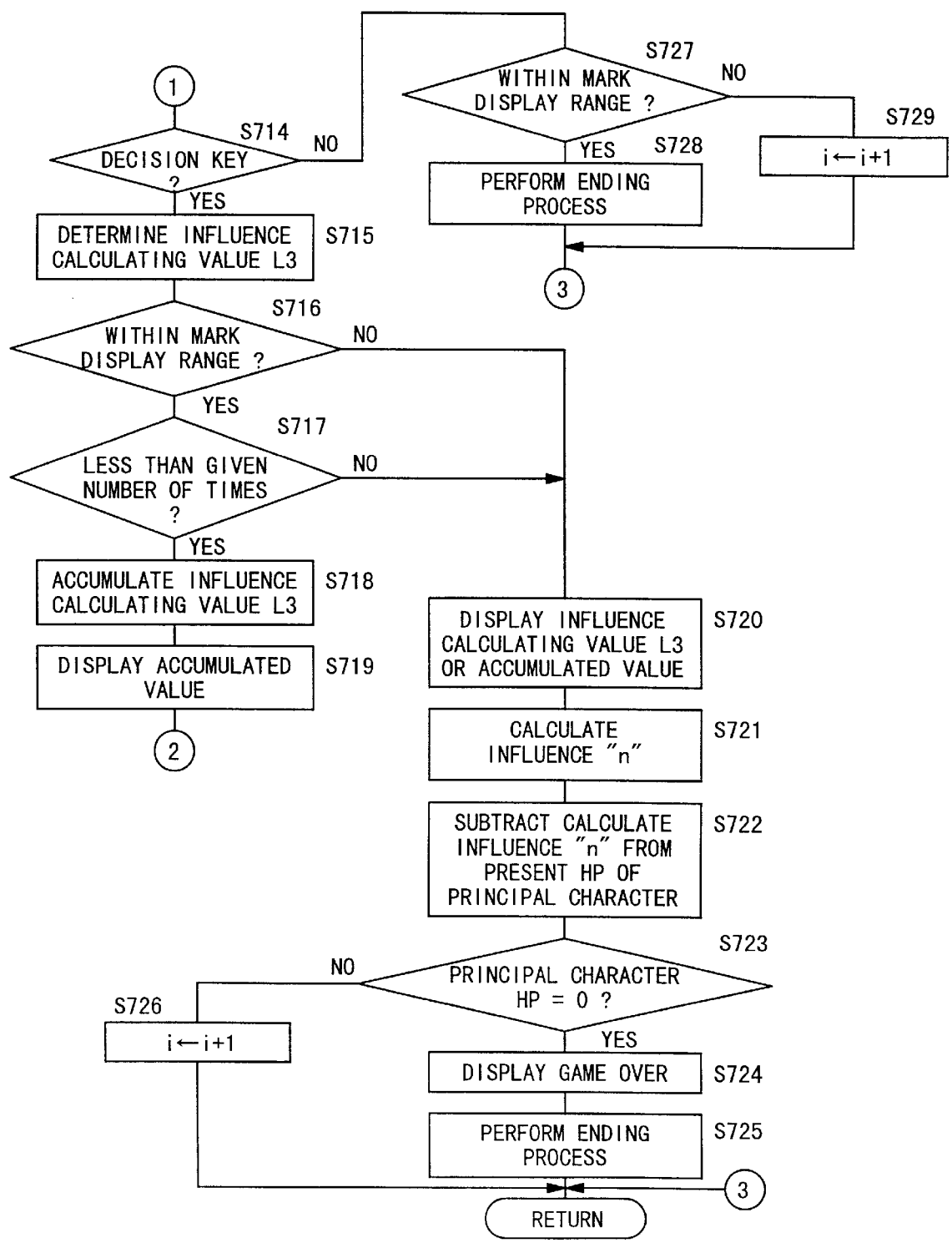

Processing;operation of the video game processing means in the defense turn process will be described below with reference to FIGS. 42 and 43. In step S701 shown in FIG. 42, the character display means 302 displays an image for a defense turn (see FIG. 23).

Then, the mark display means 316 performs a mark display process in step S702. In the mark display process, the mark 414 is displayed in a flickering manner in an arbitrary position in the display area of the bar 412 of the monster prior to the display of the bar.

In step S703, the bar display means 310 displays the bar 412 in the read rhythmic pattern of expansion and contraction at the sword 402 of the monster, as shown in FIG. 23, and the sound output means 312 outputs a sound according to the rhythmic pattern of expansion and contraction of the displayed bar 412.

In step S704, the video game processing means waits for a imaginary control entry. The processing in steps S702 through S704 is repeated until there is an imaginary control entry.

When there is an imaginary control entry, control proceeds to step S705 in which the bar display means 310 and the influence determining means 306 determine the length of the displayed bar 412 at the time the imaginary control entry is issued and determine the influence calculating value L4 based on the length of the bar 412.

In step S706, the video game processing means determines whether the tip end of the displayed bar is positioned within the displayed area of the mark 414 or not. If the tip end of the displayed bar is positioned within the displayed area of the mark 414, then control goes to step S707 in which the successive operation permitting means 318 determines whether the number of successive operations is smaller than a given number (e.g., 9).

If the number of successive operations is smaller than a given number, then control goes to step S708 in which the influence determining means 306 accumulates the influence calculating value L4. In step S709, the character display means 302 displays the accumulated value on the display unit 78. Then, control returns to step S702 in which the mark 414 is displayed again.

If the number of successive operations is equal to or greater than a given number in step S707 or if the tip end of the displayed bar is not positioned within the displayed area of the mark 414 in step S706, then control goes to step S710 in which the character display means 302 displays the influence calculating value L4 or its accumulated value on the display unit 78.

From this point on, the video game processing means performs the defense turn process for the principal character. In step S711, the mark display means 316 performs a mark display process. In the mark display process, the mark 414 is displayed in a flickering manner in an arbitrary position in the display area of the bar 410 of the principal character prior to the display of the bar.

In step S712, the bar display means 310 displays the bar 410 in the read rhythmic pattern of expansion and contraction at the shield 404 of the principal character, as shown in FIG. 23, and the sound output means 312 outputs a sound according to the rhythmic pattern of expansion and contraction of the displayed bar 410.

In step S713, the video game processing means waits for a control entry from the manual control pad 76. The processing in steps S711 through S713 is repeated until there is a control entry from the manual control pad 76.

When there is a control entry from the manual control pad 76, control proceeds to step S714 (see FIG. 43) in which the video game processing means determines whether the control entry comes from the decision key 74 or not. If the control entry comes from the decision key 74, then control goes to step S715 in which the bar display means 310 and the influence determining means 306 determine the length of the displayed bar 410 at the time the control entry is issued from the decision key 74 and determine the influence calculating value L3 based on the length of the bar 410.

In step S716, the video game processing means determines whether the tip end of the displayed bar is positioned within the displayed area of the mark 414 or not. If the tip end of the displayed bar is positioned within the displayed area of the mark 414, then control goes to step S717 in which the successive operation permitting means 318 determines whether the number of successive operations is smaller than a given number (e.g., 9).

If the number of successive operations is smaller than a given number, then control goes to step S718 in which the influence determining means 306 accumulates the influence calculating value L3. In step S719, the character display means 302 displays the accumulated value on the display unit 78. Then, control returns to step S711 in which the mark 414 is displayed again.

If the number of successive operations is equal to or greater than a given number in step S717 or if the tip end of the displayed bar is not positioned within the displayed area of the mark 414 in step S716, then control goes to step S720 in which the character display means 302 displays the influence calculating value L3 or its accumulated value on the display unit 78.

In step S721, the influence determining means 306 calculates the influence "n" in the present defense turn. Specifically, the influence determining means 306 calculates the influence "n" of the defense according to the equation (2) based on the influence calculating value L3, the influence calculating value L4, and the variable β determined by the luck of the attack side while in the battle, the compatibility with the monster, and/or the level difference between the attack side and the defense side (including the attack power, the defense power, and the experience value).

In step S722, the video game processing means subtracts the calculated influence "n" from the present HP of the principal character. In step S723, the video game processing means determines whether the HP of the principal character is "0" or not. If the HP of the principal character is "0", then the character display means 302 displays a gameover message on the display unit 78 in step S724. In step S725, an ending process is performed, i.e., an end flag is set.

If the HP of the principal character is not "0" in step S723, then control goes to step S726 in which the value of the index register i is incremented by "1".

If the control entry does not come from the decision key 74, but from one of the direction keys 72, in step S714, then control goes to step S727 in which the video game processing means determines whether the tip end of the displayed bar is positioned within the displayed area of the mark 414 or not. If the tip end of the displayed bar is positioned within the displayed area of the mark 414, then control proceeds to step S728 in which the principal character is retreated, i.e., the end flag is set. If the tip end of the displayed bar is not positioned within the displayed area of the mark 414, then control proceeds to step S729 in which the value of the index register i is incremented by "1".

When the processing in step S725, the processing in step S726, the processing in step S728, or the processing in step S729 is finished, the defense turn process comes to an end.

Figure 44:
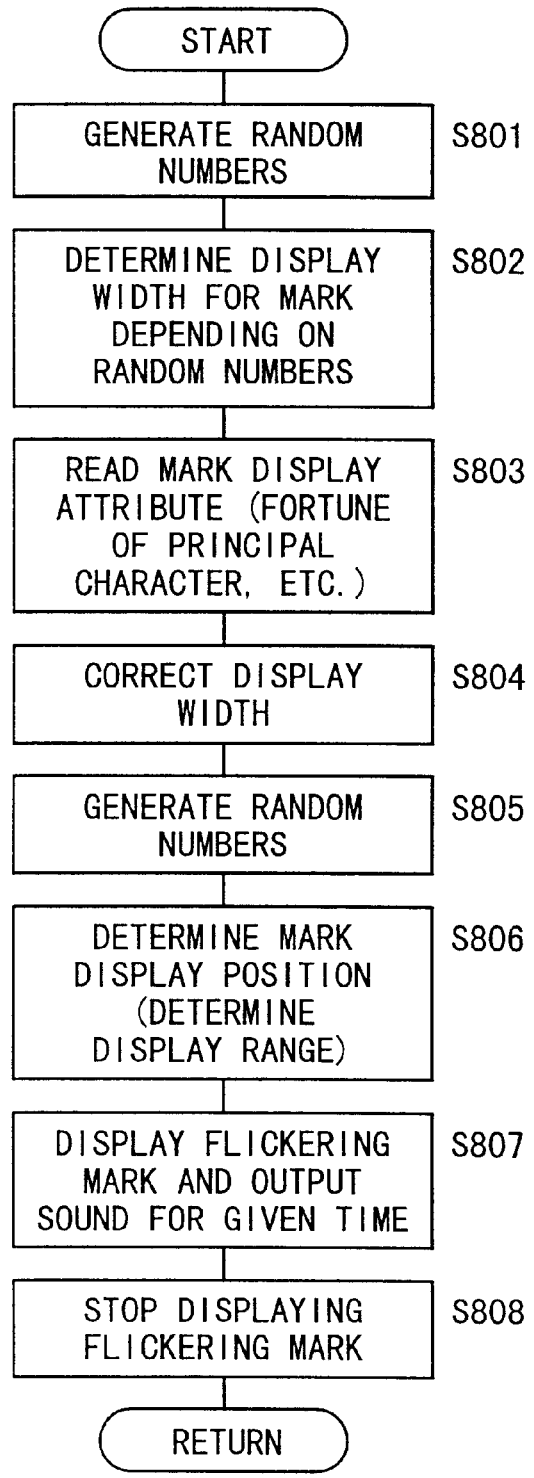
FIG. 44 is a flowchart of a processing sequence of a mark display process.

Processing operation of the video game processing means in the mark display process will be described below with reference to FIG. 44. In step S801, the video game processing means generates random numbers for determining a display width w of the mark 414. In step S802, the video game processing means determines a display width w of the mark 414 depending on the generated random numbers. In step S803, the video game processing means reads a display attribute (the fortune of the principal character, etc.) of the mark 414. In step S804, the video game processing means corrects the display width w depending on the read display attribute. For example, when the fortune of the principal character is good, then the video game processing means increases the display width w, and when the fortune of the principal character is bad, then the video game processing means reduces the display width w.

In step S805, the video game processing means generates random numbers for determining a display position of the mark 414. In step S806, the video game processing means determines a display position of the mark 414 based on the generated random numbers, i.e., determines a display range.

In step S807, the mark display means 316 displays the mark 414 in a flickering manner in the determined display position for a predetermined time (e.g., 2 seconds), and the sound output means 312 outputs a sound in timed relation to the flickering of the mark 414.

After elapse of the predetermined time, the flickering display of the mark 414 and the outputting of the sound are stopped in step S808. When the processing in step S808 is finished, the mark display process comes to an end.

Figure 45:
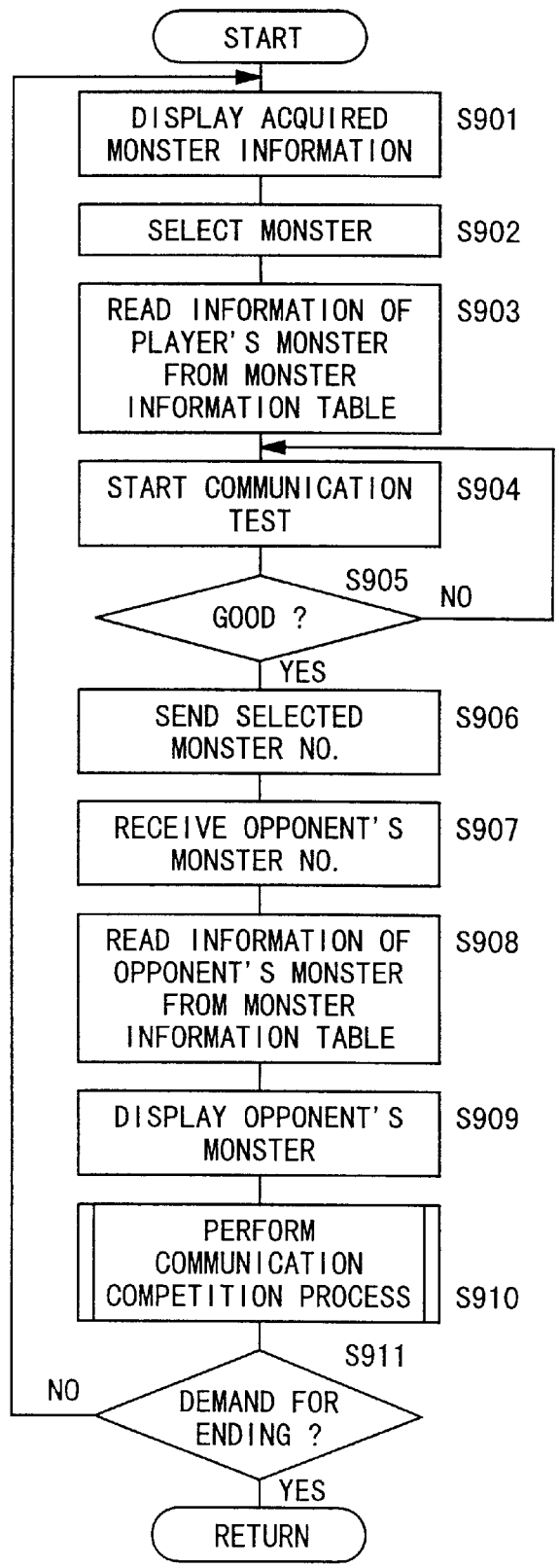
FIG. 45 is a flowchart of a processing sequence of a communication competition mode.

Processing operation of the video game processing means in the communication competition mode will be described below with reference to FIG. 45. In step S901 shown in FIG. 45, the character display means 302 displays information of monsters that have been acquired so far in a menu.

In step S902, the video game processing means selects a monster for the opponent to compete with. In step S903, the video game processing means reads information of the selected player's monster from the information table 320.

In step S904, the data sending/receiving means 324 starts conducting a communication test. In step S905, the data sending/receiving means 324 determines whether communications are good or not. If communications are not good, then control returns to step S904 to conduct a communication test again.

If communications are good, then the data sending/receiving means 324 sends the monster number of the selected monster to the opponent in step S906, and receives a monster number sent from the opponent in step S907.

In step S908, the video game processing means reads information of the opponent's monster from the information table 320. In step S909, the character display means 302 displays the opponent's monster on the display unit 78.

In step S910, the video game processing means carries out a communication competition process in which the user and the opponent compete with each other via actual communications.

After the communication competition process, control goes to step S911 in which the video game processing means determines whether there is a demand for ending the communication competition process or not. If there is no demand for ending the communication competition process, control returns to step S901 for selecting a next monster to compete with in a next communication competition process. If there is a demand for ending the communication competition process, then the communication competition mode is finished.

Figure 46:
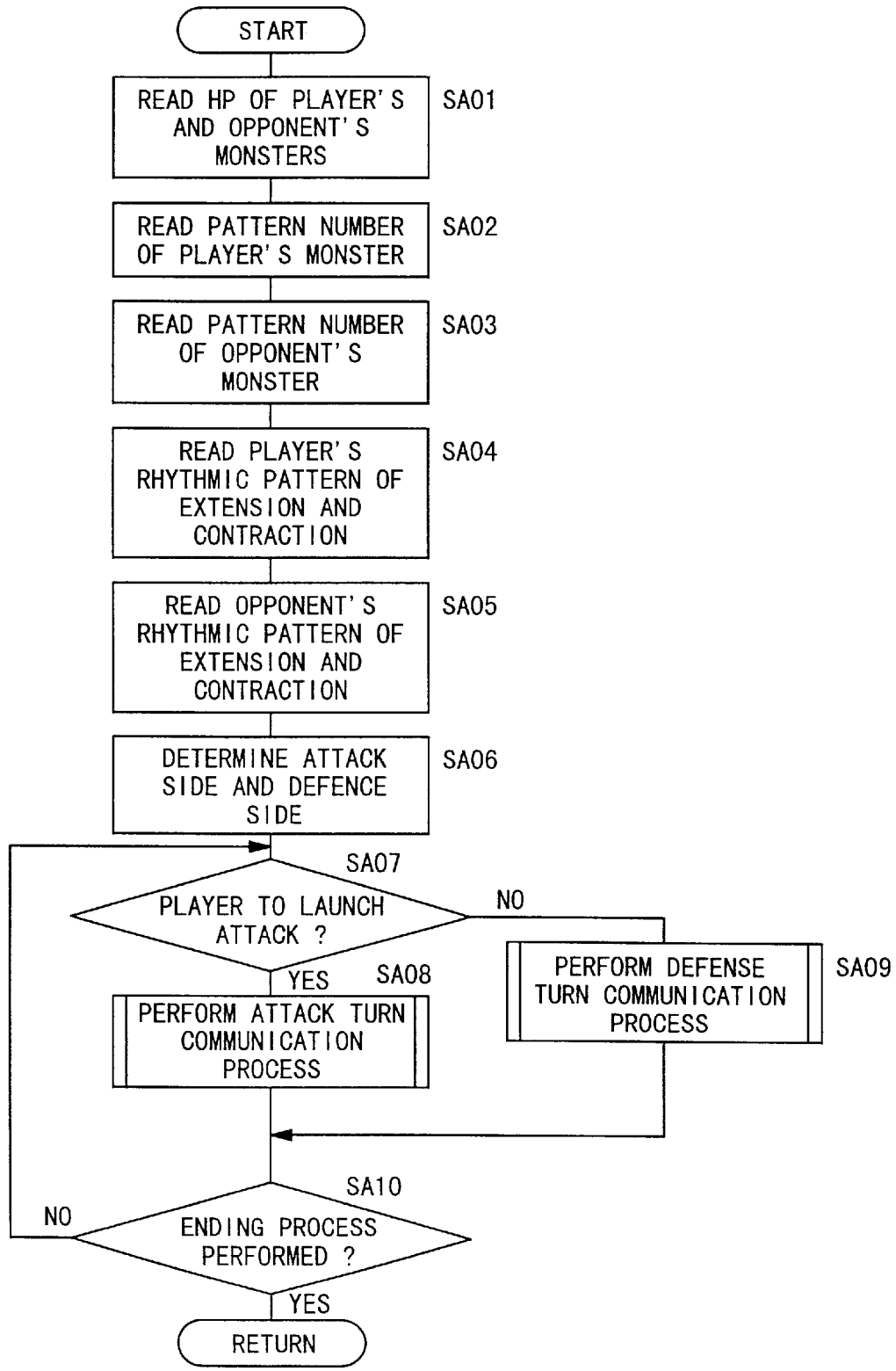
FIG. 46 is a flowchart of a processing sequence of a communication competition process.

Processing operation of the video game processing means in the communication competition process will be described below with reference to FIG. 46. In step SA01, the influence determining means 306 reads the HP of the player's monster and the HP of the opponent's monster. In step SA02, the bar display means 310 reads the pattern number of the player's monster from the information table 320. In step SA03, the bar display means 310 reads the pattern number of the opponent's monster from the information table 320.

In step SA04, the bar display means 310 reads the rhythmic pattern of expansion and contraction of the displayed bar of the player from the pattern file based on the read pattern number. In step SA05, the bar display means 310 reads the rhythmic pattern of expansion and contraction of the displayed bar of the opponent from the pattern files based on the read pattern number.

In step SA06, the video game processing means determines an attack side and a defense side. Specifically, the video game processing means determines an attack side and a defense side based on the contents of the statuses of the monsters such that the monster whose level and experience value or attack power are higher will launch an attack. The video game processing means stores the determined result in the index register i.

For example, if the player's monster starts to launch an attack, then "0" is stored in the index register i, and if the player's monster starts to carry out a defense, then "1" is stored in the index register i, The video game processing means determines whether the player is to launch an attack or not in step SA07, based on whether the value of the index register i is an even number or not.

If the value of the index register i is an even number, indicating that the player is to launch an attack, then control proceeds to step SA08 in which the video game processing means performs an attack turn communication process. Otherwise, the video game processing means performs a defense turn communication process in step SA09.

After the attack turn communication process or the defense turn communication process is finished, control goes to step SA10 in which the video game processing means determines whether an ending process is performed or not, based on whether an end flag is set or not. The end flag is set at the time the outcome of the competition is determined.

If an ending process is not performed, then control goes back to step SA07 for carrying out a next turn (the attack turn communication process or the defense turn communication process). If an ending process is performed, then the communication competition process is ended.

Processing operation of the video game processing means in the attack turn communication process will be described below with reference to FIGS. 47 and 48. In step SB01 shown in FIG. 47, the character display means 302 displays an image for an attack turn (see FIG. 22).

In step SB02, the mark display means 316 and the data sending/receiving means 324 carry out a first mark display communication process. In the first mark display communication process, the mark 414 (see FIG. 26) is displayed in a flickering manner in an arbitrary position in the display area of the bar 406 of the player prior to the display of the bar.

In step SB03, the bar display means 310 displays the bar 406 in the read rhythmic pattern of expansion and contraction of the opponent at the sword 402 of the player, and the sound output means 312 outputs a sound according to the rhythmic pattern of expansion and contraction of the displayed bar 406.

In step SB04, the video game processing means waits for a control entry from the manual control pad 76. The processing in steps SB02 through SB04 is repeated until there is a control entry from the manual control pad 76.

When there is a control entry from the manual control pad 76, control proceeds to step SB05 in which the video game processing means determines whether the control entry comes from the decision key 74 or not. If the control entry comes from the decision key 74, then control goes to step SB06 in which the bar display means 310 and the influence determining means 306 determine the length of the displayed bar 406 at the time the control entry is issued from the decision key 74 and determine the influence calculating value L1 based on the length of the bar 406.

In step SB07, the video game processing means determines whether the tip end of the displayed bar is positioned within the displayed area of the mark 414 or not. If the tip end of the displayed bar is positioned within the displayed area of the mark 414, then control goes to step SB08 in which the successive operation permitting means 318 determines whether the number of successive operations is smaller than a given number (e.g., 9).

If the number of successive operations is smaller than a given number, then control goes to step SB09 in which the influence determining means 306 accumulates the influence calculating value L1. In step SB10, the character display means 302 displays the accumulated value on the display unit 78. Thereafter, the data sending/receiving means 324 sends the accumulated value and information indicating that there is an accumulation in step SB11. Then, control returns to step SB02 in which the first mark display communication process is carried out.

Figure 48:
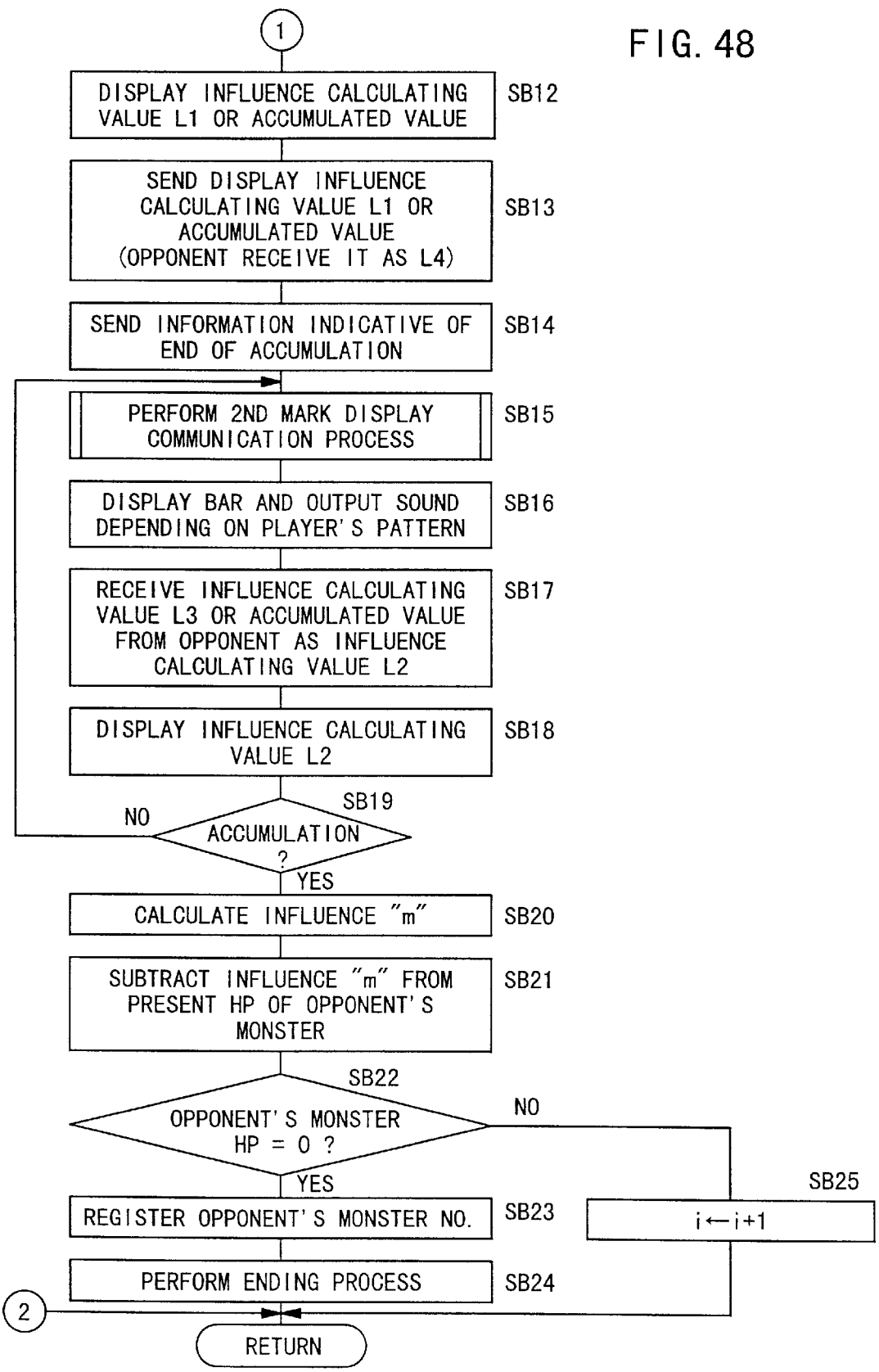

If the number of successive operations is equal to or greater than a given number in step SB08 or if the tip end of the displayed bar is not positioned within the displayed area of the mark 414 in step SB07, then control goes to step SB12 shown in FIG. 48 in which the character display means 302 displays the influence calculating value L1 or its accumulated value on the display unit 78.

In step SB13, the data sending/receiving means 324 sends the influence calculating value L1 or its accumulated value to the opponent. Then, in step SB14, the data sending/receiving means 324 sends information indicative of an end of the accumulating process. The opponent receives the influence calculating value L1 or its accumulated value as the influence calculating value L4.

From this point on, the video game processing means performs the defense turn process for the opponent. In step SB15, the mark display means 316 and the data sending/receiving means 324 perform a second mark display communication process. In the second mark display communication process, the mark 414 is displayed in a flickering manner in an arbitrary position in the display area of the bar 408 of the opponent prior to the display of the bar.

In step SB16, the bar display means 310 displays the bar 408 in the read rhythmic pattern of expansion and contraction of the player at the shield 404 of the opponent, and the sound output means 312 outputs a sound according to the rhythmic pattern of expansion and contraction of the displayed bar 408.

In step SBI7, the data sending/receiving means 324 receives the influence calculating value L3 or its accumulated value from the opponent as the influence calculating value L2. In step SB18, the character display means 302 displays the influence calculating value L2 on the display unit.

In step SB19, the data sending/receiving means 324 receives information relative to an accumulation sent from the opponent, and determines whether there is an accumulation or not. If there is no accumulation, then control returns to step SB15 for displaying the mark 414 again.

If there is an accumulation, then control goes to step SB20 in which the influence determining means 306 calculates the influence "m" in the present attack turn communication process. Specifically, the influence determining means 306 calculates the influence "m" of the attack according to the equation (1) based on the influence calculating value L1, the influence calculating value L2, and the variable α determined by the compatibility between the player's monster and the opponent's monster while in the battle, and/or the level difference between the attack side and the defense side (including the attack power, the defense power, and the experience value).

In step SB21, the video game processing means subtracts the calculated influence "m" from the present HP of the opponent's monster. In step SB22, the video game processing means determines whether the HP of the opponent's monster is "0" or not.

If the HP of the opponent's monster is "0", then the table registering means 308 registers the opponent's monster number in step SB23. Specifically, the monster is effectively registered in the record corresponding to the monster number in the information table 320. That is, "1" is stored as the information as to whether the monster is registered or not. Therefore, the monster corresponding to the opponent's monster number is acquired.

Then, an ending process is performed, i.e., an end flag is set, in step SB24.

If the HP of the opponent's monster is not "0" in step SB22, then control goes to step SB25 in which the value of the index register i is incremented by "1".

Figure 47:
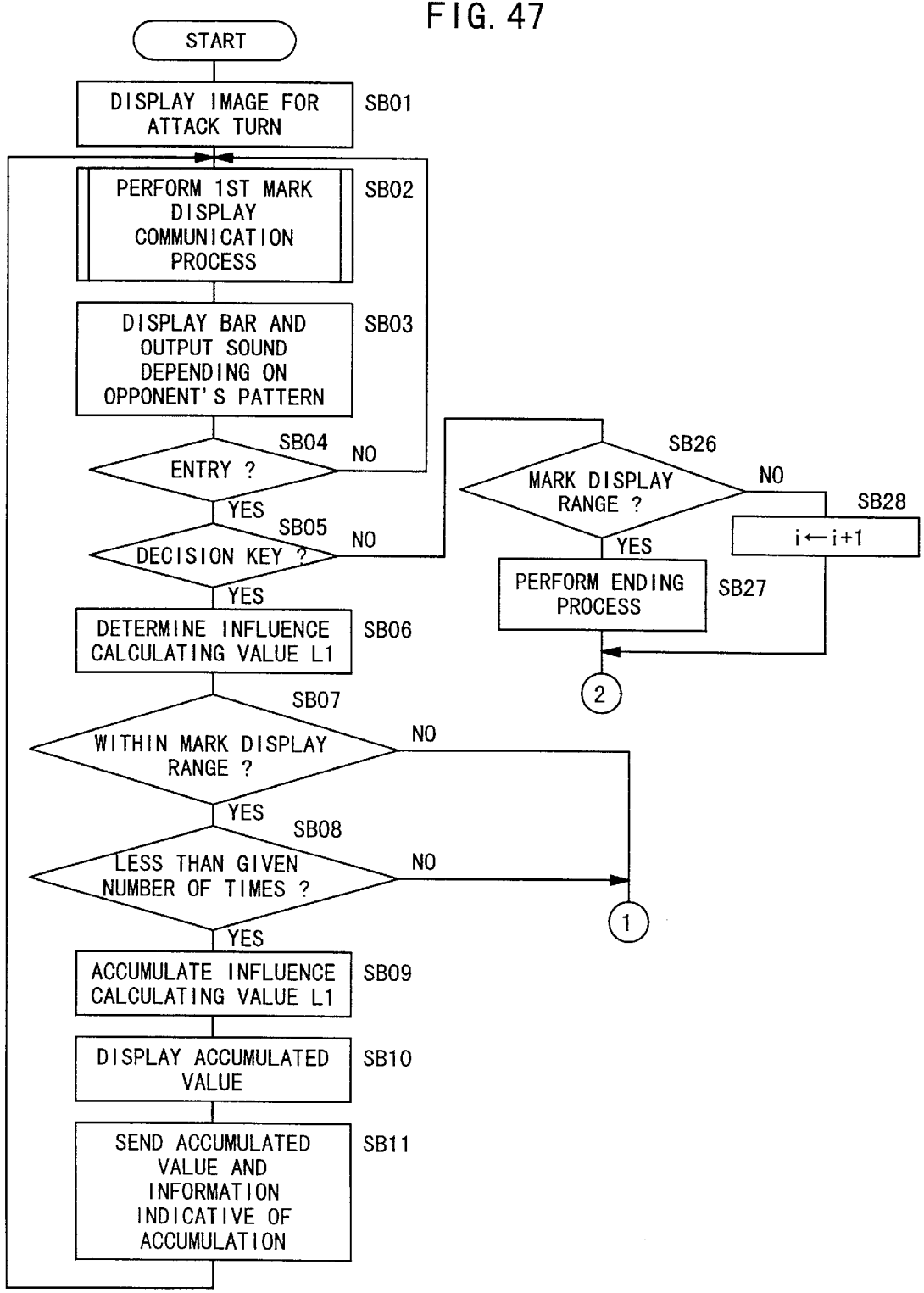
FIGS. 47 and 48 are a flowchart of a processing sequence of an attack turn communication process.

If the control entry does not come from the decision key 74, but from one of the direction keys 72, in step SB05 shown in FIG. 47, then control goes to step SB26 in which the video game processing means determines whether the tip end of the displayed bar is positioned within the displayed area of the mark 414 or not. If the tip end of the displayed bar is positioned within the displayed area of the mark 414, then control proceeds to step SB27 in which the player is retreated, i.e., the end flag is set. If the tip end of the displayed bar is not positioned within the displayed area of the mark 414, then control proceeds to step SB28 in which the value of the index register i is incremented by "1".

When the processing in step SB24, the processing in step SB25, the processing in step SB27, or the processing in step SB28 is finished, the attack turn communication process comes to an end.

Processing operation of the video game processing means in the defense turn communication process will be described below with reference to FIGS. 49 and 50. In step SC01 shown in FIG. 49, the character display means 302 displays an image for a defense turn (see FIG. 23).

In step SC02, the mark display means 316 and the data sending/receiving means 324 carry out a second mark display communication process. In the second mark display communication process, the mark 414 (see FIG. 26) is displayed in a flickering manner in an arbitrary position in the display area of the bar 412 of the opponent's monster, on the display unit 78 of the player's portable information terminal 32, prior to the display of the bar.

In step SC03, the bar display means 310 displays the bar in the read rhythmic pattern of expansion and contraction of the player at the sword 402 of the opponent's monster, and the sound output means 312 outputs a sound according to the rhythmic pattern of expansion and contraction of the displayed bar.

In step SC04, the data sending/receiving means 324 receives the influence calculating value L1 or its accumulated value from the opponent as the influence calculating value L4. In step SC05, the character display means 302 displays the influence calculating value L4 on the display unit 78.

In step SC06, the data sending/receiving means 324 receives information relative to an accumulation sent from the opponent, and determines whether there is an accumulation or not. If there is an accumulation, then control returns to step SC02 for displaying the mark 414 again.

If there is no accumulation in step SC06, then the video game processing means performs the defense turn process for the player. In step SC07, the mark display means 316 and the data sending/receiving means 324 carry out the first mark display communication process. In the first mark display communication process, the mark 414 is displayed in a flickering manner in an arbitrary position in the display area of the bar 410 of the player prior to the display of the bar.

In step SC08, the bar display means 310 displays the bar 410 in the read rhythmic pattern of expansion and contraction of the opponent at the shield 404 of the opponent, and the sound output means 312 outputs a sound according to the rhythmic pattern of expansion and contraction of the displayed bar 410.

In step SC09, the video game processing means waits for a control entry from the manual control pad 76. The processing in steps SC07 through SC09 is repeated until there is a control entry from the manual control pad 76.

When there is a control entry from the manual control pad 76, control proceeds to step SC10 in which the video game processing means determines whether the control entry comes from the decision key 74 or not. If the control entry comes from the decision key 74, then control goes to step SC11 shown in FIG., 50 in which the bar display means 310 and the influence determining means 306 determine the length of the displayed bar 410 at the time the control entry is issued from the decision key 74 and determine the influence calculating value L3 based on the length of the bar 410.

In step SC12, the video game processing means determines whether the tip end of the displayed bar is positioned within the displayed area of the mark 414 or not. If the tip end of the displayed bar is positioned within the displayed area of the mark 414, then control goes to step SC13 in which the successive operation permitting means 318 determines whether the number of successive operations is smaller than a given number (e.g., 9).

If the number of successive operations is smaller than a given number, then control goes to step SC14 in which the influence determining means 306 accumulates the influence calculating value L3. In step SC15, the character display means 302 displays the accumulated value on the display unit 78. Thereafter, the data sending/receiving means 324 sends the accumulated value and information indicating that there is an accumulation in step SC16. Then, control returns to step SC07 in which the first mark display communication process is carried out.

If the number of successive operations is equal to or greater than a given number in step SC13 or if the tip end of the displayed bar is not positioned within the displayed area of the mark 414 in step SC12, then control goes to step SC17 in which the character display means 302 displays the influence calculating value L3 or its accumulated value on the display unit 78.

In step SC18, the data sending/receiving means 324 sends the influence calculating value L3 or its accumulated value to the opponent. Then, in step SC19, the data sending/receiving means 324 sends information indicative of an end of the accumulating process. The opponent receives the influence calculating value L3 or its accumulated value as the influence calculating value L2.

In step SC20, the influence determining means 306 calculates the influence "n" in the present defense turn communication process. Specifically, the influence determining means 306 calculates the influence "n" of the attack according to the equation (2) based on the influence calculating value L3, the influence calculating value L4, and the variable β determined by the compatibility between the player's monster and the opponent's monster while in the battle, and/or the level difference between the attack side and the defense side (including the attack power, the defense power, and the experience value).

In step SC21, the video game processing means subtracts the calculated influence "n" from the present HP of the player's monster. In step SC22, the video game processing means determines whether the HP of the player's monster is "0" or not. If the HP of the player's monster is "0", then the tape registering means 308 cancels the registration of the player's monster number in step SC23. Specifically, the registration of the monster is made invalid in the record corresponding to the opponent's monster number in the information table 320. That is, "0" is stored as the information as to whether the monster is registered or not. Therefore, the monster corresponding to the player's monster number is seized by the opponent.

In step SC24, the character display means 302 displays a game-over message on the display unit 78. In step SC25, an ending process is performed, i.e., an end flag is set. If the HP of the player's monster is not "0" in step SC22, then control goes to step SC26 in which the value of the index register i is incremented by "1".

Figure 49:
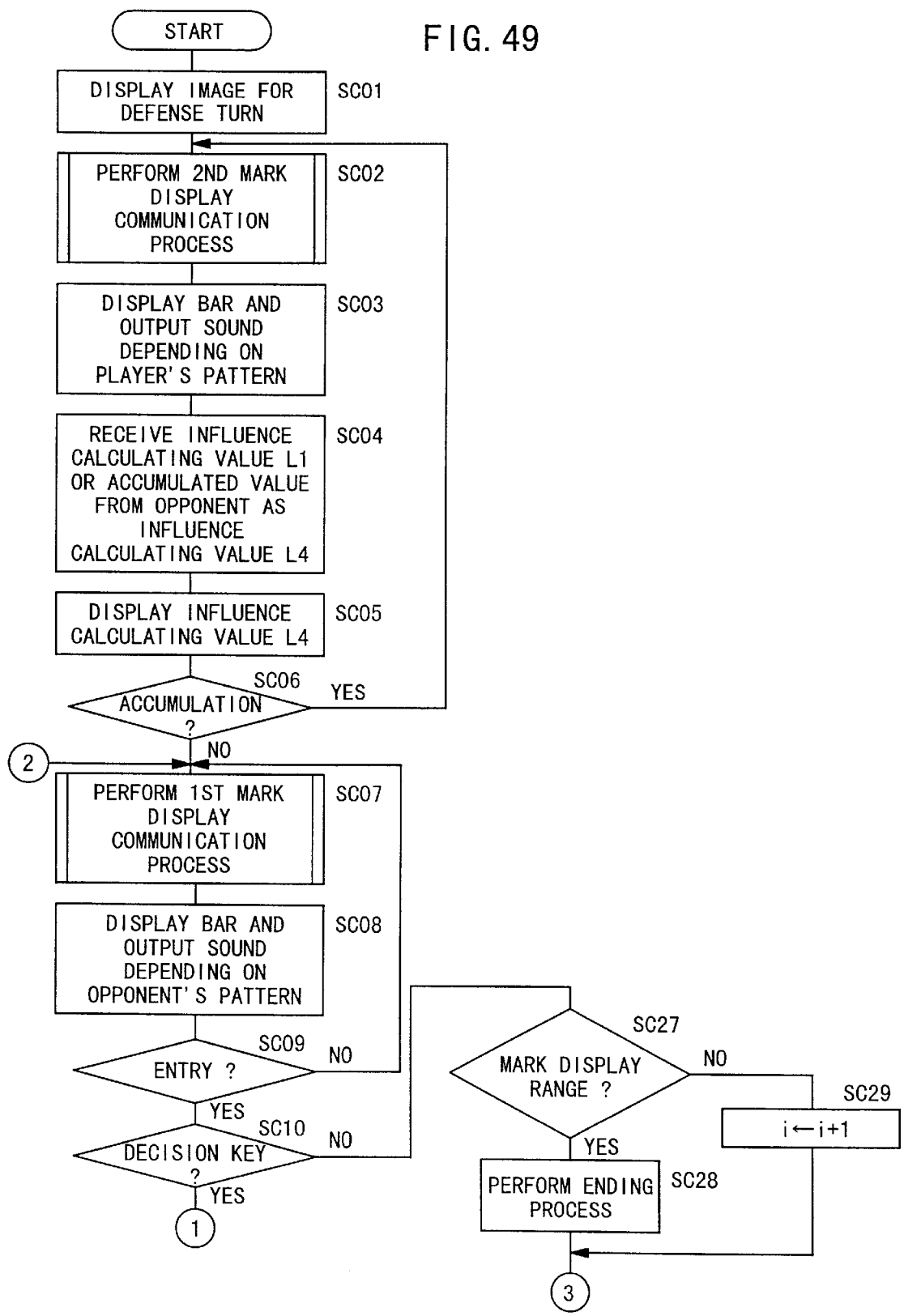
FIGS. 49 and 50 are a flowchart of a processing sequence of a defense turn communication process.
Figure 50:
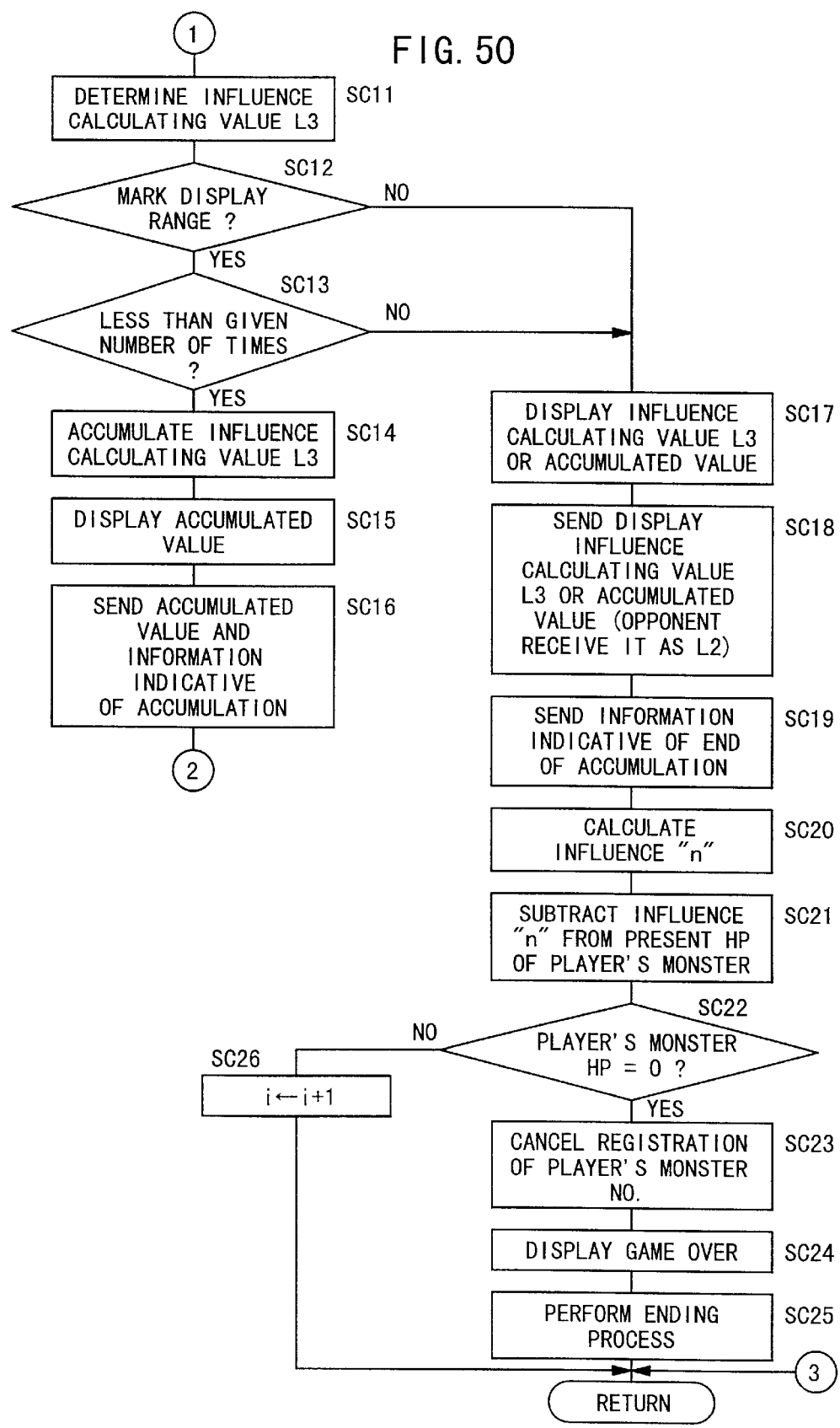

If the control entry does not come from the decision key 74, but from one of the direction keys 72, in step SC10 shown in FIG. 49, then control goes to step SC27 in which the video game processing means determines whether the tip end of the displayed bar is positioned within the displayed area of the mark 414 or not. If the tip end of the displayed bar is positioned within the displayed area of the mark 414, then control proceeds to step SC28 in which the player's monster is retreated, i.e., the end flag is set. If the tip end of the displayed bar is not positioned within the displayed area of the mark 414, then control proceeds to step SC29 in which the value of the index register i is incremented by "1".

When the processing in step SC25, the processing in step SC26, the processing in step SC28, or the processing in step SC29 is finished, the defense turn communication process comes to an end.

In the attack turn communication process and the defense turn communication process, at least the monster numbers and the influence calculating values are sent and received, and the monsters and the bars are displayed on the basis of information read from the information tables 320 in the portable information terminals (the player's and opponents portable information terminals) based on the sent and received monster numbers.

Since image data for displaying the bars and image data for imaginary characters do not need to be sent and received on a real-time basis, the data processing in the portable information terminals 32 is speeded up. As a result, a competition by way of communications can be performed between a plurality of persons at substantially the same speed as the speed at which a game is played by one person. Accordingly, the user can enjoy such a competition by way of communications with much fun.

Figure 51:
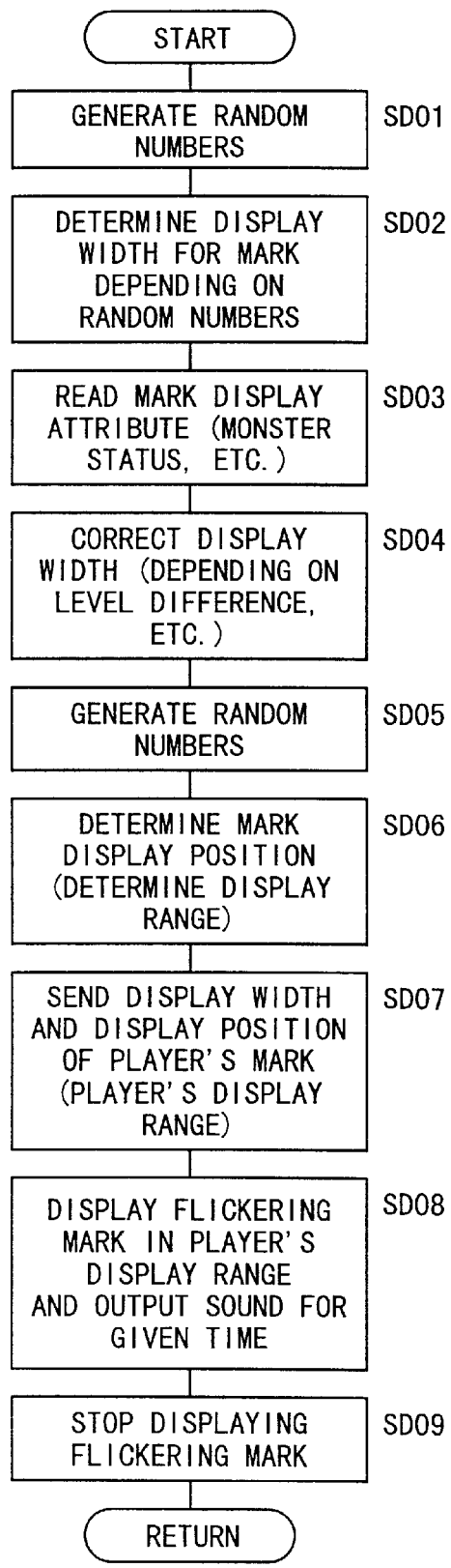
FIG. 51 is a flowchart of a processing sequence of a first mark display communication process.

Processing operation of the video game processing means in the first mark display communication process will be described below with reference to FIG. 51. In step SD01, the video game processing means generates random numbers for determining a display width w of the mark 414. In step SD02, the video game processing means determines a display width w of the mark 414 depending on the generated random numbers. In step SD03, the video game processing means reads a display attribute (the status of the player's monster, etc.) of the mark 414. In step SD04, the video game processing means corrects the display width w depending on the read display attribute. For example, when the status (e.g., the level, the attack power, the defense power, the experience value, etc.) of the player's monster is higher than the status of the opponent's monster, the video game processing means increases the display width w, and when the status of the player's monster is lower than the status of the opponent's monster, the video game processing means reduces the display width w.

In step SD05, the video game processing means generates random numbers for determining a display position of the mark 414. In step SD06, the video game processing means determines a display position of the mark 414 based on the generated random numbers, i.e., determines a display range.

In step SD07, the data sending and receiving means 324 sends the display width w and the display position (display range) of the player's mark to the opponent.

In step SD08, the mark display means 316 displays the mark 414 in a flickering manner in the determined display position for a predetermined time (e.g., 2 seconds), and the sound output means 312 outputs a sound in timed relation to the flickering of the mark 414.

After elapse of the predetermined time, the flickering display of the mark 414 and the outputting of the sound are stopped in step SD09. When the processing in step SD09 is finished, the first mark display communication process comes to an end.

Figure 52:
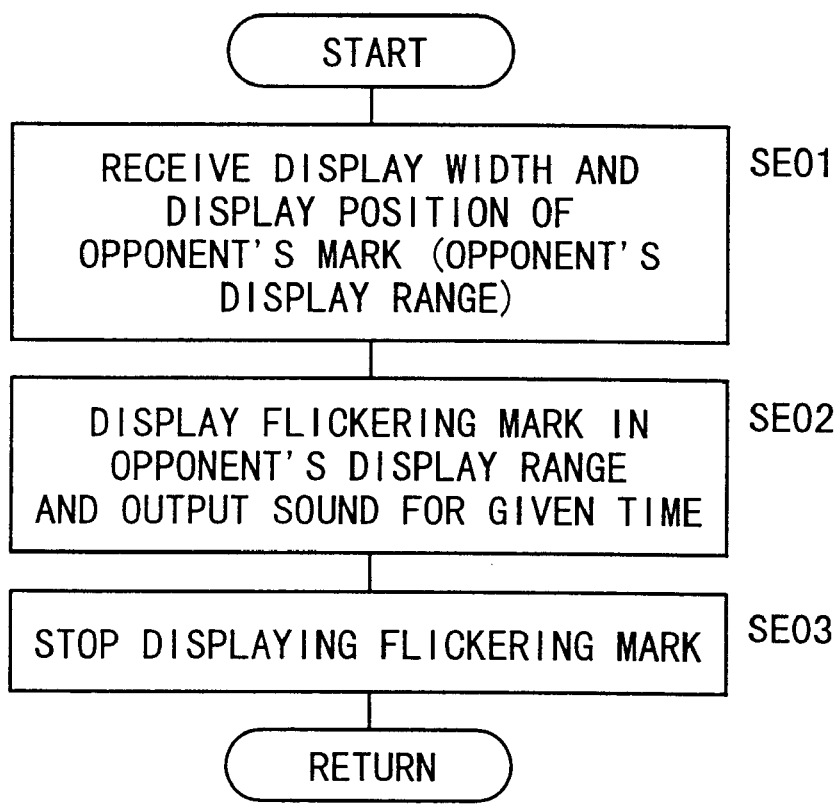
FIG. 52 is a flowchart of a processing sequence of a second mark display communication process.
Figure 53:
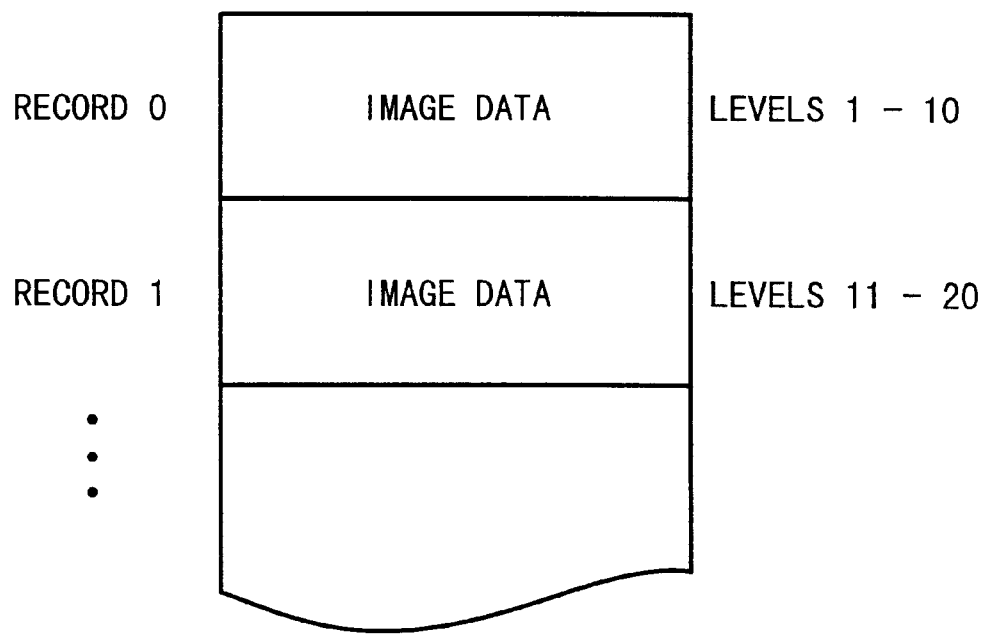
FIG. 53 is a diagram showing details of a principal character image table.

Processing operation of the video game processing means in the second mark display communication process will be described below with reference to FIG. 52. In step SE01, the data sending and receiving means 324 receives the display width w and the display position (display range) of the opponent's mark.

In step SE02, the mark display means 316 displays the mark 414 in a flickering manner in the received display position for a predetermined time (e.g., 2 seconds), and the sound output means 312 outputs a sound in timed relation to the flickering of the mark 414.

After elapse of the predetermined time, the flickering display of the mark 414 and the outputting of the sound are stopped in step SE03. When the processing in step SE03 is finished, the second mark display communication process comes to an end.

The first and second mark display communication processes can display the mark 414 that can successively be operated in a competition performed by way of communications. The advantages offered by the above mark display, i.e., giving the accumulated value of the influence obtained by the successive operation as damage to the opponent, and allowing the player's monster, even if its level is low, to defeat the opponent' strong monster in RPGs, can be achieved in a competition performed by way of communications.

The portable information terminal, the recording medium, and the program according to the present invention are not limited to the details of the illustrated embodiment, but may be modified in various ways.

The portable information terminal, the recording medium, and the program according to the present invention offers the following advantages:

(1) The portable information terminal can be used as a portable game machine, and can play a roll-playing game (RPG).

(2) The portable information terminal can be operated in the battle mode for fighting against an imaginary enemy (e.g., a monster).

(3) The portable information terminal allows the user to register imaginary enemies defeated in the battle mode and view the registered imaginary enemies in a monster picture book, for example.

(4) The above battle mode can be performed in a competition between a plurality of users at any time in any place by way of wireless communications (infrared communications, etc.), so that the portable information terminal can find widespread use.

Although a certain preferred embodiment of the present invention has been shown and described in detail, it should be understood that various changes and modifications may be made therein without departing from the scope of the appended claims.

What is claimed is:

1. A portable information terminal comprising:

character display means for displaying at least one imaginary character during a battle mode in which a player challenges said imaginary character on a display screen;

comparing means for comparing an input timing of a control signal and an output timing based on a predetermined sequence with each other, said comparing means having a bar display means for displaying the output timing based on the predetermined sequence as an extensible/contractible bar, wherein said bar expands and contracts at a variable speed in response to conditions that are independent of user input; and influence determining means for determining the magnitude of an influence as an assessment of damage caused to the imaginary character based on the result of comparison from said comparing means, said influence determining comprising means for determining the magnitude of the influence based on the length of the bar when said control signal is inputted.

2. A portable information terminal according to claim 1, further comprising sound output means for outputting a sound a signal whose sound varies as the displayed bar extends and contracts.

3. A portable information terminal according to claim 1, further comprising a manual control pad having a button operable to control the input timing of the control signal.

4. A portable information terminal according to claim 1, wherein said comparing means comprises:

mark display means for displaying a mark capable of being successively operated with respect to said influence, in an arbitrary position in a display area of the bar before said bar display means displays the output timing as said bar; and successive operation permitting means for allowing successive operation to be executed if the time when the tip end of the bar displayed by said bar display means touches the display area of the mark agrees with said input timing of the control signal.

5. A portable information terminal according to claim 1, wherein said influence comprises a numerical value for reducing a level of said imaginary character.

6. A portable information terminal according to claim 5, wherein said influence is calculated on the basis of a calculating value based on the length of the bar displayed when said control signal is inputted on an attack side, a calculating value based on the length of the bar displayed when said control signal is inputted on a defense side, and a variable derived from the difference between statuses of the attack and defense sides.

7. A portable information terminal according to claim 6, wherein an element for deriving said variable includes time information.

8. A portable information terminal according to claim 5, further comprising table registering means for effectively registering information of said imaginary character in an information table or canceling information of said imaginary character effectively registered in said information table when the level of said imaginary character becomes "0".

9. A portable information terminal according to claim 8, wherein said table registering means comprises means for effectively registering information of said imaginary character in the information table when the level of said imaginary character becomes "0" if said imaginary character is an imaginary enemy.

10. A portable information terminal according to claim 8, wherein said table registering means comprises:
preparing means for preparing for effectively registering information of said imaginary character in the information table when the level of said imaginary character becomes "0" if said imaginary character is an imaginary enemy; and
means for effectively registering information of said imaginary character in the information table which has been prepared by said preparing means when the completion of a predetermined process is detected.

11. A portable information terminal according to claim 8, wherein said table registering means comprises:
means for canceling information of said imaginary character effectively registered in said information table when the level of said imaginary character becomes "0" if said imaginary character is an imaginary ally.

12. A portable information terminal according to claim 1, wherein said influence comprises a numerical value for suppressing a reduction in a level of said imaginary character.

13. A portable information terminal according to claim 1, wherein said character display means comprises means for displaying an image depending on a level of said imaginary character.

14. A portable information terminal according to claim 1, wherein said character display means comprises means for, if said imaginary character is an imaginary enemy, managing the type of the imaginary enemy to be displayed and/or the probability with which to display the imaginary enemy, based on time information.

15. A portable information terminal according to claim 1, further comprising:
a manual control pad having a direction control key; and
path display means for displaying a path for the imaginary character depending on an entry from said direction control key.

16. A portable information terminal according to claim 15, wherein said path display means comprises means for displaying a path different from a predetermined ordinary path based on time information.

17. A portable information terminal according to claim 1, further comprising:
data sending/receiving means for sending and receiving, by way of wireless communications, at least information with respect to said imaginary character and information of the bar displayed by said bar display means.

18. A portable information terminal according to claim 17, wherein said data sending/receiving means comprises means for sending and receiving at least information with respect to said imaginary character and a value for calculating said influence, the arrangement being such that an image including said bar is displaying by reading image information based on the information with respect to said imaginary character which has been sent and received.

19. A portable information terminal according to claim 17, wherein said comparing means comprises mark display means for displaying a mark capable of being successively operated with respect to said influence, in an arbitrary position in a display area of the bar before said bar display means displays the output timing as said bar, said data sending/receiving means comprising means for sending and receiving a display width and a display position for said mark which have been determined by said mark display means.

20. A recording medium storing a program having the steps of:
displaying at least one imaginary character during a battle mode in which a player challenges said imaginary character on a display screen;
comparing an input timing of a control signal and an output timing based on a predetermined sequence with each other;
displaying the output timing based on the predetermined sequence as an extensible/contractible bar, wherein said bar expands and contracts at a variable speed in response to conditions that are independent of user input;
determining a magnitude of an influence as an assessment of damage caused to the imaginary character based on the result of comparison from said comparing means; and
determining the magnitude of the influence based on the length of the bar when said control signal is inputted.

21. A recording medium according to claim 20, wherein said program has the step of outputting a sound signal whose sound varies as the displayed bar extends and contracts.

22. A recording medium according to claim 20, wherein the input timing of the control signal is controlled by a button of a manual control pad.

23. A recording medium according to claim 20, wherein said comparing step comprises the steps of:
displaying a mark capable of being successively operated with respect to said influence, in an arbitrary position in a display area of the bar before said bar display step displays the output timing as said bar; and
allowing successive operation to be executed if the time when the tip end of the bar displayed by said bar display means touches the display area of the mark agrees with said input timing of the control signal.

24. A recording medium according to claim 20, wherein said influence comprises a numerical value for reducing a level of said imaginary character.

25. A recording medium according to claim 24, wherein said influence is calculated on the basis of a calculating value based on the length of the bar displayed when said control signal is inputted on an attack side, a calculating value based on the length of the bar displayed when said control signal is inputted on a defense side, and a variable derived from the difference between statuses of the attack and defense sides.

26. A recording medium according to claim 25, wherein an element for deriving said variable includes time information.

27. A recording medium according to claim 24, wherein said program further has the step of effectively registering information of said imaginary character in an information table or canceling information of said imaginary character effectively registered in said information table when the level of said imaginary character becomes "0".

28. A recording medium according to claim 27, wherein said step of effectively registering information comprises the step of effectively registering information of said imaginary character in the information table when the level of said imaginary character becomes "0" if said imaginary character is an imaginary enemy.

29. A recording medium according to claim 27, wherein said step of effectively registering information comprises the steps of:
preparing for effectively registering information of said imaginary character in the information table when the level of said imaginary character becomes "0" if said imaginary character is an imaginary enemy; and
effectively registering information of said imaginary character in the information table which has been prepared by said preparing step when the completion of a predetermined process is detected.

30. A recording medium according to claim 27, wherein said step of effectively registering information comprises the step of canceling information of said imaginary character effectively registered in said information table when the level of said imaginary character becomes "0" if said imaginary character is an imaginary ally.

31. A recording medium according to claim 20, wherein said influence comprises a numerical value for suppressing a reduction in a level of said imaginary character.

32. A recording medium according to claim 20, wherein said displaying step comprises the step of displaying an image depending on a level of said imaginary character.

33. A recording medium according to claim 20, wherein said displaying step comprises the step of, if said imaginary character is an imaginary enemy, managing the type of the imaginary enemy to be displayed and/or the probability with which to display the imaginary enemy, based on time information.

34. A recording medium according to claim 20, wherein said program further comprises the step of displaying a path for the imaginary character depending on an entry of said control signal.

35. A recording medium according to claim 20, wherein said step of displaying a path comprises the step of displaying a path different from a predetermined ordinary path based on time information.

36. A recording medium according to claim 20, wherein said program further comprises the step of sending and receiving, by way of wireless communications, at least information with respect to said imaginary character and information of the bar displayed by said bar display step.

37. A recording medium according to claim 36, wherein said sending and receiving step comprises the step of sending and receiving at least information with respect to said imaginary character and a value for calculating said influence, the arrangement being such that an image including said bar is displaying by reading image information based on the information with respect to said imaginary character which has been sent and received.

38. A recording medium according to claim 36, wherein said comparing step comprises the step of displaying a mark capable of being successively operated with respect to said influence, in an arbitrary position in a display area of the bar before said bar display means displays the output timing as said bar, said sending and receiving step comprising the step of sending and receiving a display width and a display position for said mark which have been determined by said mark display step.

39. A program readable and executable by a computer, comprising the steps of:
displaying at least one imaginary character during a battle mode in which a player challenges said imaginary character on a display screen;
comparing an input timing of a control signal and an output timing based on a predetermined sequence with each other;
displaying the output timing based on the predetermined sequence as an extensible/contractible bar, wherein said bar expands and contracts at a variable speed in response to conditions that are independent of user input;
determining a magnitude of an influence as an assessment of damage caused to the imaginary character based on the result of comparison from said comparing means; and
determining the magnitude of the influence based on the length of the bar when said control signal is inputted.

40. An entertainment system comprising:
a display screen;
means for displaying at least one object together with a bar on said display screen, wherein said bar expands and contracts at a variable speed in response to conditions that are independent of user input;
means for determining a result of an input signal inputted from a user to said entertainment system through said input controls, based on a timing indicated by said bar,
wherein said result of said input signal is determined based on a length of said bar at a point in time when said input signal is inputted by said user to said entertainment system.

41. An entertainment system according to claim 40, wherein said conditions depend on a state of said object, for indicating an input timing for which input controls of said entertainment system should be manipulated.

42. An entertainment system according to claim 40, further comprising sound output means for outputting a sound signal whose sound varies as the displayed bar expands and contracts.

43. An entertainment system according to claim 40, further comprising a manual control pad having a button operable to control the input timing of the control signal.

44. An entertainment system according to claim 40, further comprising:
a manual control pad having a direction control key; and
path display means for displaying a path for said object depending on an entry from said direction control key.

45. An entertainment system according to claim 44, wherein said path display means comprising means for displaying a path different from a predetermined ordinary path based on time information.

46. A recording medium storing a program having the steps of:
displaying at least one object together with a bar on a display screen, wherein said bar expands and contracts at a variable speed in response to conditions that are independent of user input;
determining a result of an input signal inputted from a user to an entertainment system through input controls, based on a timing indicated by said bar,
wherein said result of said input signal is determined based on a length of said bar at a point in time when said input signal is inputted by said user to said entertainment system.

47. A recording medium according to claim 46, wherein said conditions depend on a state of said object, for indicating an input timing for which input controls of said entertainment system should be manipulated.

48. A recording medium according to claim 46, wherein said program has a further step of outputting a sound signal whose sound varies as the displayed bar extends and contracts.

49. A recording medium according to claim 46, wherein the input timing of the control signal is controlled by a button of a manual control pad having a direction control key.

50. A recording medium according to claim 46, wherein said program has a further step of displaying a path for said object depending on an entry of said direction control key.

51. A recording medium according to claim 50, wherein said step of displaying a path further comprises a step of displaying a path different from a predetermined ordinary path based on time information.

52. A program readable and executable by a computer, comprising the steps of:

displaying at least one object together with a bar on a display screen, wherein said bar expands and contracts at a variable speed in response to conditions that are independent of user input;

determining a result of an input signal inputted from a user to an entertainment system through input controls, based on a timing indicated by said bar, wherein said result of said input signal is determined based on a length of said bar at a point in time when said input signal is inputted by said user to said entertainment system.

53. The program according to claim 52, wherein said conditions depend on a state of said object, for indicating an input timing for which input controls of said entertainment system should be manipulated.

* * * * *